United States Patent
Carlini et al.

(10) Patent No.: US 6,576,748 B1
(45) Date of Patent: Jun. 10, 2003

(54) METHOD FOR MAKING DIMERIC AZO PYRIDONE COLORANTS

(75) Inventors: Rina Carlini, Mississauga (CA); James D. Mayo, Mississauga (CA); James M. Duff, Mississauga (CA); Jeffrey H. Banning, Hillsboro, OR (US); Paul F. Smith, Oakville (CA); George Liebermann, Mississauga (CA); Roger E. Gaynor, Oakville (CA)

(73) Assignee: Xerox Corporation, Stamford, CT (US)

( * ) Notice: Subject to any disclaimer, the term of this patent is extended or adjusted under 35 U.S.C. 154(b) by 32 days.

(21) Appl. No.: 10/185,828

(22) Filed: Jun. 27, 2002

(51) Int. Cl.$^7$ .................. C09B 33/12; C09B 35/031
(52) U.S. Cl. .............. 534/649; 534/758; 534/759; 534/581; 534/DIG. 2
(58) Field of Search ................ 534/581, 758, 534/759, 649

(56) References Cited

U.S. PATENT DOCUMENTS

| | | | |
|---|---|---|---|
| 3,653,932 A | 4/1972 | Berry et al. ............... | 106/22 |
| 3,957,749 A | 5/1976 | von Brachel et al. ....... | 260/156 |
| 4,083,842 A | 4/1978 | Burkhard et al. .......... | 260/156 |
| 4,216,145 A | 8/1980 | Battisti et al. ........... | 260/156 |
| 4,247,456 A | 1/1981 | von Brachel et al. ....... | 260/156 |
| 4,359,418 A | 11/1982 | Lienhard et al. .......... | 260/156 |
| 4,380,452 A | 4/1983 | Loeffler et al. ............ | 8/532 |
| 4,390,369 A | 6/1983 | Merritt et al. ............. | 106/31 |
| 4,484,948 A | 11/1984 | Merrit et al. .............. | 106/31 |
| 4,644,058 A | 2/1987 | Shimidzu et al. .......... | 534/635 |
| 4,684,956 A | 8/1987 | Ball ....................... | 346/1.1 |
| 4,734,349 A | 3/1988 | Chapman et al. .......... | 430/106 |
| 4,739,042 A | 4/1988 | Lorenz et al. ............. | 534/649 |
| 4,851,045 A | 7/1989 | Taniguchi ................. | 106/31 |
| 4,889,560 A | 12/1989 | Jaeger et al. .............. | 106/27 |
| 4,889,761 A | 12/1989 | Titterington et al. ....... | 428/195 |
| 4,994,564 A | 2/1991 | Etzbach et al. ............ | 534/766 |
| 5,006,170 A | 4/1991 | Schwarz et al. ........... | 106/20 |
| 5,037,964 A | 8/1991 | Moser et al. .............. | 534/608 |
| 5,041,413 A | 8/1991 | Evans et al. ............... | 503/227 |
| 5,066,791 A | 11/1991 | Hansen et al. ............. | 534/772 |
| 5,151,120 A | 9/1992 | You et al. ................. | 106/27 |
| 5,221,335 A | 6/1993 | Williams et al. ........... | 106/23 |
| 5,372,852 A | 12/1994 | Titterington et al. ....... | 427/288 |
| 5,496,879 A | 3/1996 | Griebel et al. ............. | 524/320 |
| 5,621,022 A | 4/1997 | Jaeger et al. .............. | 523/161 |
| 5,827,918 A | 10/1998 | Titterington et al. ....... | 524/590 |
| 5,902,841 A | 5/1999 | Jaeger et al. .............. | 523/161 |
| 5,919,839 A | 7/1999 | Titterington et al. ....... | 523/161 |
| 5,929,218 A | 7/1999 | Lee et al. .................. | 534/772 |
| 6,406,526 B1 | 6/2002 | Meyrick et al. ............ | 106/31.48 |

FOREIGN PATENT DOCUMENTS

| | | |
|---|---|---|
| DE | 3538517 A1 | 5/1986 |
| EP | 0 023 770 A1 | 2/1981 |
| EP | 0 083 553 A1 | 12/1982 |
| EP | 0 142 863 B1 | 5/1985 |
| EP | 0 172 283 A1 | 2/1986 |
| EP | 0 187 352 A2 | 7/1986 |
| EP | 0 206 286 A1 | 12/1986 |
| EP | 0 247 737 A1 | 12/1987 |
| EP | 268897 | 6/1988 |
| EP | 0 302 401 A1 | 7/1988 |
| EP | 0 314 002 B1 | 9/1991 |
| EP | 0 468 647 B1 | 1/1992 |
| EP | 0 404 493 B1 | 5/1994 |
| EP | 0 319 234 B1 | 3/1995 |
| EP | 0 524 637 B1 | 3/1996 |
| EP | 0 529 282 B1 | 10/1996 |
| EP | 0 706 679 B1 | 9/1997 |
| EP | 0 844 287 B1 | 5/2000 |
| EP | 1 125 990 A1 | 8/2001 |
| EP | 1 168 046 A1 | 1/2002 |

(List continued on next page.)

OTHER PUBLICATIONS

Copending application U.S. Ser. No. 10/185,261 (Attorney Docket No. D/A2233), filed Jun. 27, 2002, entitled "Processes for Preparing Dianthranilate Compounds and Diazopyridone Colorants," by Rina Carlini et al.

Copending application U.S. Ser. No. 10/185,994 (Attorney Docket No. D/A2234), filed Jun. 27, 2002, entitled "Dimeric Azo Pyridone Colorants," by Rina Carlini et al.

(List continued on next page.)

*Primary Examiner*—Fiona T. Powers
(74) *Attorney, Agent, or Firm*—Judith L. Byorick

(57) ABSTRACT

Disclosed is a process for preparing a diazopyridone compound either (A) of the formula

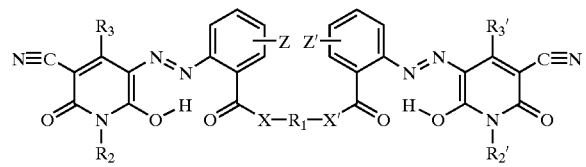

or (B) of the formula

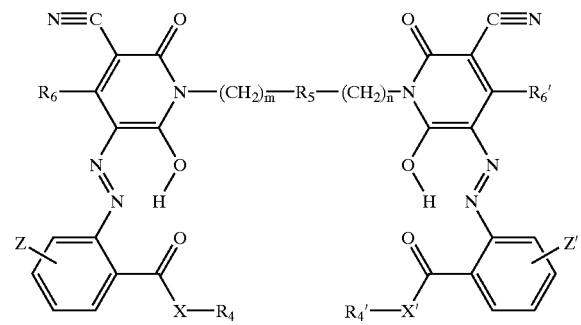

which comprises diazotizing a dianiline and coupling it with a pyridone or diazotizing an aniline and coupling it with a dipyridone.

80 Claims, No Drawings

FOREIGN PATENT DOCUMENTS

| GB | 2 008 606 A | 6/1979 |
|---|---|---|
| GB | 1 559 001 | 1/1980 |
| IN | 147868 | 7/1980 |
| KR | 119563 | 8/1997 |
| WO | WO 94/04619 | 3/1994 |
| WO | WO 99/43754 | 9/1999 |
| WO | WO 01/21714 A2 | 3/2001 |
| WO | WO 01/09256 A1 | 8/2001 |

OTHER PUBLICATIONS

Copending application U.S. Ser. No. 10/184,269 (Attorney Docket No. D/A2236), filed Jun. 27, 2002, entitled "Phase Chang Inks Containing Dimeric Azo Pyridone Colorants," by Bo Wu et al.

Copending application U.S. Ser. No. 10/185,264 (Attorney Docket No. D/A2237), filed Jun. 27, 2002, entitled "Phase Change Inks Containing Azo Pyridone Colorants" by Jeffery H. Banning et al.

Copending application U.S. Ser. No. 10/186,024 (Attorney Docket No. D/A2238), filed Jun. 27, 2002, entitled "Azo Pyridone Colorants," by Jeffery H. Banning etal.

Copending application U.S. Ser. No. 10/185,597 (Attorney Docket No. D/A2239), filed Jun. 27, 2002, entitled "Process for Preparing Substituted Pyridone Compounds," by James D. Mayo et al.

Copending application U.S. Ser. No. 10/186,023 (Attorney Docket No. D/A2281), filed Jun. 27, 2002, entitled "Dimeric Azo Pyridone Colorants," by Rina Carlini et al.

Copending application U.S. Ser. No. 10/184,266 (Attorney Docket No. D/A2281Q), filed Jun. 27, 2002, entitled "Phase Change Inks Containing Dimeric Azo Pyridone Colorants," by Bo Wu et al.

English Abstract for German Patent Publication DE 4205636.

English Abstract for German Patent Publication DE 4205713.

English Abstract for Japanese Patent Publication JP 05331382.

English Abstract for German Patent Publication DE 19646430.

English Abstract for German Patent Publication DE 19646429.

English Abstract for German Patent Publication DE 19647869.

English Abstract for Japanese Patent Publication JP 3192158.

"Preparation and Evaluation of Yellow Pigments Based on H–Pyridone and Esters of Aminoterephthalic Acid," P. Slosar et al., CHEMagazin, vol. 9, No. 6, pp. 8–11 (1999) (Not translated).

"Synthesis, Morphology, and Optical Properties of Tetrahedral Oligo(phenylenevinylene) Materials," S. Wang et al., *J. Am. Chem. Soc.*, vol. 120, p. 5695 (2000).

"Syntheses of Amphiphilic Diblock Copolymers Containing a Conjugated Block and Their Self–Assembling Properties," H. Wang et al., *J. Am. Chem. Soc.*, vol. 122, p. 6855 (2000).

"Crystal Engineering of Conjugated Oligomers and the Spectral Signature of π Stacking in Conjugated Oligomers and Polymers," A. Koren et al., *Chem. Mater.*, vol. 12, p. 1519 (2000).

"The Chemistry of Isatoic Anhydride," G. M. Coppola, *Synthesis*, p. 505 (1980).

"Isatoic Anhydride. IV. Reactions with Various Nucleophiles," R. P. Staiger et al., *J. Org. Chem.*, vol. 24, p. 1214 (1959).

"Investigation of the Reaction Conditions for the Synthesis of 4,6–Disubstituted–3–cyano–2–pyridones and 4–Methyl–3–cyano–6–hydroxy–2–pyridone," D. Z. Mijin et al., *J. Serb. Chem. Soc.*, vol. 59, No. 12, p. 959 (1994).

Synthesis of Isoquinoline Alkaloids. II. The Synthesis and Reactions of 4–Methyl–3–pyridinecarboxaldehyde and Other 4–Methyl–3–substituted Pyridines, J. M. Bobbitt et al., *J. Org. Chem.*, vol. 25, p. 560 (1960).

"Synthesis and Dyeing Characteristics of 5–(4–Arylazophenyl) azo–3–cyano–4–methyl–6–hydroxy–2–pyridones," J. Kanhere et al., *Indian Journal of Textile Research*, vol. 13, p. 213 (1988).

"Synthesis of Some Pyridone Azo Dyes from 1–Substituted 2–Hydroxy–6–pyridone Derivatives and their Colour Assessment," C. Chen et al., *Dyes and Pigments*, vol. 15, p. 69 (1991).

English Abstract and description (not translated) for German Patent Publication DE 3543360.

English Abstract for Japanese Patent Publication JP 2001214083.

English Abstract for German Patent Publication DE 3505899.

"Yellow to Violet Azo–N–Substituted Pyridinone Disperse Dyes for Synthetic Fibers," I.M.S. Mamak, *Indian*, pp. 1–11 (1980) (Indian Patent Publication 147527).

English Abstract for Japanese Patent Publication JP2000062327.

English Abstract for Japanese Patent Publication JP60152563.

"Synthesis of 3–Cyano–6–hydroxy–5–[2–(perfluoroalkyl)phenylazo]–2–pyridones and their Application for Dye Diffusion Thermal Transfer Printing," *Bull. Chem. Soc. Jpn.*, vol. 66, Iss. 6, pp. 1790–1794, (1993).

English Abstract for Chinese Patent Publication CN1115773.

English Abstract for German Patent Publication DE 3447117.

English Abstract for Japanese Patent Publication JP 5331382.

English Abstract for Japanese Patent Publication JP 63210169.

English Abstract for Japanese Patent Publication JP 63199764.

English Abstract for Japanese Patent Publication JP 63199763.

English Abstract for Japanese Patent Publication JP 63199762.

English Abstract for Japanese Patent Publication JP 63199761.

English Abstract for Japanese Patent Publication JP 63199760.

English Abstract for Japanese Patent Publication JP 63071392.

English Abstract for Japanese Patent Publication JP 61181865.

English Abstract for Japanese Patent Publication JP 61036366.

English Abstract for Japanese Patent Publication JP 60112862.

English Abstract for Japanese Patent Publication JP 60112861.

English Abstract for Japanese Patent Publication JP 58149953.
English Abstract for Japanese Patent Publication JP 56092961.
English Abstract for Japanese Patent Publication JP 56026957.
English Abstract for Japanese Patent Publication JP 55099958.
English Abstract for Japanese Patent Publication JP 96 11443 (JP8011443).
English Abstract for Japanese Patent Publication JP 93169849 (JP5169849).
English Abstract for Japanese Patent Publication JP 93 51536 (JP5051536).
English Abstract for Japanese Patent Publication JP 90185569 (JP2185569).
English Abstract for Japanese Patent Publication JP 87290762 (JP62290762).
English Abstract for Japanese Patent Publication JP 86244595 (JP61244595).
English Abstract for Spanish Patent Publication 475254 (Equivalent of Italian Patent Publication IT 1088895).
English Abstract for German Patent Publication DE 2727809.
"Colour and Constitution of Azo Dyes Derived from 2–Thioalkyl–4,6–Diaminopyrimidines and 3–Cyano–1, 4–dimethyl–6–hydroxy–2–pyridone as Coupling Components," L. Cheng et al., *Dyes and Pigments*, vol. 7, No. 5, pp. 373–388 (1986).
English Abstract for Japanese Patent Publication JP 63039380.
English Abstract for Japanese Patent Publication JP 54102328.
English Abstract for Japanese Patent Publication JP 54070337.
"Trends in Modern Dye Chemistry. Part 10," N. R. Ayyangar and K. V. Srinivasan, *Colourage*, vol. 37, No. 2, pp. 29–30 (Jan. 16, 1990).
English Abstract for Japanese Patent Publication JP 05169854.
English Abstract for Japanese Patent Publication JP 04292988.
English Abstract for Japanese Patent Publication JP 63161060.
English Abstract for Japanese Patent Publication JP 61244595.
English Abstract for Japanese Patent Publication JP 00239549 (JP2000239549).
English Abstract for Japanese Patent Publication JP 11269402.
English Abstract for Japanese Patent Publication JP 09041267.
English Abstract for Japanese Patent Publication JP 08039941.
English Abstract for Japanese Patent Publication JP 06294909.
English Abstract for Japanese Patent Publication JP 06122829.
English Abstract for Japanese Patent Publication JP 05255602.
English Abstract for Japanese Patent Publication JP 05051536.
English Abstract for Japanese Patent Publication JP 04235093.
English Abstract for European Patent Publication EP 0 063 275.
English Abstract for German Patent Publication DE 2606506.

METHOD FOR MAKING DIMERIC AZO PYRIDONE COLORANTS

CROSS-REFERENCE IS MADE TO THE FOLLOWING APPLICATION

Copending application U.S. Ser. No. (not et assigned; Attorney Docket No. D/A2233), filed concurrently herewith, entitled "Processes for Preparing Dianthranilate Compounds and Diazopyridone Colorants," with the named inventors Rina Carlini, James M. Duff, Stephen G. Robinson, George Liebermann, Roger E. Gaynor, Tania L. Pereira, Jeffery H. Banning, and James D. Mayo, the disclosure of which is totally incorporated herein by reference, discloses a process for preparing dianthranilate compounds which comprises (a) admixing reactants as follows: (1) a diol of the formula $R_1(OH)_2$, wherein $R_1$ is an alkylene group having at least about 20 carbon atoms, and wherein the —OH groups are primary or secondary, (2) isatoic anhydride, present in an amount of at least about 2 moles of isatoic anhydride per every one mole of diol, (3) a catalyst which is 1,4-diazabicyclo[2.2.2]octane, N,N,N',N'-tetramethylethylene diamine, or a mixture thereof, said catalyst being present in an amount of at least about 0.2 mole of catalyst per every one mole of diol, and (4) a solvent; and (b) heating the mixture thus formed to form a dianthranilate compound of the formula

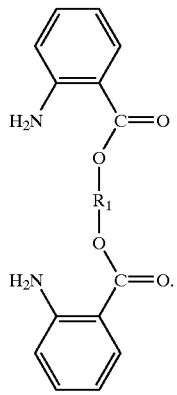

Also disclosed is a process for preparing diazopyridone colorants which comprises (I) preparing a dianthranilate compound by the aforementioned method, (II) reacting the dianthranilate compound with nitrosylsulfuric acid to form a diazonium salt, and (III) reacting the diazonium salt with a pyridone compound to form a diazopyridohe compound.

Copending application U.S. Ser. No. (not yet assigned; Attorney Docket No. D/A2234), filed concurrently herewith, entitled "Dimeric Azo Pyridone Colorants," with the named inventors Rina Carlini, Jeffery H. Banning, James M. Duff, Bo Wu, and James D. Mayo, the disclosure of which is totally incorporated herein by reference, discloses compounds of the formula

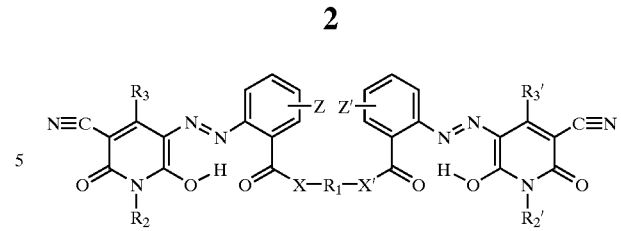

The compounds are useful as colorants, particularly in applications such as phase change inks.

Copending application U.S. Ser. No. (not yet assigned; Attorney Docket No. D/A2236), filed concurrently herewith, entitled "Phase Change Inks Containing Dimeric Azo Pyridone Colorants," with the named inventors Bo Wu, Rina Carlini, Jeffery H. Banning, James M. Duff, James D. Mayo, Jule W. Thomas, Paul F. Smith, and Michael B. Meinhardt, the disclosure of which is totally incorporated herein by reference, discloses a phase change ink composition comprising a phase change ink carrier and a colorant compound of the formula

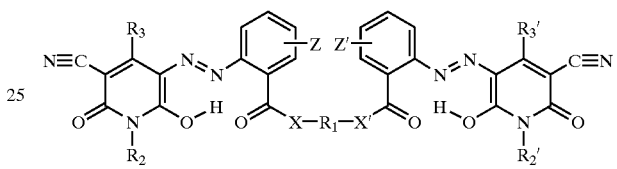

Copending application U.S. Ser. No. (not yet assigned; Attorney Docket No. D/A2237), filed concurrently herewith, entitled "Phase Change Inks Containing Azo Pyridone Colorants" with the named inventors Jeffery H. Banning, Bo Wu, James D. Mayo, James M. Duff, Rina Carlini, Jule W. Thomas, and Paul F. Smith, the disclosure of which is totally incorporated herein by reference, discloses a phase change ink composition comprising a phase change ink carrier and a colorant compound of the formula

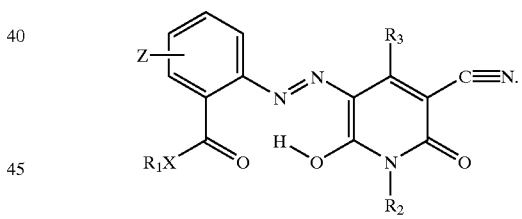

Copending application U.S. Ser. No. (not yet assigned; Attorney Docket No. D/A2238), filed concurrently herewith, entitled "Azo Pyridone Colorants," with the named inventors Jeffery H. Banning, Rina Carlini, James D. Mayo, James M. Duff, and C. Wayne Jaeger, the disclosure of which is totally incorporated herein by reference, discloses compounds of the formula

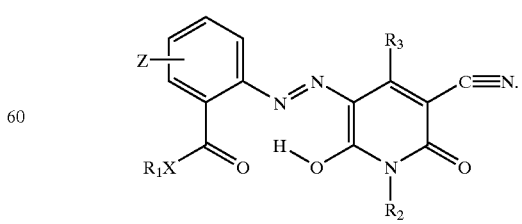

The compounds are useful as colorants, particularly in applications such as phase change inks.

Copending application U.S. Ser. No. (not yet assigned; Attorney Docket No. D/A2239), filed concurrently herewith, entitled "Process for Preparing Substituted Pyridone Compounds," with the named inventors James D. Mayo, James M. Duff, Rina Carlini, Roger E. Gaynor, and George Liebermann, the disclosure of which is totally incorporated herein by reference, discloses a process for preparing substituted pyridone compounds which comprises (a) admixing in the absence of a solvent (1) an amine of the formula $R_1$—$NH_2$ wherein $R_1$ is an alkyl group, an aryl group, an arylalkyl group, or an alkylaryl group, and (2) a first ester of the formula

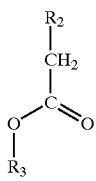

wherein $R_2$ is an electron withdrawing group and $R_3$ is an alkyl group; (b) heating the mixture containing the amine and the first ester to form an intermediate compound of the formula

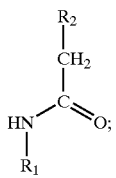

(c) admixing the intermediate compound with (1) a base and (2) a second ester of the formula

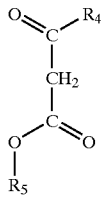

wherein $R_4$ is an alkyl group, an aryl group, an arylalkyl group, or an alkylaryl group and $R_5$ is an alkyl group, said second ester being present in a molar excess relative to the intermediate compound, said base being present in a molar excess relative to the intermediate compound, and (d) heating the mixture containing the intermediate compound, the second ester, and the base to form a pyridone compound of the formula

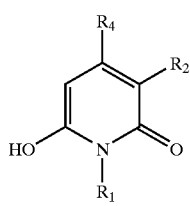

or a salt thereof. Also disclosed is a process for preparing diazopyridone colorants which comprises preparing a pyridone compound by the above process and reacting the pyridone compound with a diazonium salt to form a diazopyridone compound, Copending application U.S. Ser. No. (not yet assigned; Attorney Docket No. D/A2281), filed concurrently herewith, entitled "Dimeric Azo Pyridone Colorants," with the named inventors Rina Carlini, James M. Duff, Jeffery H. Banning, Bo Wu, and James D. Mayo, the disclosure of which is totally incorporated herein by reference, discloses compounds of the formula

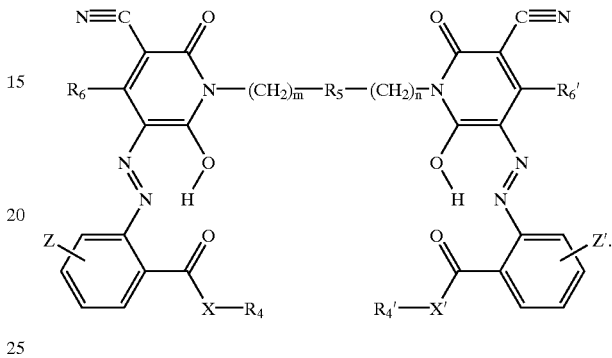

The compounds are useful as colorants, particularly in applications such as phase change inks.

Copending application U.S. Ser. No. (not yet assigned; Attorney Docket No. D/A2281 Q), filed concurrently herewith, entitled "Phase Change Inks Containing Dimeric Azo Pyridone Colorants," with the named inventors Bo Wu, Rina Carlini, James M. Duff, Jeffery H. Banning, and James D. Mayo, the disclosure of which is totally incorporated herein by reference, discloses a phase change ink composition comprising a phase change ink carrier and a colorant compound of the formula

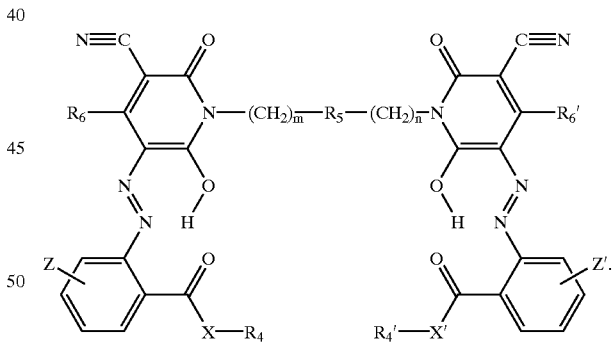

BACKGROUND OF THE INVENTION

The present invention is directed to methods for colorant compounds. More specifically, the present invention is directed to processes for preparing dimericazo pyridone colorant compounds particularly suitable for use in hot melt or phase change inks. One embodiment of the present invention is directed to a process for preparing a diazopyridone compound which comprises (a) preparing a first solution comprising (1) either (A) a dianiline of the formula

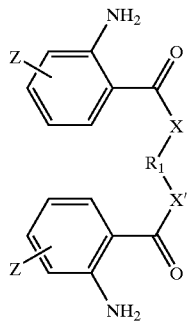

wherein $R_1$ is (i) an alkylene group, (ii) an arylene group, (iii) an arylalkylene group, (iv) an alkylarylene group, (v) an alkyleneoxy group, (vi) an aryleneoxy group, (vii) an arylalkyleneoxy group, (viii) an alkylaryleneoxy group, (ix) a polyalkyleneoxy group, (x) a polyaryleneoxy group, (xi) a polyarylalkyleneoxy group, (xii) a polyalkylaryleneoxy group, (xiii) a heterocyclic group, (xiv) a silylene group, (xv) a siloxane group, (xvi) a polysilylene group, or (xvii) a polysiloxane group, X and X' each, independently of the other, is (i) a direct bond, (ii) an oxygen atom, (iii) a sulfur atom, (iv) a group of the formula —$NR_{40}$— wherein $R_{40}$ is a hydrogen atom, an alkyl group, an aryl group, an arylalkyl group, or an alkylaryl group, or (v) a group of the formula —$CR_{50}R_{60}$— wherein $R_{50}$ and $R_{60}$ each, independently of the other, is a hydrogen atom, an alkyl group, an aryl group, an arylalkyl group, or an alkylaryl group, and Z and Z' each, independently of the other, is, (i) a hydrogen atom, (ii) a halogen atom, (iii) a nitro group, (iv) an alkyl group, (v) an aryl group, (vi) an arylalkyl group, (vii) an alkylaryl group, (viii) a group of the formula

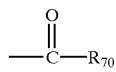

wherein $R_{70}$ is an alkyl group, an aryl group, an arylalkyl group, a alkylaryl group, an alkoxy group, an aryloxy group, an arylalkyloxy group, an alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group, (ix) a sulfonyl group of the formula —$SO_2R_{80}$ wherein $R_{80}$ is a hydrogen atom, an alkyl group, an aryl group, an arylalkyl group, an alkylaryl group, an alkoxy group, an aryloxy group, an arylalkyloxy group, an alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group, or (x) a phosphoryl group of the formula —$PO_3R_{90}$ wherein $R_{90}$ is a hydrogen atom, an alkyl group, an aryl group, an arylalkyl group, an alkylaryl group, an alkoxy group, an aryloxy group, an arylalkyloxy group, an alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group, or (B) an aniline of the formula

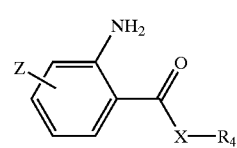

wherein $R_4$ is (i) an alkyl group, (ii) an aryl group, (iii) an arylalkyl group, (iv) an alkylaryl group, (v) an alkoxy group, (vi) an aryloxy group, (vii) an group, (x) a polyaryleneoxy group, (xi) a polyarylalkyleneoxy group, (xii) a polyalkylaryleneoxy group, (xiii) a heterocyclic group, (xiv) a silyl group, (xv) a siloxane group, (xvi) a polysilylene group, or (xvii) a polysiloxane group, X is (i) a direct bond, (ii) an oxygen atom, (iii) a sulfur atom, (iv) a group of the formula —$NR_{40}$— wherein $R_{40}$ is a hydrogen atom, an alkyl group, an aryl group, an arylalkyl group, or an alkylaryl group, or (v) a group of the formula —$CR_{50}R_{60}$— wherein $R_{50}$ and $R_{60}$ each, independently of the other, is a hydrogen atom, an alkyl group, an aryl group, an arylalkyl group, or an alkylaryl group, and Z is (i) a hydrogen atom, (ii) a halogen atom, (iii) a nitro group, (iv) an alkyl group, (v) an aryl group, (vi) an arylalkyl group, (vii) an alkylaryl group, (viii) a group of the formula

wherein $R_{70}$ is an alkyl group, an aryl group, an arylalkyl group, an alkylaryl group, an alkoxy group, an aryloxy group, an arylalkyloxy group, an alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group, (ix) a sulfonyl group of the formula —$SO_2R_{80}$ wherein $R_{80}$ is a hydrogen atom, an alkyl group, an aryl group, an arylalkyl group, an alkylaryl group, an alkoxy group, an aryloxy group, an arylalkyloxy group, an alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group, or (x) a phosphoryl group of the formula —$PO_3R_{90}$ wherein $R_{90}$ is a hydrogen atom, an alkyl group, an aryl group, an arylalkyl group, an alkylaryl group, an alkoxy group, an aryloxy group, an arylalkyloxy group, an alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group, and (2) a first solvent mixture comprising (I) a solvent, (II) acetic acid, and (III) an optional second acid, said acetic acid being present in the solvent mixture in an amount of at least about 95 percent by weight of the solvent mixture, said first solution being at a temperature of about +15° C. or lower; (b) adding to the first solution nitrosylsulfuric acid, thereby forming a diazonium salt either (A) of the formula

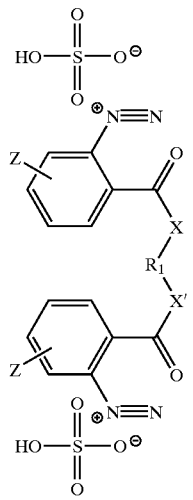

or (B) of the formula

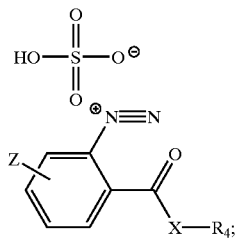

(c) preparing a second solution comprising (1) a second solvent mixture comprising water and an organic solvent soluble in or miscible in water, (2) either (A) a pyridone of the formula

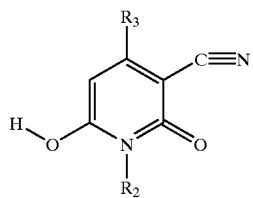

wherein $R_2$ is (i) an alkyl group, (ii) an aryl group, (iii) an arylalkyl group, (iv) an alkylaryl group, (v) an alkoxy group, (vi) an aryloxy group, (vii) an arylalkyloxy group, (viii) an alkylaryloxy group, (ix) a polyalkyleneoxy group, (x) a polyaryleneoxy group, (xi) a polyarylalkyleneoxy group, (xii) a polyalkylaryleneoxy group, (xiii) a heterocyclic group, (xiv) a silyl group, (xv) a siloxane group, (xvi) a polysilylene group, (xvii) a polysiloxane group, or (xviii) a group of the formula

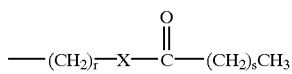

wherein r and s are each, independently of the other, integers representing a number of repeat —CH$_2$— groups, and $R_3$ is (i) an alkyl group, (ii) an aryl group, (iii) an arylalkyl group, or (iv) an alkylaryl group, or (B) a dipyridone of the formula

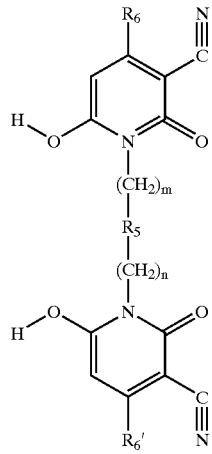

wherein $R_5$ is (i) an alkylene group, (ii) an arylene group, (iii) an arylalkylene group, (iv) an alkylarylene group, (v) an alkyleneoxy group, (vi) an aryleneoxy group, (vii) an arylalkyleneoxy group, (viii) an alkylaryleneoxy group, (ix) a polyalkyleneoxy group, (x) a polyaryleneoxy group, (xi) a polyarylalkyleneoxy group, (xii) a polyalkylaryleneoxy group, (xiii) a heterocyclic group, (xiv) a silylene group, (xv) a siloxane group, (xvi) a polysilylene group, or (xvii) a polysiloxane group, $R_6$ and $R_6'$ each, independently of the other, is (i) an alkyl group, (ii) an aryl group, (iii) an arylalkyl group, or (iv) an alkylaryl group, n is an integer representing the number of repeat —CH$_2$— units, and m is an integer representing the number of repeat —CH$_2$— units, (3) a base present in an amount of at least about 3 molar equivalents of base per mole of pyridone moiety, and (4) an optional buffer salt, and (d) combining either (A) the second solution containing the dianiline and the first solution containing the pyridone, or (B) the second solution containing the aniline and the first solution containing the dipyridone to form a third solution and effect a coupling reaction to form a diazopyridone compound either (A) of the formula

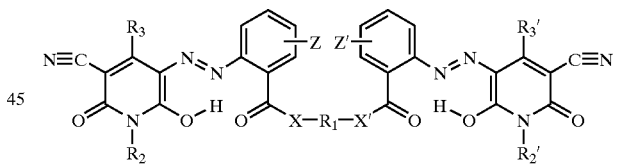

or (B) of the formula

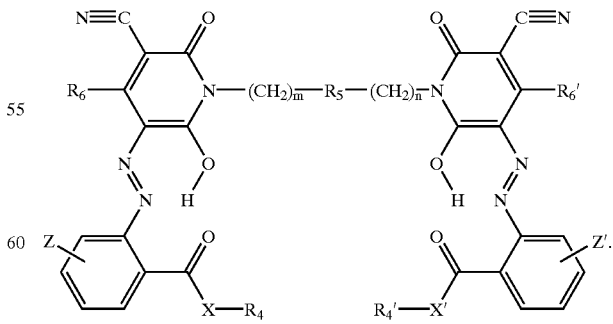

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via tan intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

Phase change inks have also been used for applications such as postal marking and industrial marking and labelling.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Compositions suitable for use as phase change ink carrier compositions are known. Some representative examples of references disclosing such materials include U.S. Pat. No. 3,653,932, U.S. Pat. No. 4,390,369, U.S. Pat. No. 4,484,948, U.S. Pat. No. 4,684,956, U.S. Pat. No. 4,851,045, U.S. Pat. No. 4,889,560, U.S. Pat. No. 5,006,170, U.S. Pat. No. 5,151,120, U.S. Pat. No. 5,372,852, U.S. Pat. No. 5,496,879, European Patent Publication 0187352, European Patent Publication 0206286, German Patent Publication DE 4205636AL, German Patent Publication DE 4205713AL, and PCT Patent Application WO 94/04619, the disclosures of each of which are totally incorporated herein by reference. Suitable carrier materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

European Patent Publication 1 125 990 A1 and PCT Patent Publication WO 01/09256 A1, the disclosures of each of which are totally incorporated herein by reference, discloses an aqueous ink for ink jet recording which contains at least a water-insoluble coloring matter, water, and a resin as main components and which takes the, form of an emulsion, which is characterized by containing at least one yellow hue coloring matter selected from the group consisting of a quinophthalone compound represented by the formula (1)

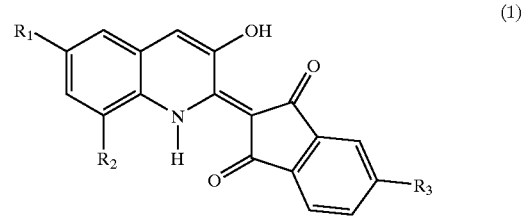

(1)

wherein each of $R_1$ to $R_3$ independently represents a hydrogen atom, an unsubstituted or substituted alkyl group, —$CONR_4R_5$, or —$COOR_6$ (in which each of $R_4$ to $R_6$ independently represents a hydrogen atom, an unsubstituted or substituted alkyl group, or an unsubstituted or substituted aryl group) and all of $R_1$ to $R_3$ are not a hydrogen atom at the same time, and a pyridone azo compound represented by the formula (2)

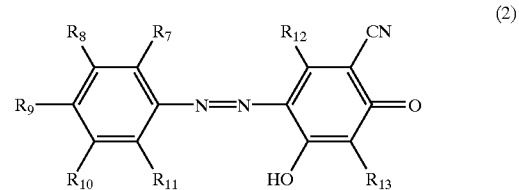

(2)

wherein each of $R_7$ to $R_{11}$ independently represents a hydrogen atom, a halogen atom, an unsubstituted or substituted alkyl group, an aralkyl group, an unsubstituted or substituted alkoxy group, an unsubstituted or substituted aryl group, an unsubstituted or substituted aryloxy group, a hydroxyl group, —$NR_{14}R_{15}$ (in which $R_{14}$ and $R_{15}$ independently represent a hydrogen atom, an unsubstituted or substituted alkyl group, or an aralkyl group), —$COX_1$ (in which $X_1$ represents an unsubstituted or substituted alkoxy group, an unsubstituted or substituted aryloxy group, or —$NR_{16}R_{17}$ (in which each of $R_{16}$ and $R_{17}$ independently represent a hydrogen atom, an unsubstituted or substituted alkyl group, an aralkyl group, or an unsubstituted or substituted aryl group)), —$COO(CH_2)_n$—$COX_2$, —$OCOX_3$, or —$NHCOX_4$ (in which each of $X_2$ to $X_4$ independently represents an unsubstituted or substituted alkyl group, an aralkyl group, an unsubstituted or substituted aryl group, an unsubstituted or substituted alkoxy group, or an unsubstituted or substituted aryloxy group, and n is an integer of 1 to 3), $R_{12}$ represents an unsubstituted or substituted alkyl group, and $R_{13}$ represents an unsubstituted or substituted alkyl group, an aralkyl group, or an unsubstituted or substituted aryl group. The ink is for ink jet recording having excellent light resistance and storage stability, and enables formation of a high quality image without blotting, and the obtained recording image is excellent in water resistance.

PCT Patent Publication WO 01/21714, the disclosure of which is totally incorporated herein by reference, discloses compositions comprising a solvent and at least one compound of the formula

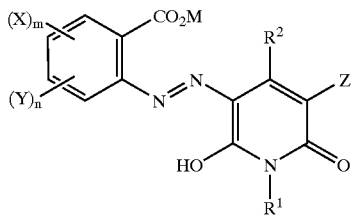

in which $R^1$ represents H, an optionally substituted $C_{1-8}$ carbyl derived group, or a group of the formula

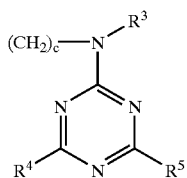

where C is from 2 to 6, $R^3$ represents optionally substituted $C_{1-8}$ carbyl derived group, $R^4$ and $R^5$ independently represent an optional substituent, $R^2$ represents an optionally substituted $C_{1-8}$ carbyl derived group, X Y, and Z independently represent an optional substituent, M represents H or a cation, and m and n independently represent 0, 1, or 2. Also disclosed are compounds of the above formula providing that at least one of $R^1$, $R^2$, X, Y, or Z comprises a group of formula $SO_3M$ or $PO_3M_2$. These compositions and compounds are useful as the colorants to prepare color filters for displays.

U.S. Pat. No. 4,247,456 (von Brachel et al.), the disclosure of which is totally incorporated herein by reference, discloses water-insoluble monoazo dyes of the formula

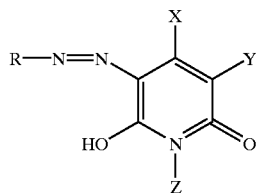

wherein R is the residue of a benzene, naphthalene, diphenyl, diphenylmethane, or heterocyclic diazo compound which is free from water solubilizing groups, produced by reacting a diazotized amine of the benzene, naphthalene, diphenyl, diphenylmethane, or heterocyclic series which is free from water solubilizing groups with the appropriate 6-hydroxy-2-pyridone and the utility thereof for the dyeing and printing of synthetic fabric materials to yellow to red shades having excellent fastness to light and sublimation.

U.S. Pat. No. 3,957,749 (von Brachel et al.), the disclosure of which is totally incorporated herein by reference, discloses water-insoluble monoazo dyes of the formula

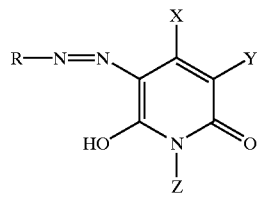

produced by reacting a diazotized amine of the benzene, naphthalene, diphenyl, diphenylmethane, or heterocyclic series which is free from water solubilizing groups with the appropriate 6-hydroxy-2-pyridone and the utility thereof for the dyeing and printing of synthetic fabric materials to yellow to red shades having excellent fastness to light and sublimation.

Japanese Patent Publication JP 05331382, the disclosure of which is totally incorporated herein by reference, discloses a specific pyridone azo pigment which is bright yellow and highly soluble in a solvent, absorbs light of long wavelength, and is useful for a thermal transfer sheet. The pyridone azo pigment is represented by the formula

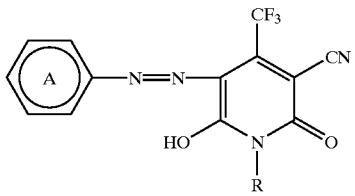

wherein R is H, alkyl, substituted alkyl, cycloalkyl, aryl, or optionally substituted phenyl, and ring A is a benzene ring optionally having a nonionic group. The pigment is prepared by diazotizing an aniline compound and coupling the resulting diazo compound with a pyridone compound. Having a good solubility in an organic solvent and a good dispersibility in water, the pigment facilitates the preparation of an ink containing a high concentration of the pigment homogeneously dissolved or dispersed. The prepared ink enables the preparation of a thermal transfer sheet coated with the ink uniformly in a high density.

British Patent 1,559,001 (Harvey et al.), the disclosure of which is totally incorporated herein by reference, discloses a hydrophilic textile material colored with a dyestuff of the formula

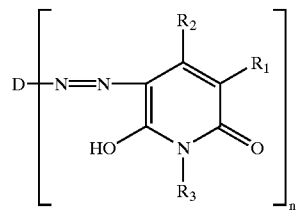

wherein D is the residue of a diazo or tetrazo component; $R_1$ is a hydrogen atom or an alkyl, chloro, acetamido, benzamido, carbamoyl, or an N-substituted carbamyl, for example —CONHBr, group or, preferably, a cyano group; $R_2$ is an alkyl group, especially methyl, optionally substituted with a chlorine atom, a phenyl group, optionally substituted with an alkyl or alkoxy group, or a carboxylic acid or carboxylic acid ester group; or $R_1$ and $R_2$ together with the carbon atoms in the 3- or 4-position of the pyridone ring may form an alicyclic or aromatic ring system so that, for example, $R_1$ and $R_2$ together may be a tri- or tetra-methylene group forming with the pyridone of penteno [c] or hexeno [c] pyrid-2-one, or $R_1$ and $R_2$ may form together with the adjacent carbon atoms of the pyridone ring a benzene ring giving a benz [c] pyrid-2one; $R_3$ is an aryl group carrying one or more substituents selected from —NO, —SO$_2$R$^1$, —COR$^1$, —COOR$^1$, —CF, or —CN, wherein $R^1$ is an optionally substituted alkyl or aryl group; and n is an integer which may be 1 or 2.

German Patent Publication DE 19646430, the disclosure of which is totally incorporated herein by reference, discloses dye mixtures comprising at least two structurally different dyes, each corresponding to formula

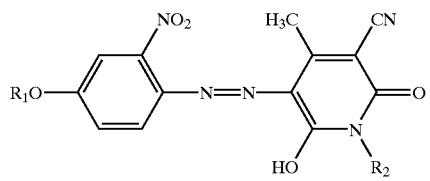

wherein $R_1$ is $C_1$–$C_4$ alkyl; $R_2$ is the $(CH_2)_nO$—$R_5$ radical; $R_5$ is, independently of $R_1$, $C_1$–$C_4$ alkyl or phenyl (which is unsubstituted or substituted by $C_1$–$C_4$ alkyl, $C_1$–$C_4$ alkoxy, hydroxy, or halogen); and n is 2 or 3, which dye mixtures are suitable for dyeing or printing textile fibre materials (e.g. polyester materials), giving dyeings having good around fastness properties.

German Patent Publication DE 19646429, the disclosure of which is totally incorporated herein by reference, discloses dye mixtures comprising at least two structurally different dyes, each of which has the formula

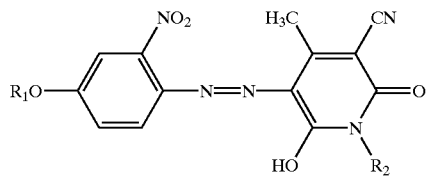

in which $R_1$ is $C_1$–$C_4$ alkyl and $R_2$ is isopropyl, n-butyl, isobutyl, sec-butyl, or tert-butyl; or $C_1$–$C_3$ alkyl which is substituted by phenyl or phenoxy; or $R_1$ is phenyl (which is unsubstituted or substituted by $C_1$–$C_4$ alkyl, $C_1$–$C_4$ alkoxy, hydroxyl, or halogen), $C_1$–$C_4$ alkoxy-$C_1$–$C_3$ alkylene, phenoxy-$C_1$–$C_3$ alkylene, or $C_1$–$C_3$ alkyl which is substituted by phenyl (which is unsubstituted or substituted by $C_1$–$C_4$ alkyl, $C_1$–$C_4$ alkoxy, hydroxyl, or halogen) and $R_2$ is $C_1$–$C_{10}$ alkyl (which is unsubstituted or substituted by hydroxyl, OCOR$_3$, or phenoxy, where the phenyl ring in phenoxy is unsubstituted or substituted by $C_1$–$C_4$ alkyl, $C_1$–$C_4$ alkoxy, hydroxyl, or halogen) and the alkyl chain in $C_1$–$C_{10}$ alkyl from $C_2$ can be interrupted by one or more oxygen atoms; phenyl (which is unsubstituted or substituted by $C_1$–$C_4$ alkyl, $C_1$–$C_4$ alkoxy, hydroxyl, or halogen); or $C_5$–$C_7$ cycloalkyl; and $R_3$ is $C_1$–$C_4$ alkyl, are suitable for dyeing or printing textile fibre materials (e.g. polyester materials) and give dyeings with good allround properties.

German Patent Publication DE 19647869, the disclosure of which is totally incorporated herein by reference, discloses a dye mixture containing at least 2 dyes with different structures, each of formula

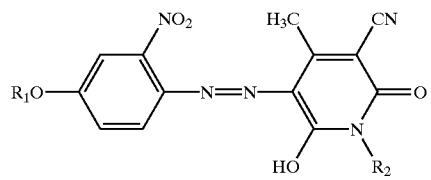

where $R_1$ is a 1–4C alkyl; and $R_2$ is a linear 1–3C alkyl. Also claimed is hydrophobic fibre material, preferably polyester textile material, dyed or printed with the mixture.

PCT Patent Publication WO 99/43754, the disclosure of which is totally incorporated herein by reference, discloses compounds of the formula

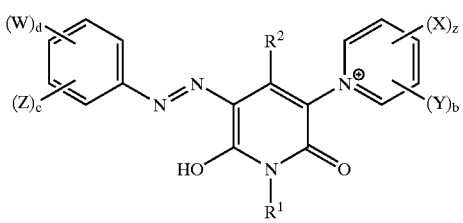

and salts and tautomers thereof, wherein: $R_1$ and $R_2$ each independently is H, optionally substituted alkyl, optionally substituted aryl, or optionally substituted arylalkyl; each W and each X independently is —COOH, —SO$_3$H, —PO$_3$H$_2$, or alkyl substituted by one or more groups selected from —COOH, —SO$_3$H, and —PO$_3$H$_2$; each Y and each Z independently is a substituent other than those defined for W and X; a and d each independently is 1 to 5; b and c each independently is 0 to 4; (a+b) has a value of 5 or: less; and (c+d) has a value of 5 or less. Also claimed are inks containing a compound of this formula, an ink jet printing process using the inks, substrates printed with the inks, and ink jet printer cartridges containing the inks.

U.S. Pat. No. 5,929,218 (Lee et al.), the disclosure of which is totally incorporated herein by reference, discloses pyridone-based yellow monoazo dyes used in thermal transfer having following formula which have good stability and hue

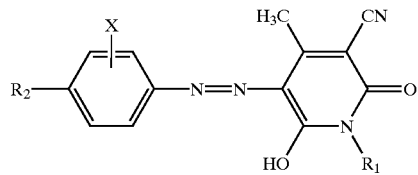

wherein $R_1$ is hydrogen atom; unsubstituted or substituted alkyl group of from 1 to 8 carbon atoms with alkoxy or aryl; or unsubstituted or substituted aryl group with alkoxy or halogen, and X is hydrogen atom; alkyl group of from 1 to 4 carbon atoms; alkoxy group; or halogen; $R_2$ is selected from the following groups;

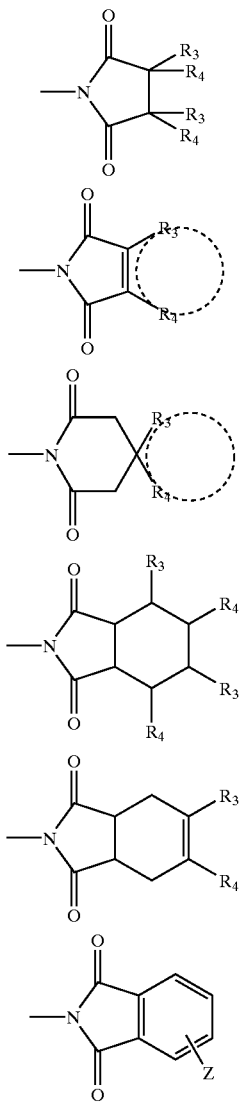

wherein $R_3$ and $R_4$ are independently selected from groups consisting hydrogen, substituted or unsubstituted alkyl group of from 1 to 4 carbon atoms, halogen, alkyl carboxylate, and carbonyl group; $R_3$–$R_4$ is noncyclization with $R_3$ and $R_4$ and selected respectively from the above substituents ($R_3$ and $R_4$); or saturated or unsaturated cycloalkyl of from 3 to 6 carbon atoms, Z is nitro, halogen, alkyl group of from 1 to 4 carbon atoms, alkoxy, sulfonyl, carbonyl, carboxyamide, sulfonamino, cyanpo, hydroxy, or hydrogen atom.

European Patent Publication EP 0 706 679 B1, U.S. Pat. No. 5,853,929 (Campbell), and PCT Patent Publication WO 95/00885, the disclosures of each of which are totally incorporated herein by reference, disclose colored cyan toner for electroreprography and laser printing based on Solvent Blue 70, and a trichomatic set of coloured toners based on Solvent Blue 70, benzodifuranone red dyes, and azo pyridone yellow dyes of the formula

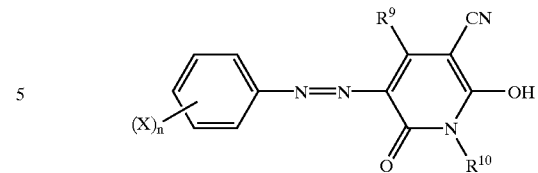

wherein X is halogen, nitro, or a group —$COOR^5$, $R^9$ is $C_{1-4}$ alkyl, $R^{10}$ is $C_{1-12}$ alkyl, $R_5$ is $C_{1-8}$ alkyl or a group of formula —($C_{1-3}$-alkylene)-$(CO)_q$-Z wherein q is 0 or 1 and Z is —$OR^6$ or —$NR^6R^7$ when q=1 or Z is —$OR^8$ when q=0, $R^6$ is selected from optionally substituted $C_{1-8}$ alkyl, optionally substituted $C_{1-8}$ alkoxy-$C_{1-8}$ alkyl, and a second group represented by $R^5$ in which $R^6$ is optionally substituted $C_{1-8}$ alkyl or optionally substituted $C_{1-8}$ alkoxy-$C_{1-8}$ alkyl, $R^7$ is selected from H and optionally substituted $C_{1-8}$ alkyl and $R^8$ is selected from optionally substituted $C_{1-8}$ alkyl optionally substituted $C_{1-8}$ alkoxy-$C_{1-8}$ alkyl, optionally substituted $C_{1-8}$ alkyl sulfonyl or carbonyl, and optionally substituted phenyl sulfonyl or carbamoyl.

European Patent Publication EP 0 247 737, the disclosure of which is totally incorporated herein by reference, discloses a thermal transfer printing sheet suitable for use in a thermal transfer printing process, especially for the conversion of a digital image into a visible print, comprising a substrate having a coating comprising a dye of the formula

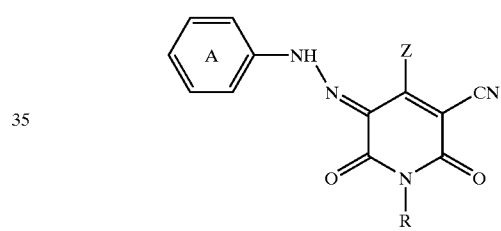

wherein Ring A is unsubstituted or carries, in the 2- or 4-position with respect to the azo link, at least one group selected from —$CX_3$, $X^1$, CN, $NO_2$, —OCO.Y, —CO.Y, —CO.H, —$OSO_2$.Y, and —$SO_2$.Y, provided that A is substituted when Z is $CH_3$ and R is $C_{2-4}$-alkyl; X and $X^1$ are each independently halogen; Y is selected from $R^1$, —$OR^1$, $SR^1$, and —$NR^1R^2$; $R^1$ is selected from $C_{1-12}$-alkyl, $C_{1-12}$-alkyl interrupted by one or two groups selected from —O—, —CO—, O.CO—, and —CO.O—, $C_{3-7}$-cycloalkyl, mono- or bi-cyclic aryl, and $C_{1-3}$-alkylene attached to an adjacent carbon atom on Ring A; $R^2$ is selected from H, $C_{1-12}$-alkyl, $C_{3-7}$-cycloalkyl, and mono- or bi-cyclic aryl; Z is $C_{1-12}$-alkyl or phenyl; and R is selected from $C_{2-12}$-alkyl unbranched in the alpha-position, $C_{2-12}$-alkyl unbranched in alpha-position and interrupted by one or two groups selected from —O—, —CO—, O.CO—, and —CO.O—, phenyl, $C_{1-4}$-alkylphenyl, biphenyl, and biphenyl interrupted by a group selected from —O—, —CO—, O.CO—, and —CO.O—, each of which is free from hydrogen atoms capable of intermolecular hydrogen bonding.

U.S. Pat. No. 5,041,413 (Evans et al.), the disclosure of which is totally incorporated herein by reference, discloses a yellow dye-donor element for thermal dye transfer comprises a support having thereon a dye layer comprising a mixture of yellow dyes dispersed in a polymeric binder, at least one of the yellow dyes having the formula

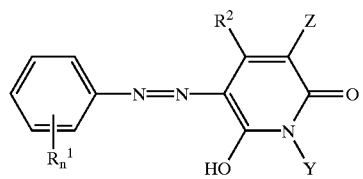

wherein: each $R^1$ independently represents a substituted or unsubstituted alkyl group of from 1 to about 10 carbon atoms, a cycloalkyl group of from about 5 to about 7 carbon atoms; a substituted or unsubstituted allyl group; an aryl group of from about 6 to about 10 carbon atoms; a hetaryl group of from 5 to 10 atoms; acyl; arylsulfonyl; aminocarbonyl; aminosulfonyl; fluorosulfonyl; halogen; nitru; alkylthio; or arylthio; or any two adjacent $R^1$'s together represent the atoms necessary to form a 5- or 6-membered fused ring; n represents an integer from 0–4; $R^2$ represents hydrogen; a substituted or unsubstituted alkyl, cycloalkyl, allyl, aryl or hetaryl group as described above for $R^1$; cyano; acyl; alkylsulfonyl; arylsulfonyl; or alkoxycarbonyl; Z represents cyano; alkoxycarbonyl; acyl; nitro; arylsulfonyl or alkylsulfonyl; Y represents hydrogen; a substituted or unsubstituted alkyl, cycloalkyl, allyl, aryl or hetaryl group as described above for $R^1$; amino; alkylamino; arylamino; acylamino; or sulfonylamino; and at least one of the other of the dyes having the formula

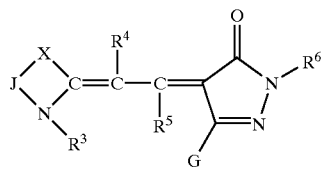

wherein $R^3$ represents the same groups as $R^1$ above; $R^4$ and $R^5$ each independently represents hydrogen, $R^3$; cyano; acyloxy; alkoxy of 1 to about 6 carbon atoms; halogen; or alkoxycarbonyl; or any two of $R^3$, $R^4$ and $R^5$ together represent the atoms necessary to complete a 5- to 7-membered ring; $R^6$ represents the same groups as $R^3$; G represents a substituted or unsubstituted alkyl, cycloalkyl or allyl group as described above for $R^3$, $NR^7R^8$ or $OR^9$; $R^7$ and $R^8$ each independently represents hydrogen, acyl or $R^3$, with the proviso that $R^7$ and $R^8$ cannot both be hydrogen at the same time; or $R^7$ and $R_8$ together represent the atorbs necessary to complete a 5- to 7-membered ring; $R^9$ represents the same groups as $R^3$; X represents $C(R^{10}O)(R^{11})$, S, O or $NR^{10}$; $R^{10}$ and $R^{11}$ each independently represents the same groups as $R^3$; or $R^{10}$ and $R^{11}$ together represent the atoms necessary to complete a 5- to 7-membered ring; and J represents the atoms necessary to complete a 5- or 6-membered ring which may be fused to another ring system.

U.S. Pat. No. 4,359,418 (Lienhard et al.), the disclosure of which is totally incorporated herein by reference, discloses azo dyestuff sulfonic acid salts of the formula

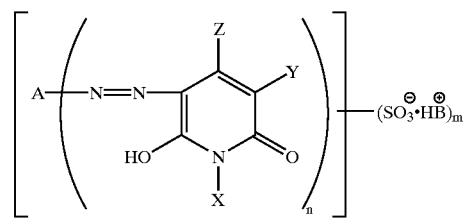

wherein A represents a carbocyclic or heterocyclic aromatic radical, B represents an aliphatic, cycloaliphatic or araliphatic amine, X represents a hydrogen atom or a substituted or unsubstituted alkyl group, a cycloalkyl, aralkyl or ary group, Y represents a hydrogen or halogen atom, a nitro, cyano, acyl, sulfonic acid, arylsulfornyl, alkoxycarbonyl group or a substituted or unsubstituted alkyl, sulfamoyl or carbamoyl group, Z represents a substituted or unsubstituted alkyl group or an aryl radical, m and n are 1 or 2; said dyestuffs salts having good solubility in organic solvents and functioning to color solutions of film forming polymers in yellow to orange shades.

German Patent Publication DE 3538517 and U.S. Pat. No. 5,037,964 (Moser et al.), the disclosures of each of which are totally incorporated herein by reference, disclose sulfonic acid group-free basic azo compounds, which correspond in one of the possible tautomeric forms to the formula

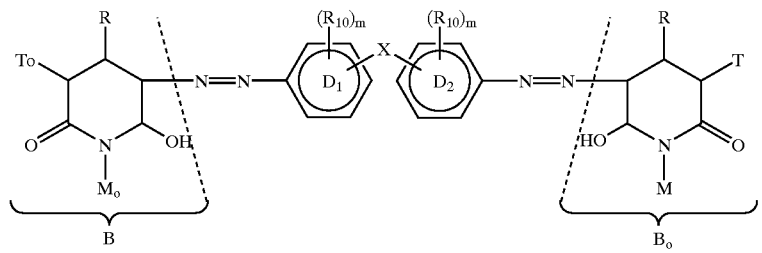

their preparation and their use for dyeing paper.

Japanese Patent Publication JP 03192158, the disclosure of which is totally incorporated herein by reference, discloses obtaining a yellow dye exhibiting high dyeing speed and degree of exhaustion in dyeing a textile material, leather, pulp, paper, etc., as well as excellent brightness and fastness to water by selecting a compound wherein a pyridopyridinium salt is linked to diphenylfluorene through azo groups.

A cationic compound of the formula

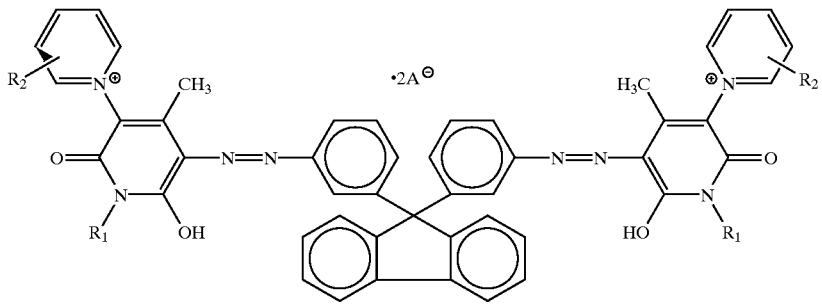

wherein $R_1$ is H or 1–4C alkyl; $R_2$ is H, 1–4C alkyl, or alkoxy; and A is an anion which has a structure wherein a tetrazo compound, of 9,9'-bis(4-anilino)fluorene is coupled with a pyridone derivative is selected as a yellow dye, which is useful for dyeing an unsized pulp or paper (e.g. a napkin, table cloth, or sanitary paper). The dyeing with the dye is carried out at a pH of 4–8, preferably 5–7, and at 10–50° C., preferably 15–30° C.

British Patent Publication GB 2 008 606, the disclosure of which is totally incorporated herein by reference, discloses water-insoluble yellow monoazo dyes suitable for dyeing hydrophobic synthetic fibres, particularly polyesters, having the formula

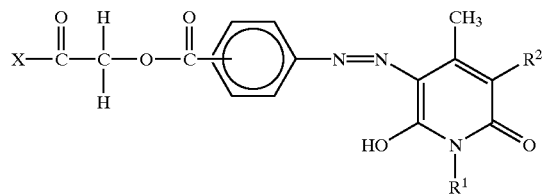

in which X represents $OR^3$ or $NHR^3$, $NR^3R^4$ ($R^3$, $R^4$ together optionally forming with N a ring having 5 to 6 carbon atoms, $NHR^5$; $R^1$ represents a hydrogen atom, an alkyl having 1 to 5 carbon atoms, $(CH_2)_2OH$ or $(CH_2)_3OR^3$; $R^2$ represents CN, $COOR^3$, $CONHR^3$, $CONR^3R^4$ ($R^3$, $R^4$ together optionally forming with N a ring having 5 to 6 carbon atoms); $R^3$ and $R^4$ represent alkyl groups having 1 to 5 carbon atoms; and $R^5$ represents a cycloalkyl having 5 or 6 carbon atoms. The dyes may be prepared by the reaction of

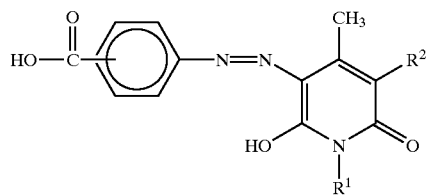

with Hal—$CH_2$—CO—X in which Hal represents Cl or Br.

"Preparation and Evaluation of Yellow Pigments Based on H-Pyridone and Esters of Aminoterephthalic Acid," P. Slosar et al., CHEMagazin, Vol. 9, No. 6, pp. 8–11 (1999), the disclosure of which is totally incorporated herein by reference, discloses yellow pigments based on H-pyridone and esters of aminoterephthalic acid wherein the color strength, brilliance (purity), and deepening of greenish shade were the larger the smaller alkyl is in the carbalkoxy group in o-position towards the azo group and the greater alkyl is in the carbalkoxy group in m-position towards the azo group.

Of potential background interest with respect to the present invention are the following references: U.S. Pat. No. 5,919,839; U.S. Pat. No. 5,827,918; U.S. Pat. No. 4,889,560; U.S. Pat. No. 5,372,852; "Synthesis, Morphology, and Optical Properties of Tetrahedral Oligo(phenylenevinylene) Materials," S. Wang et al., J. Am. Chem. Soc., Vol. 120, p. 5695 (2000); "Syntheses of Amphiphilic Diblock Copolymers Containing a Conjugated Block and Their Self-Assembling Properties," H. Wang et al., J. Am. Chem. Soc., Vol. 122, p. 6855 (2000); "Crystal Engineering of Conjugated Oligomers and the Spectral Signature of π Stacking in Conjugated Oligomers and Polymers," A. Koren et al., Chem. Mater., Vol. 12, p. 1519 (2000); "The Chemistry of Isatoic Anhydride," G. M. Coppola, Synthesis, p. 505 (1980); "Isatoic Anhydride. IV. Reactions with Various Nucleophiles," R. P. Staiger et al., J. Org. Chem., Vol. 24, p. 1214 (1959); "Investigation of the Reaction Conditions for the Synthesis of 4,6-Disubstituted-3-cyano-2-pyridones and 4-Methyl-3-cyano-6-hydroxy-2-pyridone," D. Z. Mijin et al., J. Serb. Chem. Soc., Vol. 59, No. 12, p. 959 (1994); "Synthesis of Isoquinoline Alkaloids. II. The Synthesis and Reactions of 4-Methyl-3-pyridinecarboxaldehyde and Other 4-Methyl-3-substituted Pyridines, J. M. Bobbitt et al., J. Org. Chem., Vol 25, p. 560 (1960); "Synthesis and Dyeing Characteristics of 5-(4-Arylazophenyl) azo-3-cyano-4-methyl-6-hydroxy-2-pyridones," J. Kanhere et al., Indian Journal of Textile Research, Vol. 13, p. 213 (1988); "Synthesis of Some Pyridone Azo Dyes from 1-Substituted 2-Hydroxy-6-pyridone Derivatives and their Colour. Assessment," C. Chen et al., Dyes and Pigments, Vol. 15, p. 69 (1991); German Patent Publication DE 3543360; Japanese Patent Publication JP 2001214083; German Patent Publication DE 3505899; Indian Patent Publication 147527; European Patent Publication EP 0 524 637; European Patent Publication EP 0 529 282; European Patent Publication EP 0 083 553; Japanese Patent Publication JP 2000 62327; Japanese Patent Publication JP 85152563; "Synthesis of 3-Cyano-6-hydroxy-5-(2-(perfluoroalkyl)phenylazo)-2-pyridones and their Application for Dye Diffusion Thermal Transfer Printing," Bull. Chem. Soc. Jpn., 1993, Vol. 66, Iss. 6, Pp.1790–4; European Patent Publication 0 844 287; Europepan Patent Publication 0 404 493; U.S. Pat. No. 5,902,841; U.S. Pat. No. 5,621,022; U.S. Pat. No. 5,006,170; Chinese Patent Publication CN 1115773; German Patent Publication DE 3447117; Japanese Patent Publication JP 5331382; Japanese Patent Publication JP 63210169; Japanese Patent Publication JP 63199764; Japanese Patent Publication JP 63199763; Japanese Patent Publication JP 63199762; Japanese Patent Publication JP 63199761; Japanese Patent Publication JP 63199760; Japanese Patent Publication JP 63071392; Japanese Patent Publication JP 61181865; Japanese Patent Publication JP 61036366; Japanese Patent Publication JP 60152563; Japanese Patent Publication JP 60112862; Japanese Patent Publication JP 60112861; Japanese Patent Publication JP 58149953; Japanese Patent Publication JP 56092961; Japanese Patent Publication JP 56026957; Japanese Patent Publication JP 55099958; Japanese Patent Publication JP 96 11443 (JP8011443); Japanese Patent Publication JP 93169849 (JP5169849); Japanese Patent Publication JP 93 51536 (JP5051536); Japanese Patent Publication JP 90185569 (JP2185569); European Patent Publication 0 319 234; European Patent Publication 0 314 002; European Patent Publication 0 302 401; U.S. Pat. No. 4,734,349; Japanese Patent Publication JP 87290762 (JP62290762); Japanese Patent Publication JP 86244595 (JP61244595); Indian Patent Publication IN 147868; Spanish Patent Publication 475254 (Equivalent of Italian Patent Publication IT 1088895); German Patent Publication DE 2727809; "Colour and Constitution of Azo Dyes Derived from 2-Thioalkyl-4,6-Diaminopyrimidines and 3-Cyano-1,4-dimethyl-6-hydroxy-2-pyridone as Coupling Components," L. Cheng et al., Dyes and Pigments, Vol. 7, No. 5, pp. 373–388 (1986); European Patent Publication 1 168 046; U.S. Pat. No. 4,644,058; Japanese Patent Publication JP 63039380; Japanese Patent Publication JP 54102328; Japanese Patent Publication JP 540703:37; "Trends in Modern Dye Chemistry. Part 10," N. $R_1$ Ayyangar and K. V. Srinivasan, Colourage, Vol. 37, No. 2, pp. 29–30 (Jan. 16, 1990); European Patent Publication EP 0 172 283; Japanese Patent Publication JP 05169854; Japanese Patent Publication JP 04292988; Japanese Patent Publication JP 63161060; Japanese Patent Publication JP 61244595; Korean Patent Publication KR 119563; European Patent Publication EP 0 142 863; European Patent Publication EP 0 023 770; Japanese Patent Publication JP 00239549 (JP2000239549); Japanese Patent Publication JP 11269402; Japanese Patent Publication JP 09041267; Japanese Patent Publication JP 08039941; U.S. Pat. No. 4,994,564; Japanese Patent Publication JP 06294909; Japanese Patent Publication JP 06122829; Japanese Patent Publication JP 05255602; Japanese Patent Publication JP 05051536; Japanese Patent Publication JP 04235093; European Patent Publication EP 0 468 647; European Patent Publication EP 0 063 275; U.S. Pat. No. 4,216,145; and German Patent Publication DE 2606506; the disclosures of each of which are totally incorporated herein by reference.

While known compositions and processes are suitable for their intended purposes, a need remains for new yellow colorant compositions. In addition, a need remains for yellow colorant compositions particularly suitable for use in phase change inks. Further, a need remains for yellow colorants with desirable thermal stability Additionally, a need remains for yellow colorants that exhibit minimal undesirable discoloration when exposed to elevated temperatures. There is also a need for yellow colorants that exhibit a desirable brilliance. In addition, there is a need for yellow colorants that exhibit a desirable hue. Further, there is a need for yellow colorants that are of desirable chroma. Additionally, there is a need for yellow colorants that have desirably high lightfastness characteristics. A need also remains for yellow colorants that have a desirably pleasing color. In addition, a need remains for yellow colorants that exhibit desirable solubility characteristics in phase change ink carrier compositions. Further, a need remains for yellow colorants that enable phase change inks to be jetted at temperatures of over 135° C. while maintaining thermal stability. Additionally, a need remains for yellow colorants that enable phase change inks that generate images with low pile height. There is also a need for yellow colorants that enable phase change inks that generate images that approach lithographic thin image quality. In addition, there is a need for yellow colorants that exhibit oxidative stability. Further, there is a need for yellow colorants that do not precipitate from phase change ink carriers. Additionally, there is a need for yellow colorants that do not, when included in phase change inks, diffuse into adjacently printed inks of different colors. A need also remains for yellow colorants that do not leach from media such as phase change ink carriers into tape adhesives, paper, or the like. In addition, a need remains for yellow colorants that, when incorporated into phase change inks, do not lead to clogging of a phase change ink jet printhead. Further, there is a need for yellow colorants that enable phase change inks that generate images with sharp edges that remain sharp over time. Additionally, there is a need for yellow colorants that enable phase change inks that generate images which retain their high image quality in warm climates. Further, there is a need for yellow colorants that enable phase change inks that generate images of desirably high optical density. Additionally, there is a need for yellow colorants that, because of their good solubility in phase change ink carriers, enable the generation of images of low pile height without the loss of desirably high optical density. A need also remains for yellow colorants that enable the use of substantially reduced amounts of colorant in, for example, an ink without decreasing the color and the spectral properties (L*a*b*) of the ink or jeopardizing the optical density or color of the prints generated with the ink. In addition, a need remains for yellow colorants that enable cost-effective inks.

SUMMARY OF THE INVENTION

The present invention is directed to a process for preparing a diazopyridone compound which comprises (a) preparing a first solution comprising (1) either (A) a dianiline of the formula

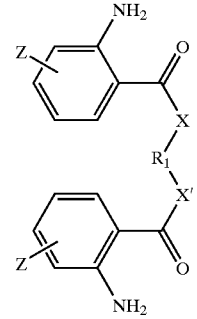

wherein $R_1$ is (i) an alkylene group, (ii) an arylene group, (iii) an arylalkylene group, (iv) an alkylarylene group, (v) an alkyleneoxy group, (vi) an aryleneoxy group, (vii) an arylalkyleneoxy group, (viii) an alkylaryleneoxy group, (ix) a polyalkyleneoxy group, (x) a polyaryleneoxy group, (xi) a polyarylalkyleneoxy group, (xii) a polyalkylaryleneoxy group, (xiii) a heterocyclic group, (xiv) a silylene group, (xv) a siloxane group, (xvi) a polysilylene group, or (xvii); a polysiloxane group, X and X' each, independently of the other, is (i) a direct bond, (ii) an oxygen atom, (iii) a sulfur atom, (iv) a group of the formula —$NR_{40}$— wherein $R_{40}$ is a hydrogen atom, an alkyl group, an aryl group, an arylalkyl group, or an alkylaryl group, or (v) a group of the formula —$CR_{50}R_{60}$— wherein $R_{50}$ and $R_{60}$ each, independently of the other, is a hydrogen atom, an alkyl group, an aryl group, an arylalkyl group, or an alkylaryl group, and Z and Z' each, independently of the other, is (i) a hydrogen atom, (ii) a halogen atom, (iii) a nitro group, (iv) an alkyl group, (v) an aryl group, (vi) an arylalkyl group, (vii) an alkylaryl group, (viii) a group of the formula

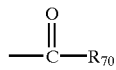

wherein $R_{70}$ is an alkyl group, an aryl group, an arylalkyl group, an alkylaryl group, an alkoxy group, an aryloxy group, an arylalkyloxy group, an alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group, (ix) a sulfonyl group of the formula —$SO_2R_{80}$ wherein $R_{80}$ is a hydrogen atom, an alkyl group, an aryl group, an arylalkyl group, an alkylaryl group, an alkoxy group, an aryloxy group, an arylalkyloxy group, an alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group, or (x) a phosphoryl group of the formula —$PO_3R_{90}$ wherein $R_{90}$ is a hydrogen atom, an alkyl group, an aryl group, an arylalkyl group, an alkylaryl group, an alkoxy group, an aryloxy group, an arylalkyloxy group, an alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group, or (B) an aniline of the formula

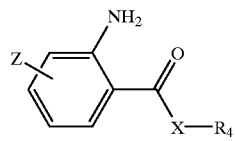

wherein $R_4$ is (i) an alkyl group, (ii) an aryl group, (iii) an arylalkyl group, (iv) an alkylaryl group, (v) an alkoxy group, (vi) an aryloxy group, (vii) an arylalkyloxy group, (viii) an alkylaryloxy group, (ix) a polyalkyleneoxy group, (x) a polyaryleneoxy group, (xi) a polyarylalkyleneoxy group, (xii) a polyalkylaryleneoxy group, (xiii) a heterocyclic group, (xiv) a silyl group, (xv) a siloxane group, (xvi) a polysilylene group, or (xvii) a polysiloxane group, X is (i) a direct bond, (ii) an oxygen atom, (iii) a sulfur atom, (iv) a group of the formula —$NR_{40}$— wherein $R_{40}$ is a hydrogen atom, an alkyl group, an aryl group, an arylalkyl group, or an alkylaryl group, or (v) a group of the formula —$CR_{50}R_{60}$— wherein $R_{50}$ and $R_{60}$ each, independently of the other, is a hydrogen atom, an alkyl group, an aryl group, an arylalkyl group, or an alkylaryl group, and Z is (i) a hydrogen atom, (ii) a halogen atom, (iii) a nitro group, (iv) an alkyl group, (v) an aryl group, (vi) an arylalkyl group, (vii) an alkylaryl group, (viii) a group of the formula

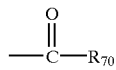

wherein $R_{70}$ is an alkyl group, an aryl group, an arylalkyl group, an alkylaryl group, an alkoxy group, an aryloxy group, an arylalkyloxy group, an alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group, (ix) a sulfonyl group of the formula —$SO_2R_{80}$ wherein $R_{80}$ is a hydrogen atom, an alkyl group, an aryl group, an arylalkyl group, an alkylaryl group, an alkoxy group, an aryloxy group, an arylalkyloxy group, an alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group, or (x) a phosphoryl group of the formula —$PO_3R_{90}$ wherein $R_{90}$ is a hydrogen atom, an alkyl group, an aryl group, an arylalkyl group, an alkylaryl group, an alkoxy group, an aryloxy group, an arylalkyloxy group, an alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group, and (2) a first solvent mixture comprising (I) a solvent, (II) acetic acid, and (III) an optional second acid, said acetic acid being present in the solvent mixture in an amount of at least about 95 percent by weight of the solvent mixture, said first solution being at a temperature of about +15° C. or lower; (b) adding to the first solution nitrosylsulfuric acid, thereby forming a diazonium salt either (A) of the formula

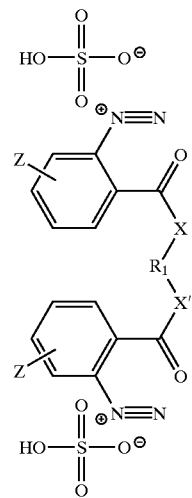

or (B) of the formula

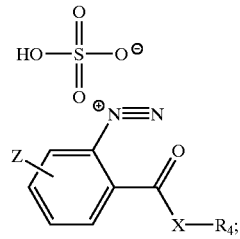

(c) prearing a second solution comprising (1) a second solvent mixture comprising water and an organic solvent soluble in or miscible in water, (2) either (A) a pyridone of the formula

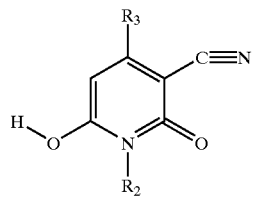

wherein $R_2$ is (i) an alkyl group, (ii) an aryl group, (iii) an arylalkyl group, (iv) an alkylaryl group, (v) an alkoxy group, (vi) an aryloxy group, (vii) a n arylalkyloxy group, (viii) an alkylaryloxy group, (ix) a polyalkyleneoxy group, (x) a polyaryleneoxy group, (xi) a polyarylalkyleneoxy group, (xii) a polyalkylaryleneoxy group, (xiii) a heterocyclic group, (xiv) a silyl group, (xv) a siloxane group, (xvi) a polysilylene group, (xvii) a polysiloxane group, or (xviii) a group of the formula

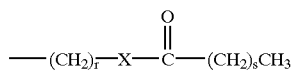

wherein r and s are each, independently of the other, integers representing a number of repeat —$CH_2$— groups, and $R_3$ is (i) an alkyl group, (ii) an aryl group, (iii) an arylalkyl group, or (iv) an alkylaryl group, or (B) a dipyridone of the formula

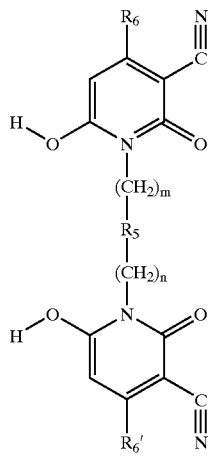

wherein $R_5$ is (i) an alkylene group, (ii) an arylene group, (iii) an arylalkylene group, (iv) an alkylaryiene group, (v) an alkyleneoxy group, (vi) an aryleneoxy group, (vii) an arylalkyleneoxy group, (viii) a alkylaryleneoxy group, (ix) a polyalkyleneoxy group, (x) a polyaryleneoxy group, (xi) a polyarylalkyleneoxy group, (xii) a polyalkylaryleneoxy group, (xiii) a heterocyclic group, (xiv) a silylene group, (xv) a siloxane group, (xvi) a polysilylene group, or (xvii) a polysiloxane group, $R_6$ and $R_6'$ each, independently of the other, is (i) an alkyl group, (ii) an aryl group, (iii) an arylalkyl group, or (iv) an alkylaryl group, n is an integer representing the number of repeat —$CH_2$— units, and m is an integer representing the number of repeat —$CH_2$— units, (3) a base present in an amount of at least about 3 molar equivalents of base per mole of pyridone moiety, and (4) an optional buffer salt, and (d) combining either (A) the second solution containing the dianiline and the first solution containing the pyridone, or (B) the second solution containing the aniline and the first solution containing the dipyridone to form a third solution and effect a coupling reaction to form a diazopyridone compound either (A) of the formula

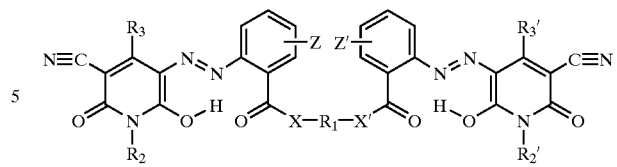

or (B) of the formula

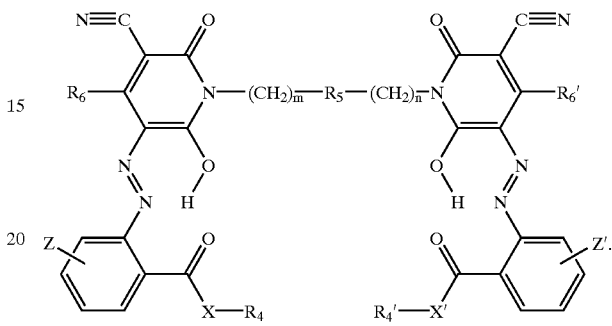

DETAILED DESCRIPTION OF THE INVENTION

The present invention is directed to processes for preparing colorant compounds of the formula

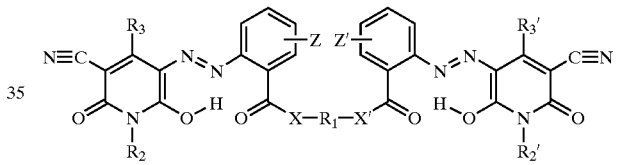

wherein $R_1$ is (i) an alkylene group (including linear, branched, saturated, unsaturated, cyclic, unsubstituted, and substituted alkylene groups, and wherein hetero atoms, such as oxygen, nitrogen, sulfur, silicon, phosphorus, and the like either may or may not be present in the alkylene group), in one embodiment with at least 1carbon atom, in another embodiment with at least about 8 carbon atoms, in yet another embodiment with at least about 10 carbon atoms, in still another embodiment with at least about 12 carbon atoms, in another embodiment with at least about 14 carbon atoms, in yet another embodiment with at least about 16 carbon atoms, in still another embodiment with at least about 18 carbon atoms, in another embodiment with at least about 20 carbon atoms, in yet another embodiment with at least about 22 carbon atoms, in still another embodiment with at least about 24 carbon atoms, in another embodiment with at least about 26 carbon atoms, in yet another embodiment with at least about 28 carbon atoms, in still another embodiment with at least about 30 carbon atoms, in another embodiment with at least about 32 carbon atoms, in yet another embodiment with at least about 34 carbon atoms, and in still another embodiment with at least about 36 carbon atoms, and in one embodiment with no more than about 200 carbon atoms, in another embodiment with no more than about 200 carbon atoms, in yet another embodiment with no more than about 75 carbon atoms, in still another embodiment with no more than about 60 carbon atoms, in another embodiment with no more than about 50 carbon atoms, and in yet another embodiment with no more than about 40 carbon atoms, although the number of carbon atoms can be outside of these ranges, (ii) an arylene group (including unsubstituted and substituted arylene groups), in one embodiment with at least about 6 carbon atoms, in another embodiment with at least about 10 carbon atoms, in yet another embodiment with at least about 13 carbon atoms, in still another embodiment with at least about 14 carbon atoms, in another embodiment with at least about 16 carbon atoms, in yet another embodiment with at least about 17 carbon atoms, in still another embodiment with at least about 18 carbon atoms, in another embodiment with at least about 19 carbon atoms, in yet another embodiment with at least about 20 carbon atoms, in still another embodiment with at least about 21 carbon atoms, in another embodiment with at least about 22 carbon atoms, and in yet another embodiment with at least about 23 carbon atoms, and in one embodiment with no more than about 100 carbon atoms, in another embodiment with no more than about 75 carbon atoms, and in yet another embodiment with no more than about 50 carbon atoms, although the number of carbon atoms can be outside of these ranges, an (iii) arylalkylene group (including unsubstituted and substituted arylalkylene groups), in one embodiment with at least about 7 carbon atoms, in another embodiment with at least about 8 carbon atoms, in another embodiment with at least about 10 carbon atoms, in yet another embodiment with at least about 12 carbon atoms, in still another embodiment with at least about 14 carbon atoms, in another embodiment with at least about 16 carbon atoms, in yet another embodiment with at least about 18 carbon atoms, in still another embodiment with at least about 20 carbon atoms, in another embodiment with at least about 22 carbon atoms, in yet another embodiment with at least about 24 carbon atoms, in still another embodiment with at least about 26 carbon atoms, in another embodiment with at least about 28 carbon atoms, in yet another embodiment with at least about 30 carbon atoms, in still another embodiment with at least about 32 carbon atoms, in another embodiment with at least about 34 carbon atoms, in yet another embodiment with at least about 36 carbon atoms, in another embodiment with at least about 38 carbon atoms, in yet another embodiment with at least about 40 carbon atoms, and in still another embodiment with at least about 42 carbon atoms, and in one embodiment with no more than about 200 carbon atoms, in another embodiment with no more than about 100 carbon atoms, and in yet another embodiment with no more than about 44 carbon atoms, although the number of carbon atoms can be outside of these ranges, (iv) an alkylarylene group (including on substituted and substituted alkylarylene groups), in one embodiment with at least about 7 carbon atoms, in another embodiment with at least about 8 carbon atoms, in another embodiment with at least about 10 carbon atoms, in yet another embodiment with at least about 12 carbon atoms, in still another embodiment with at least about 14 carbon atoms, in another embodiment with at least about 16 carbon atoms, in yet another embodiment with at least about 18 carbon atoms, in still another embodiment with at least about 20 carbon atoms, in another embodiment with at least about 22 carbon atoms, in yet another embodiment with at least about 24 carbon atoms, in still another embodiment with at least about 26 carbon atoms, in another embodiment with at least about 28 carbon atoms, in yet another embodiment with at least about 30 carbon atoms, in still another embodiment with at least about 32 carbon atoms, in another embodiment with at least about 34 carbon atoms, in yet another embodiment with at least about 36 carbon atoms, in another embodiment with at least about 38 carbon atoms, in yet another embodiment with at least about 40 carbon atoms, and in still another embodiment with at least about 42 carbon atoms, and in one embodiment with no more than about 200 carbon atoms, in another embodiment with no more than about 100 carbon atoms, and in yet another embodiment with no more than about 44 carbon atoms, although the number of carbon atoms can be outside of these ranges, (v) an alkyleneoxy group (including linear, branched, saturated, unsaturated, cyclic, unsubstituted, and substituted alkyleneoxy groups, and wherein hetero atoms, such as oxygen, nitrogen, sulfur, silicon, phosphorus, and the like either may or may not be present in the alkyl portion of the alkyleneoxy group), in one embodiment with at least 1 carbon atom, in another embodiment with at least about 8 carbon atoms, in yet another embodiment with at least about 10 carbon atoms, in still another embodiment with at least about 12 carbon atoms, in another embodiment with at least about 14 carbon atoms, in yet another embodiment with at least about 16 carbon atoms, in still another embodiment with at least about 18 carbon atoms, in another embodiment with at least about 20 carbon atoms, in yet another embodiment with at least about 22 carbon atoms, in still another embodiment with at least about 24 carbon atoms, in another embodiment with at least about 26 carbon atoms, in yet another embodiment with at least about 28 carbon atoms, in still another embodiment with at least about 30 carbon atoms, in another embodiment with at least about 32 carbon atoms, in yet another embodiment with at least about 34 carbon atoms, and in still another embodiment with at least about 36 carbon atoms, and in one embodiment with no more than about 200 carbon atoms, in another embodiment with no more than about 100 carbon atoms, in yet another embodiment with no more than about 75 carbon atoms, in still another embodiment with no more than about 60 carbon atoms a in another embodiment with no more than about 50 carbon atoms, and in yet another embodiment with no more than about 40 carbon atoms, although the number of carbon atoms can be outside of these ranges, (vi) an aryleneoxy group (including unsubstituted and substituted aryleneoxy groups), in one embodiment with at least about 6 carbon atoms, in another embodiment with at least about 10 carbon atoms, in yet another embodiment with at least about 13 carbon atoms, in still another embodiment with at least about 14 carbon atoms, in another embodiment with at least about 16 carbon atoms, in yet another embodiment with at least about 17 carbon atoms, in still another embodiment with at least about 18 carbon atoms, in another embodiment with at least about 19 carbon atoms, in yet another embodiment with at least about 20 carbon atoms, in still another embodiment with at least about 21 carbon atoms, in another embodiment with at least about 22 carbon atoms, and in yet another embodiment with at least about 23 carbon atoms, and in one embodiment with no more than about 100 carbon atoms, in another embodiment with no more than about 75 carbon atoms, and in yet another embodiment with no more than about 50 carbon atoms, although the number of carbon atoms can be outside of these ranges, (vii) an arylalkyleneoxy group (including unsubstituted and substituted arylalkyleneoxy groups), in one embodiment with at least about 7 carbon atoms, in another embodiment with at least about 8 carbon atoms, in another embodiment with at least about 10 carbon atoms in yet another embodiment with at least about 12 carbon atoms, in still another embodiment with at least about 14 carbon atoms, in another embodiment with at least about 16 carbon atoms, in yet another embodiment with at least about 18 carbon atoms, in still another embodiment with at least about 20 carbon atoms, in another embodiment with at least about 22 carbon atoms, in yet another embodiment with at least about 24 carbon atoms, in still another embodiment with at least about 26 carbon atoms, in another embodiment with at least about 28 carbon atoms, in yet another embodiment with at least about 30 carbon atoms, in still another embodiment with at least about 32 carbon atoms, in another embodiment with at least about 34 carbon atoms, in yet another embodiment with at least about 36 carbon atoms, in another embodiment with at least about 38 carbon atoms, in yet another embodiment with at least about 40 carbon atoms, and in still another embodiment with at least about 42 carbon atoms, and in one embodiment with no more than about 200 carbon atoms, in another embodiment with no more than about 100 carbon atoms, and in yet another embodiment with no more than about 44 carbon atoms, although the number of carbon atoms can be outside of these ranges, (viii) an alkylaryleneoxy group (including unsubstituted and substituted alkylaryleneoxy groups), in one embodiment with at least about, 7 carbon atoms, in another embodiment with at least about 8 carbon atoms, in another embodiment with at least about 10 carbon atoms, in yet another embodiment with at least about 12 carbon atoms, in still another embodiment with at least about 14 carbon atoms, in another embodiment with at least about 16 carbon atoms, in yet another embodiment with at least about 18 carbon atoms, in still another embodiment with at least about 20 carbon atoms, in another embodiment with at least about 22 carbon atoms, in yet another embodiment with at least about 24 carbon atoms, in still another embodiment with at least about 26 carbon atoms, in another embodiment with at least about 28 carbon atoms, in yet another embodiment with at least about 30 carbon atoms, in still another embodiment with at least about 32 carbon atoms, in another embodiment with at least about 34 carbon atoms, in yet another embodiment with at least about 36 carbon atoms, in another embodiment with at least about 38 carbon atoms, in yet another embodiment with at least about 40 carbon atoms, and in still another embodiment with at least about 42 carbon atoms, and in one embodiment with no more than about 200 carbon atoms, in another embodiment with no more than about 100 carbon atoms, and in yet another embodiment with no more than about 44 carbon atoms, although the number of carbon atoms can be outside of these ranges, (ix) a polyalkyleneoxy group, wherein the alkyl portion of the repeat alkyleneoxy groups typically has from about 1 to about 12 carbon atoms, although the number of carbon atoms can be outside of these ranges, such as a polyethyleneoxy group, a polypropyleneoxy group, a polybutyleneoxy group, or the like, and wherein the number of repeat alkyleneoxy groups typically is from about 2 to about 50 repeat alkyleneoxy groups, although the number of repeat units can be outside of these ranges, (x) a polyaryleneoxy group, wherein the aryl portion of the repeat aryleneoxy groups typically has from about 6 to about 14 carbon atoms, although the number of carbon atoms can be outside of these ranges, such as a polyphenyleneoxy group, a polynaphthaleneoxy group, a polyphenanthreneoxy group, or the like, and wherein the number of repeat aryleneoxy groups typically is from about 2 to about 20 repeat aryleneoxy groups, although the number of repeat units can be outside of these ranges, (xi) a polyarylalkyleneoxy group, wherein the arylalkyl portion of the repeat arylalkyleneoxy groups typically has from about 7 to about 50 carbon atoms, although the number of carbon atoms can be outside of these ranges, such as a polybenzyleneoxy group, a polyphenylethyleneoxy group, or the like, and wherein the number of repeat arylalkyleneoxy groups typically is from about 2 to about 20 repeat arylalkyleneoxy groups, although the number of repeat units can be outside of these ranges, (xii) a polyalkylaryleneoxy group, wherein the alkylaryl portion of the repeat alkylaryleneoxy groups typically has from about 7 to about 50 carbon atoms, although the number of carbon atoms can be outside of these ranges, such as a polytolueneoxy group or the like, and wherein the number of repeat alkylaryleneoxy groups typically is from about 2 to about 20 repeat alkylaryleneoxy groups, although the number of repeat units can be outside of these ranges, (xiii) a heterocyclic group (including unsubstituted and substituted heterocyclic groups), typically with from about 2 to about 12 carbon atoms, and typically with from about 4 to about 18 ring atoms, although the number of carbon atoms and the number of ring atoms can be outside of these ranges, wherein the heteroatoms in the heterocyclic groups can be (but are not limited to) nitrogen, oxygen, sulfur, silicon, phosphorus, and the like, as well as mixtures thereof, (xiv) a silylene group (including unsubstituted and substituted silylene groups), (xv) a siloxane group (including unsubstituted and substituted siloxane groups), (xvi) a polysilylene group (including unsubstituted and substituted polysilylene groups), typically with from 2 to about 100 repeat silylene units, or (xvii) a polysiloxane group (including unsubstituted and substituted polysiloxane groups), typically with from 2 to about 200 repeat siloxane units, although the number of repeat siloxane units can be outside of this range, wherein the substituents on the substituted alkylene, arylene, arylalkylene, alkylarylene, alkyleneoxy, aryleneoxy, arylalkyleneoxy, alkylaryleneoxy, polyalkyleneoxy, polyaryleneoxy, polyarylalkyleneoxy, polyalkylaryleneoxy, heterocyclic, silylene, siloxy, polysilylene, and polysiloxy groups are hydroxy groups, halogen atoms, cyano groups, ether groups, aldehyde groups, ketone groups, carboxylic acid groups, ester groups, amide groups, carbonyl groups, thiocarbonyl groups, sulfate groups, sulfonate groups, sulfide groups, sulfoxide groups, phosphate groups, nitrile groups, mercapto groups, nitro groups, nitroso groups, sulfone groups, acyl groups, acid anhydride groups, azide groups, cyanato groups, isocyanato groups, thiocyanato groups, isothiocyanato groups, mixtures thereof, and the like, wherein the substituents on the silylene, siloxy, polysilylene, and polysiloxy groups can also be alkyl groups, aryl groups, arylalkyl groups, and alkylaryl groups, wherein two or more substituents can be joined together to form a ring.

Some specific examples of suitable R, groups include (but are not limited to) n-hexanediyl, of the formula —$(CH_2)_6$—, n-octanediyl, of the formula —$(CH_2)_8$—, n-decanediyl, of the formula —$(CH_2)_{10}$—, n-dodecanediyl, of the formula —$(CH_2)_{12}$—, 3-methyl-1,5-pentanediyl, of the formula $$-\overset{H}{\underset{H}{C}}-\overset{H}{\underset{H}{C}}-\overset{CH_3}{\underset{H}{C}}-\overset{H}{\underset{H}{C}}-\overset{H}{\underset{H}{C}}-,$$

1,4-cyclohexanedimethylene, of the formula (which is not intended to be limited to any particular stereochemistry and includes all cis and trans isomers)

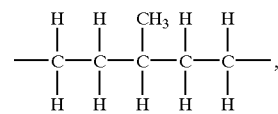

4,4'-isopropylidenedicyclohexanediyl, of the formula (which is not intended to be limited to any particular stereochemistry and includes all cis and trans isomers)

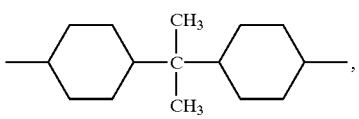

4,4'-bicyclohexyanediyl, of the formula (which is not intended to be limited to any particular stereochemistry and includes all cis and trans isomers)

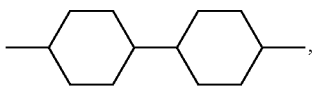

a branched alkylene group having 36 carbon atoms, including isomers of the formula

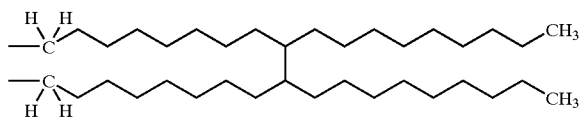

and other branched alkylene isomers (which may include unsaturations and cyclic groups), 4,8-bis(methylene)tricyclo[5210$^{2,6}$]decanediyl, of the formula (which is not intended to be limited to any particular stereochemistry and includes all cis and trans isomers)

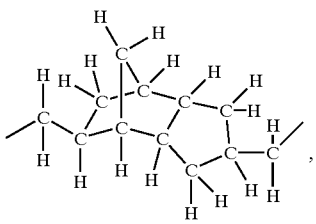

and the like.

$R_2$ and $R_2'$ each, independently of the other, is (i) an alkyl group (including linear, branched, saturated, unsaturated, cyclic, unsubstituted, and substituted alkyl groups, and wherein hetero atoms, such as oxygen, nitrogen, sulfur, silicon, phosphorus, and the like either may or may not be present in the alkyl group), in one embodiment with at least 1 carbon atom, in another embodiment with at least about 8 carbon atoms, in yet another embodiment with at least about 10 carbon atoms, in still another embodiment with at least about 12 carbon atoms, in another embodiment with at least about 14 carbon atoms, in yet another embodiment with at least about 16 carbon atoms, in still another embodiment with at least about 18 carbon atoms, atoms, in yet another embodiment with at least about 20 carbon atom in another embodiment with at least about 20 carbon atoms, in still another embodiment with at least about 22 carbon atoms, in still another embodiment with at least about 24 carbon atoms, in another embodiment with at least about 26 carbon atoms, in yet another embodiment with at least about 28 carbon atoms, in still another embodiment with at least about 30 carbon atoms, in another embodiment with at least about 32 carbon atoms, in yet another embodiment with at least about 34 carbon atoms, and in still another embodiment with at least about 36 carbon atoms, and in one embodiment with no more than about 200 carbon atoms, in another embodiment with no more than about 100 carbon atoms, in yet another embodiment with no more than about 75 carbon atoms, in still another embodiment with no more than about 60 carbon atoms, in another embodiment with no more than about 50 carbon atoms, and in yet another embodiment with no more than about 40 carbon atoms, although the number of carbon atoms can be outside of these ranges, (ii) an aryl group (including unsubstituted and substituted aryl groups), in one embodiment with at least about 6 carbon atoms, in another embodiment with at least about 10 carbon atoms, in yet another embodiment with at least about 13 carbon atoms, in still another embodiment with at least about 14 carbon atoms, in another embodiment with at least about 16 carbon atoms, in yet another embodiment with at least about 17 carbon atoms, in still another embodiment with at least about 18 carbon atoms, in another embodiment with at least about 19 carbon atoms, in yet another embodiment with at least about 20 carbon atoms, in still another embodiment with at least about 21 carbon atoms, in another embodiment with at least about 22 carbon atoms, and in yet another embodiment with at least about 23 carbon atoms, and in yet embodiment with no more than about 100 carbon atoms, in another embodiment with no more than about 75 carbon atoms, and in yet another embodiment with no more than about 50 carbon atoms, although the number of carbon atoms can be outside of these ranges, (iii) an arylalkyl group (including unsubstituted and substituted arylalkyl groups), in one embodiment with at least about 7 carbon atoms, in another embodiment with at least about 8 carbon atoms, in another embodiment with at least about 10 carbon atoms, in yet another embodiment with at least about 12 carbon atoms, in still another embodiment with at least about 14 carbon atoms, in another embodiment with at least about 16 carbon atoms, in yet another embodiment with at least about 18 carbon atoms, in still another embodiment with at least about 20 carbon atoms, in another embodiment with at least about 22 carbon atoms, in yet another embodiment with at least about 24 carbon atoms, in still another embodiment with at least about 24 carbon atoms, in another embodiment with at least about 26 carbon atoms, in another embodiment with at least about 28 carbon atoms, in yet another embodiment with at least about 30 carbon atoms, in still another embodiment with at least about 32 carbon atoms, in another embodiment with at least about 34 carbon atoms, in another embodiment with at least about 36 carbon atoms, in yet another embodiment with at least about 38 carbon atoms, in still another embodiment with at least about 40 carbon atoms, in another embodiment with at least about 42 carbon atoms, in another embodiment with no more than about 200 carbon atoms, in another embodiment with no more than about 100 carbon atoms, and in yet another embodiment with no more than about 44 carbon atoms, although the number of carbon atoms can be outside of these ranges, (iv) an alkylaryl group (including unsubstituted and substituted alkylaryl groups), in one embodiment with at least about 7 carbon atoms, in another embodiment with at least about 8 carbon atoms, in another embodiment with at least about 10 carbon atoms, in yet another embodiment with at least about 12 carbon atoms, in still another embodiment with at least about 14 carbon atoms, in another embodiment with at least about 16 carbon atoms, in yet another embodiment with at least about 18 carbon atoms, in still another embodiment with at least about 20 carbon atoms, in another embodiment with at least about 22 carbon atoms, in yet another embodiment with at least about 24 carbon atoms, in still another embodiment with at least about 26 carbon atoms, in another embodiment with at least about 28 carbon atoms, in yet another embodiment with at least about 30 carbon atoms, in still another embodiment with at least about 32 carbon atoms, in another embodiment with at least about 34 carbon atoms, in yet another embodiment with at least about 36 carbon atoms, in another embodiment with at least about 38 carbon atoms, in yet another embodiment with at least about 40 carbon atoms, and in still another embodiment with at least about 42 carbon atoms, and in one embodiment with no more than about 200 carbon atoms, in another embodiment with no more than about 100 carbon atoms, and in yet another embodiment with no more than about 44 carbon atoms and although the number of carbon atoms can be outside of these ranges, (v) an alkoxy group (including linear, branched, saturated, unsaturated, cyclic, unsubstituted, and substituted alkoxy groups, and wherein hetero atoms, such as oxygen, nitrogen, sulfur, silicon, phosphorus, and the like either may or may not be present in the alkyl portion of the alkoxy group), in one embodiment with at least 1 carbon atom, in another embodiment with at least about 8 carbon atoms, in yet another embodiment with at least about 10 carbon atoms, in still another embodiment with at least about 12 carbon atoms, in another embodiment with at least about 14 carbon atoms, in yet another embodiment with at least about 16 carbon atoms, in still another embodiment with at least about 18 carbon atoms, in another embodiment with at least about 20 carbon atoms, in yet another embodiment with at least about 22 carbon atoms, in still another embodiment with at least about 24 carbon atoms, in another embodiment with at least about 26 carbon atoms, in yet another embodiment with at least about 28 carbon atoms, in still another embodiment with at least about 30 carbon atoms, in another embodiment with at least about 32 carbon atoms, in yet another embodiment with at least about 34 carbon atoms, and in still another embodiment with at least about 36 carbon atoms, and in one embodiment with no more than about 200 carbon atoms, in another embodiment with no more than about 100 carbon atoms, in yet another embodiment with no more than about 75 carbon atoms, in still another embodiment with no more than about 60 carbon atoms, in another embodiment with no more than about 50 carbon atoms, and in yet another embodiment with no more than about 40 carbon atoms, although the number of carbon atoms can be outside of these ranges, (vi) an aryloxy group (including unsubstituted and substituted aryloxy groups), in one embodiment with at least about 6 carbon atoms, in another embodiment with at least about 10 carbon atoms, in yet another embodiment with at least about 13 carbon atoms, in still another embodiment with at least about 14 carbon atoms, in another embodiment with at least about 16 carbon atoms, in yet another embodiment with at least about 17 carbon atoms, in still another embodiment with at least about 18 carbon atoms, in another embodiment with at least about 19 carbon atoms, in yet another embodiment with at least about 20 carbon atoms, in still another embodiment with at least about 21 carbon atoms, in another embodiment with at least about 22 carbon atoms, and in yet another embodiment with at least about 23 carbon atoms, and in one embodiment with no more than about 100 carbon atoms, in another embodiment with no more than about 75 carbon atoms, and in yet another embodiment with no more than about 50 carbon atoms, although the number of carbon atoms can be outside of these ranges, (vii) an arylalkyloxy group (including unsubstituted and substituted arylalkyloxy groups), in one embodiment with at least about 7 carbon atoms, in another embodiment with at least about 8 carbon atoms, in another embodiment with at least about 10 carbon atoms, in yet another embodiment with at least about 12 carbon atoms, in still another embodiment with at least about 14 carbon atoms, in another embodiment with at least about 16 carbon atoms, in yet another embodiment with at least about 18 carbon atoms, in still another embodiment with at least about 20 carbon atoms, in another embodiment with at least about 22 carbon atoms, in yet another embodiment with at least about 24 carbon atoms, in still another embodiment with at least about 26 carbon atoms, in another embodiment with at least about 28 carbon atoms, in yet another embodiment with at least about 30 carbon atoms, in still another embodiment with at least about 32 carbon atoms, in another embodiment with at least about 34 carbon atoms, in yet another embodiment with at least about 36 carbon atoms, in another embodiment with at least about 38 carbon atoms, in yet another embodiment with at least about 40 carbon atoms, and in still another embodiment with at least about 42 carbon atoms, and in one embodiment with no more than about 200 carbon atoms, in another embodiment with no more than about 100 carbon atoms, and in yet another embodiment with no more than about 44 carbon atoms, although the number of carbon atoms can be outside of these ranges, (viii) an alkylaryloxy group (including unsubstituted and substituted alkylaryloxy groups), in one embodiment with at least about 7 carbon atoms, in another embodiment with at least about 8 carbon atoms, in another embodiment with at least about 10 carbon atoms, in yet another embodiment with at least about 12 carbon atoms, in still another embodiment with at least about 14 carbon atoms, in another embodiment with at least about 16 carbon atoms, in yet another embodiment with at least about 18 carbon atoms, in still another embodiment with at least about 20 carbon atoms, in another embodiment with at least about 22 carbon atoms, in yet another embodiment with at least about 24 carbon atoms, in still another embodiment with at least about 26 carbon atoms, in another embodiment with at least about 28 carbon atoms, in yet another embodiment with at least about 30 carbon atoms, in still another embodiment with at least about 32 carbon atoms, in another embodiment with at least about 34 carbon atoms, in yet another embodiment with at least about 36 carbon atoms, in another embodiment with at least about 38 carbon atoms, in yet another embodiment with at least about 40 carbon atoms, and in still another embodiment with at least about 40 carbon atoms, and in still another embodiment with at least about 42 carbon atoms, and in one embodiment with no more than about 200 carbon atoms, in another embodiment with no more than about 100 carbon atoms, and in yet another embodiment with no more than about 44 carbon atoms, although the number of carbon atoms can be outside of these ranges, (ix) a polyalkyleneoxy group, wherein the alkyl portion of the repeat alkyleneoxy groups typically has from about 1 to about 12 carbon atoms, although the number of carbon atoms can be outside of these ranges, such as a polyethyleneoxy group, a polypropyleneoxy group, a polybutyleneoxy group, or the like, and wherein the number of repeat alkyleneoxy groups typically is from about 2 to about 50 repeat alkyleneoxy groups, although the number of repeat units can be outside of these ranges, (x) a polyaryleneoxy group, wherein the aryl portion of the repeat aryleneoxy groups typically has from about 6 to about 14 carbon atoms, although the number of carbon atoms can be outside of these ranges, such as a polyphenyleneoxy group, a polynaphthaleneoxy group, a polyphenanthreneoxy group, or the like, and wherein the number of repeat aryleneoxy groups typically is from about 2 to about 20 repeat aryleneoxy groups, although the number of repeat units can be outside of these ranges, (xi) a polyarylalkyleneoxy group, wherein the arylalkyl portion of the repeat arylalkylenegxy groups typically has from about 7 to about 50 carbon atoms, although the number of carbon atoms can be outside of these ranges, such as a polybenzyleneoxy group, a polyphenylethyleneoxy group, or the like, and wherein the number of repeat arylalkyleneoxy groups typically is from about 2 to about 20 repeat arylalkyleneoxy groups, although the number of repeat units can be outside of these ranges, (xii), a polyalkylaryleneoxy group, wherein the alkylaryl portion of the repeat alkylaryleneoxy groups typically has from about 7 to about 50 carbon atoms, although the number of carbon atoms can be outside of these ranges, such as a polytolueneoxy group or the like, and wherein the number of repeat alkylaryleneoxy groups typically is from about 2 to about 20 repeat alkylaryleneoxy groups, although the number of repeat units can be outside of these ranges, (xiii) a heterocyclic group (including unsubstituted and substituted heterocyclic groups), typically with from about 2 to about 12 carbon atoms, and typically with from about 4 to about 18 ring atoms, although the number of carbon atoms and the number of ring atoms can be outside of these ranges, wherein the heteroatoms in the heterocyclic groups can be (but are not limited to) nitrogen, oxygen, sulfur, silicon, phosphorus, and the like, as well as mixtures thereof, (xiv) a silyl group (including unsubstituted and substituted silyl groups), (xv) a siloxane group (including unsubstituted and substituted siloxane groups), (xvi) a polysilylene group (including unsubstituted and substituted polysilylene groups), typically with from 2 to about 100 repeat silylene units, (xvii) a polysiloxane group (including unsubstituted and substituted polysiloxane groups), typically with from, 2 to about 200 repeat siloxane units, although the number of repeat siloxane units can be outside of this range, or (xviii) a group of the formula

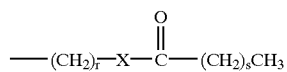

wherein r is an integer representing the number of repeat —CH$_2$— groups, in one embodiment being at least 1, in another embodiment at least about 5, and in yet another embodiment at least about 10, and in one embodiment being no more than about 100, in another embodiment no more than about 50, and in yet another embodiment no more than about 25, although the value of r can be outside of these ranges, and wherein s is an integer representing the number of repeating —CH$_2$— groups, in one embodiment being at least 1, in another embodiment at least about 5, and in yet another embodiment at least about 10, and in one embodiment being no more than about 100, in another embodiment no more than about 50, and in yet another embodiment no more than about 25, although the value of s can be outside of these ranges, wherein the substituents on the substituted alkyl, aryl, arylalkyl, alkylaryl, alkoxy, aryloxy, arylalkyloxy, alkylaryloxy, polyalkyleneoxy, polyaryleneoxy, polyarylalkyleneoxy, polyalkylaryleneoxy, heterocyclic, silyl, siloxy, polysilylene, and polysiloxy groups are hydroxy groups, halogen atoms, cyano groups, ether groups, aldehyde groups, ketone groups, carboxylic acid groups, ester groups, amide groups, carbonyl groups, thiocarbonyl groups, sulfate groups, sulfonate groups, sulfide groups, sulfoxide groups, phosphate groups, nitrile groups, mercapto groups, nitro groups, nitroso groups, sulfone groups, acyl groups, acid anhydride groups, azide groups, cyanato groups, isocyanato groups, thiocyanato groups, isothiocyanato groups, mixtures thereof, and the like, wherein the substituents on the silylene, siloxy, polysilylene, and polysiloxy groups can also be alkyl groups, aryl groups, arylalkyl groups, and alkylaryl groups, wherein two or more substituents can be joined together to form a ring, and wherein R$_2$ and R$_2$' can be the same as each other or different from each other.

Some specific examples of suitable R$_2$ and R$_2$' groups include (but are not limited to) ethyl, of the formula —CH$_2$CH$_3$, n-butyl, of the formula —(CH$_2$)$_3$CH$_3$, n-octyl, of the formula —(CH$_2$)$_7$CH$_3$, n-decyl, of the formula —(CH$_2$)$_9$CH$_3$, n-dodecyl, of the formula —(CH$_2$)$_{11}$CH$_3$, n-tetradecyl, of the formula —(CH$_2$)$_{13}$CH$_3$, ethyl, of the formula —(CH$_2$)$_{15}$CH$_3$, stearyl, of the formula —(CH$_2$)$_{17}$CH$_3$, 2-ethylhexyl, of the formula

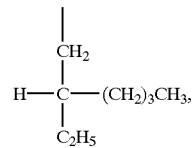

abietyl, including groups of the formula

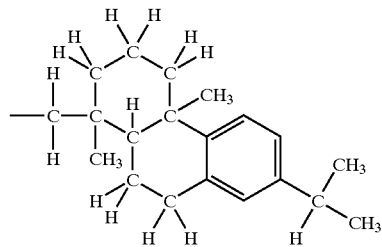

as well as hydrogenated and dehydrogenated isomers of the above formula that are also derivatives of the rosin-derived natural product abietic acid, such as didehydroabietyl and the like, 3-propyl octadecanoyl, of the formula

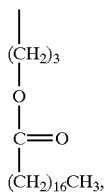

2,2-dimethyl-1,3-dioxolane-4-methylene, of the formula

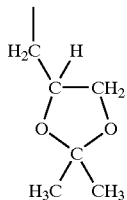

and the like.

$R_3$ and $R_3'$ each, independently of the other, is (i) an alkyl group (including linear, branched, saturated, unsaturated, cyclic, unsubstituted, and substituted alkyl groups, and wherein hetero atoms, such as oxygen, nitrogen, sulfur, silicon, phosphorus, and the like can be present in the alkyl group), typically with from 1 to about 100 carbon atoms, preferably with from about 1 to about 10 carbon atoms, and more preferably with from about 1 to about 5 carbon atoms, although the number of carbon atoms can be outside of these ranges, (ii) an aryl group (including unsubstituted and substituted aryl groups), typically with from about 6 to about 100 carbon atoms, and preferably with from about 6 to about 10 carbon atoms, although the number of carbon atoms can be outside of these ranges, (iii) an arylalkyl group (including unsubstituted and substituted arylalkyl groups), typically with from about 7 to about 100 carbon atoms, and preferably with from about 7 to about 10 carbon atoms, although the number of carbon atoms can be outside of these ranges, or (iv) an alkylaryl group (including unsubstituted and substituted alkylaryl groups), typically with from about 7 to about 100 carbon atoms, and preferably with from about 7 to about 10 carbon atoms, although the number of carbon atoms can be outside of these ranges, wherein the substituents on the substituted alkyl, aryl, arylalkyl, and alkylaryl groups can be (but are not limited to) hydroxy groups, halogen atoms, amine groups, amine groups, ammonium groups, pyridine groups, pyridinium groups, ether groups, aldehyde groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, cyanato groups, isocyanato groups, thiocyanato groups, isothiocyanato groups, mixtures thereof, and the like, wherein two or more substituents can be joined together to form a ring, and wherein $R_3$ and $R_3'$ can be the same as each other or different from each other.

Specific examples of suitable $R_3$ and $R_3'$ groups include methyl (—$CH_3$), linear alkyl groups of the formula —$(CH_2)_cH_3$ wherein c is an integer of 1, 2, 3, 4, 5, 6, 7, 8, or 9, and the like.

X and X' each, independently of the others, is (i) a direct bond, (ii) an oxygen atom, (iii) a sulfur atom, (iv) a group of the formula —$NR_{40}$— wherein $R_{40}$ is a hydrogen atom, an alkyl group (including linear, branched, saturated, unsaturated, cyclic, unsubstituted, and substituted alkyl groups, and wherein hetero atoms, such as oxygen, nitrogen, sulfur, silicon, phosphorus, and the like either may or may not be present in the alkyl group), typically with from 1 to about 50 carbon atoms, preferably with from about 2 to about 20 carbon atoms, and more preferably with from about 4 to about 12 carbon atoms, although the number of carbon atoms can be outside of these ranges, an aryl group (including substituted aryl groups), typically with from about 6 to about 50 carbon atoms, preferably with from about 6 to about 20 carbon atoms, and more preferably with from about 6 to about 10 carbon atoms, although the number of carbon atoms can be outside of these ranges, an arylalkyl group (including substituted arylalkyl groups), typically with from about 7 to about 100 carbon atoms, preferably with from about 7 to about 50 carbon atoms, and more preferably with from about 7 to about 20 carbon atoms, although the number of carbon atoms can be outside of these ranges, or an alkylaryl group (including substituted alkylaryl groups), typically with from about 7 to about 100 carbon atoms, preferably with from about 7 to about 50 carbon atoms, and more preferably with from about 7 to about 220 carbon atoms, although the number of carbon atoms can be outside of these ranges, or (v) a group of the formula —$CR_{50}R_{60}$— wherein $R_{50}$ and $R_{60}$ each, independently of the other, is a hydrogen atom, an alkyl group (including linear, branched, saturated, unsaturated, cyclic, unsubstituted, and substituted alkyl groups, and wherein hetero atoms, such as oxygen, nitrogen, sulfur, silicon, phosphorus, and the like either may or may not be present in the alkyl group), typically with from 1 to about 50 carbon atoms, preferably with from about 2 to about 20 carbon atoms, and more preferably with from about 4 to about 12 carbon atoms, although the number of carbon atoms can be outside of these ranges, an aryl group (including substituted aryl groups), typically with from about 6 to about 50 carbon atoms, preferably with from about 6 to about 20 carbon atoms, and more preferably with from about 6 to about 10 carbon atoms, although the number of carbon atoms can be outside of these ranges, an arylalkyl group (including substituted arylalkyl groups), typically with from about 7 to about 100 carbon atoms, preferably with from about 7 to about 50 carbon atoms, and more preferably with from about 7 to about 20 carbon atoms, although the number of carbon atoms can be outside of these ranges, or an alkylaryl group (including substituted alkylaryl groups), typically with from about 7 to about 100 carbon atoms, preferably with from about 7 to about 50 carbon atoms, and more preferably with from about 7 to about 20 carbon atoms, although the number of carbon atoms can be outside of these ranges, wherein the substituents on the substituted alkyl, aryl, arylalkyl, and alkylaryl groups can be (but are not limited to) hydroxy groups, halogen atoms, amine groups, amine groups, ammonium groups, pyridine groups, pyridinium groups, ether groups, aldehyde groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, cyanato groups, isocyanato groups, thiocyanato groups, isothiocyanato groups, mixtures thereof, and the like, wherein two or more substituents can be joined together to form a ring, and wherein X and X' can be the same as each other or different from each other.

Z and Z' each, independently of the others, is (i) a hydrogen atom, (ii) a halogen atom, including fluorine, chlorine, bromine, and iodine, (iii) a nitro group, (iv) an alkyl group (including linear, branched, saturated, unsaturated, cyclic, unsubstituted, and substituted alkyl groups, and wherein hetero atoms, such as oxygen, nitrogen, sulfur, silicon, phosphorus, and the like either may or may not be present in the alkyl group), typically with from 1 to about 50 carbon atoms, preferably with from about 1 to about 20 carbon atoms, and more preferably with from about 1 to about 10 carbon atoms, although the number of carbon atoms can be outside of these ranges, (v) an aryl group (including substituted aryl groups), typically with from about 6 to about 50 carbon atoms, preferably with from about 6 to about 14 carbon atoms, and more preferably with from about 6 to about, 10 carbon atoms, although the number of carbon atoms can be outside of these ranges, (vi) an arylalkyl group (including substituted arylalkyl groups), typically with from about 7 to about 50 carbon atoms, preferably with from about 7 to about 25 carbon atoms, and more preferably with from about 7 to about 15 carbon atoms, although the number of carbon atoms can be outside of these ranges, (vii) an alkylaryl group (including substituted alkylaryl groups), typically with from about 7 to about 50 carbon atoms, preferably with from about 7 to about 25 carbon atoms, and more preferably with from about 7 to about 15 carbon atoms, although the number of carbon atoms can be outside of these ranges, (viii) a group of the formula

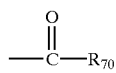

wherein $R_{70}$ is an alkyl group (including linear, branched, saturated, unsaturated, cyclic, unsubstituted, and substituted alkyl groups, and wherein hetero atoms, such as oxygen, nitrogen, sulfur, silicon, phosphorus, and the like either may or may not be present in the alkyl group), typically with from 1 to about 50 carbon atoms, preferably with from about 1 to about 20 carbon atoms, and more preferably with from about 1 to about 10 carbon atoms, although the number of carbon atoms can be outside of these ranges, an aryl group (including substituted aryl groups), typically with from about 6 to about 50 carbon atoms, preferably with from about 6 to about 20 carbon atoms, and more preferably with from about 6 to about 14 carbon atoms, although the number of carbon atoms can be outside of these ranges, an arylalkyl group (including substituted arylalkyl groups), typically with from about 7 to about 50 carbon atoms, preferably with from about 7 to about 25 carbon atoms, and more preferably with from about 7 to about 15 carbon atoms, although the number of carbon atoms can be outside of these ranges, an alkylaryl group (including substituted alkylaryl groups), typically with from about 7 to about 50 carbon atoms, preferably with from about 7 to about 25 carbon atoms, and more preferably with from about 7 to about 15 carbon atoms, although the number of carbon atoms can be outside of these ranges, an alkoxy group (including linear, branched, saturated, unsaturated, cyclic, unsubstituted, and substituted alkoxy groups, and wherein hetero atomys, such as oxygen, nitrogen, sulfur, silicon; phosphorus, and the like either may or may not be present in the alkyl portion of the alkoxy group), typically with from about 1 to about 50 carbon atoms, preferably with from about 4 to about 20 carbon atoms, and more preferably with from about 8 to about 12 carbon atoms, although the number of carbon atoms can be outside of these ranges, an aryloxy group (including substituted aryloxy groups), typically with from about 6 to about 50 carbon atoms, preferably with from about 6 to about 20 carbon atoms, and more preferably with from about 6 to about 14 carbon atoms, although the number of carbon atoms can be outside of these ranges, an arylalkyloxy group (including substituted arylalkyloxy groups), typically with from about 7 to about 50 carbon atoms, preferably with from about 7 to about 25 carbon atoms, and more preferably with from about 7 to about 15 carbon atoms, although the number of carbon atoms can be outside of these ranges, an alkylaryloxy group (including substituted alkylaryloxy groups), typically with from about 7 to about 50 carbon atoms, preferably with from about 7 to about 25 carbon atoms, and more preferably with from about 7 to about 15 carbon atoms, although the number of carbon atoms can be outside of these ranges, a polyalkyleneoxy group, wherein the alkyl portion of the repeat alkyleneoxy groups typically has from about 1 to about 12 carbon atoms, although the number of carbon atoms can be outside of these ranges, such as a polyethyleneoxy group, a polypropyleneoxy group, a polybutyleneoxy group, or the like, and wherein the number of repeat alkyleneoxy groups typically is from about 2 to about 50 repeat alkyleneoxy groups, although the number of repeat units can be outside of these ranges, a polyaryleneoxy group, wherein the aryl portion of the repeat aryleneoxy groups typically has from about 6 to about 14 carbon atoms, although the number of carbon atoms can be outside of these ranges, such as a polyphenyleneoxy group, a polynaphthaleneoxy group, a polyphenanthreneoxy group, or the like, and wherein the number of repeat aryleneoxy groups typically is from about 2 to about 20 repeat aryleneoxy groups, although the number of repeat units can be outside of these ranges, a polyarylalkyleneoxy group, wherein the arylalkyl portion of the repeat arylalkyleneoxy groups typically has from about 7 to about 50 carbon atoms, although the number of carbon atoms can be outside of these ranges, such as a polybenzyleneoxy group, a polyphenylethyleneoxy group, or the like, and wherein the number of repeat arylalkyleneoxy groups typically is from about 2 to about 20 repeat arylalkyleneoxy groups, although the number of repeat units can be outside of these ranges, a polyalkylaryleneoxy group, wherein the alkylaryl portion of the repeat alkylaryleneoxy groups typically has from about 7 to about 50 carbon atoms, although the number of carbon atoms can be outside of these ranges, such as a polytolueneoxy group or the like, and wherein the number of repeat alkylaryleneoxy groups typically is from about 2 to about 20 repeat alkylaryleneoxy groups, although the number of repeat units can be outside of these ranges, a heterocyclic group (including unsubstituted and substituted heterocyclic groups), typically with from about 2 to about 12 carbon atoms, and typically with from about 4 to about 18 ring atoms, although the number of carbon atoms and the number of ring atoms can be outside of these ranges, wherein the heteroatoms in the heterocyclic groups can be (but are not limited to) nitrogen, oxygen, sulfur, silicon, phosphorus, and the like, as well as mixtures thereof, a silyl group (including unsubstituted and substituted silyl groups), a siloxane group (including unsubstituted and substituted siloxane groups), a polysilylene group (including unsubstituted and substituted polysilylene groups), typically with from 2 to about 100 repeat silylene units, or a polysiloxane group (including unsubstituted and substituted polysiloxane groups), typically with from 2 to about 1200 repeat siloxane units, although the number of repeat siloxane units can be outside of this range, (ix) a sulfonyl group of the formula —SO$_2$R$_{80}$, wherein R$_{80}$ is a hydrogen atom, an alkyl group (including linear, branched, saturated, unsaturated, cyclic, unsubstituted, and substituted alkyl groups, and wherein hetero atoms, such as oxygen, nitrogen, sulfur, silicon, phosphorus, and the like either may or may not be present in the alkyl group), typically with from 1 to about 50 carbon atoms, preferably with from about 1 to about 20 carbon atoms, and more preferably with from about 1 to about 10 carbon atoms, although the number of carbon atoms can be outside of these ranges, an aryl group (including substituted aryl groups), typically with from about 6 to about 50 carbon atoms, preferably with from about 6 to about, 20 carbon atoms, and more preferably with from about 6 to about, 14 carbon atoms, although the number of carbon atoms can be outside of these ranges, an arylalkyl group (including substituted arylalkyl groups), typically with from about 7 to about 50 carbon atoms, preferably with from about 7 to about 25 carbon atoms, and more preferably with from about 7 to about 15 carbon atoms, although the number of carbon atoms can be outside of these ranges, an alkylaryl group (including substituted alkylaryl groups), typically with from about 7 to about 50 carbon atoms, preferably with from about 7 to about 25 carbon atoms, and more preferably with from about 7 to about 15 carbon atoms, although the number of carbon atoms can be outside of these ranges, an alkoxy group (including linear, branched, saturated, unsaturated, cyclic, unsubstituted, and substituted alkoxy groups, and wherein hetero atoms, such as oxygen, nitrogen, sulfur, silicon, phosphorus, and the like either may or may not be present in the alkyl portion of the alkoxy group), typically with from about 1 to about 50 carbon atoms, preferably with from about 4 to about 20 carbon atoms, and more preferably with from about 8 to about 12 carbon atoms, although the number of carbon atoms can be outside of these ranges, an aryloxy group (including substituted aryloxy groups), typically with from about 6 to about 50 carbon atoms, preferably with from about 6 to about 20 carbon atoms, and more preferably with from about 6 to about 14 carbon atoms, although the number of carbon atoms can be outside of these ranges, an arylalkyloxy group (including substituted arylalkyloxy groups), typically with from about 7 to about 50 carbon atoms, preferably with from about 7 to about 25 carbon atoms, and more preferably with from about 7 to about 15 carbon atoms, although the number of carbon atoms can be outside of these ranges, an alkylaryloxy group (including substituted alkylaryloxy groups), typically with from about 7 to about 50 carbon atoms, preferably with from about 7 to about 25 carbon atoms, and more preferably with from about 7 to about 15 carbon atoms, although the number of carbon atoms can be outside of these ranges, a polyalkyleneoxy group, wherein the alkyl portion of the repeat alkyleneoxy groups typically has from about 1 to about 12 carbon atoms, although the number of carbon atoms can be outside of these ranges, such as a polyethyleneoxy group, a polypropyleneoxy group, a polybutyleneoxy group, or the like, and wherein the number of repeat alkylenedoxy groups typically is from about 2 to about 50 repeat alkyleneoxy groups, although the number of repeat units can be outside of these ranges, a polyaryleneoxy group, wherein the aryl portion of the repeat aryleneoxy groups typically has from about 6 to about 14 carbon atoms, although the number of carbon atoms can be outside of these ranges, such as a polyphenyleneoxy group, a polynaphthaleneoxy group, a polyphenanthreneoxy group, or the like, and wherein the number of repeat aryleneoxy groups typically is from about 2 to about 20 repeat aryleneoxy groups, although the number of repeat units can be outside of these ranges, a polyarylalkyleneoxy group, wherein the arylalkyl portion of the repeat arylalkyleneoxy groups typically has from about 7 to about 50 carbon atoms, although the number of carbon atoms can be outside of these ranges, such as a polybenzyleneoxy group, a polyphenylethyleneoxy group, or the like, and wherein the number of repeat arylalkyleneoxy groups typically is from about 2 to about 20 repeat arylalkyleneoxy groups, although the number of repeat units can be outside of these ranges, a polyalkylaryleneoxy group, wherein the alkylaryl portion of the repeat alkylaryleneoxy groups typically has from about 7 to about 50 carbon atoms, although the number of carbon atoms can be outside of these ranges, such as a polytolueneoxy group or the like, and wherein the number of repeat alkylaryleneoxy groups typically is from about 2 to about 20 repeat alkylaryleneoxy groups, although the number of repeat units can be outside of these ranges, a heterocyclic group (including unsubstituted and substituted heterocyclic groups), typically with from about 2 to about 12 carbon atoms, and typically with from about 4 to about 18 ring atoms, although the number of carbon atoms and the number of ring atoms can be outside of these ranges, wherein the heteroatorns in the heterocyclic groups can be (but are not limited to) nitrogen, oxygen, sulfur, silicon, phosphorus, and the like, as well as mixtures thereof, a silyl group (including unsubstituted and substituted silyl groups), a siloxane group (including unsubstituted and substituted siloxane groups), a polysilylene group (including unsubstituted and substituted polysilylene groups), typically with from 2 to about 100 repeat silylene units, or a polysiloxane group (including unsubstituted and substituted polysiloxane groups), typically with from 2 to about 200 repeat siloxane units, although the number of repeat siloxane units can be outside of this range, or (x) a phosphoryl group of the formula —PO$_3$R$_{90}$, wherein R$_{90}$ is a hydrogen atom, an alkyl group (including linear, branched, saturated, unsaturated, cyclic, unsubstituted, and substituted alkyl groups, and wherein hetero atoms, such as oxygen, nitrogen, sulfur, silicon, phosphorus, and the like either may or may not be present in the alkyl group), typically with from 1 to about 50 carbon atoms, preferably with from about 1 to about 20 carbon atoms, and more preferably with from about 1 to about 10 carbon atoms, although the number of carbon atoms can be outside of these ranges, an aryl group (including substituted aryl groups), typically with from about 6 to about 50 carbon atoms, preferably with from about 6 to about 20 carbon atoms, and more preferably with from about 6 to about 14 carbon atoms, although the number of carbon atoms can be outside of these ranges, an arylalkyl group (including substituted arylalkyl groups), typically with from about 7 to about 50 carbon atoms, preferably with from about 7 to about 25 carbon atoms, and more preferably with from about 7 to about 15 carbon atoms, although the number of carbon atoms can be outside of these ranges, an alkylaryl group (including substituted alkylaryl groups), typically with from about 7 to about 50 carbon atoms, preferably with from about 7 to about 25 carbon atoms, and more preferably with from about 7 to about 15 carbon atoms, although the number of carbon atoms can be outside of these ranges, an alkoxy group (including linear, branched, saturated, unsaturated, cyclic, unsubstituted, and substituted alkoxy groups, and wherein hetero atoms, such as oxygen, nitrogen, sulfur, silicon, phosphorus, and the like either may or may not be present in the alkyl portion of the alkoxy group), typically with from about 1 to about 50 carbon atoms, preferably with from about 4 to about 20 carbon atoms, and more preferably with from about 8 to about 12 carbon atoms, although the number of carbon atoms can be outside of these ranges, an aryloxy group (including substituted aryloxy groups), typically with from about 6 to about 50 carbon atoms, preferably with from about 6 to about 20 carbon atoms, and more preferably with from about 6 to about 14 carbon atoms, although the number of carbon atoms can be outside of these ranges, an arylalkyloxy group (including substituted arylalkyloxy groups), typically with from about 7 to about 50 carbon atoms, preferably with from about 7 to about 25 carbon atoms, and more preferably with from about 7 to about 15 carbon atoms, although the number of carbon atoms can be outside of these ranges, an alkylaryloxy group (including substituted alkylaryloxy groups), typically with from about 7 to about 50 carbon atoms, preferably with from about 7 to about 25 carbon atoms, and more preferably with from about 7 to about 15 carbon atoms, although the number of carbon atoms can be outside of these ranges, a polyalkyleneoxy group, wherein the alkyl portion of the repeat alkyleneoxy groups typically has from about 1 to about 12 carbon atoms, although the number of carbon atoms can be outside of these ranges, such as a polyethyleneoxy group, a polypropyleneoxy group, a polybutyleneoxy group, or the like, and wherein the number of repeat alkyleneoxy groups typically is from about 2 to about 50 repeat alkyleneoxy groups, although the number of repeat units can be outside of these ranges, a polyaryleneoxy group, wherein the aryl portion of the repeat aryleneoxy groups typically has from about 6 to about 14 carbon atoms, although the number of carbon atoms can be outside of these ranges, such as a polyphenyleneoxy group, a polynaphthaleneoxy group, a polyphenanthreneoxy group, or the like, and wherein the number of repeat aryleneoxy groups typically is from about 2 to about 20 repeat aryleneoxy groups, although the number of repeat units can be outside of these ranges, a polyarylalkyleneoxy group, wherein the arylalkyl portion of the repeat arylalkyleneoxy groups typically has from about 7 to about 50 carbon atoms, although the number of carbon atoms can be outside of these ranges, such as a polybenzyleneoxy group, a polyphenylethyleneoxy group, or the like, and wherein the number of repeat arylalkyleneoxy groups typically is from about 2 to about 20 repeat arylalkyleneoxy groups, although the number of repeat units can be outside of these ranges, a polyalkylaryleneoxy group, wherein the alkylaryl portion of the repeat alkylaryleneoxy groups typically has from about 7 to about 50 carbon atoms, although the number of carbon atoms can be outside of these ranges, such as a polytolueneoxy group or the like, and wherein the number of repeat alkylaryleneoxy groups typically is from about 2 to about 20 repeat alkylaryleneoxy groups, although the number of repeat units can be outside of these ranges, a heterocyclic group (including unsubstituted and substituted heterocyclic groups), typically with from about 2 to about 12 carbon atoms, and typically with from about 4 to about 18 ring atoms, although the number of carbon atoms and the number of ring atoms can be outside of these ranges, wherein the heteroatoms in the heterocyclic groups can be (but are not limited to) nitrogen, oxygen, sulfur, silicon, phosphorus, and the like, as well as mixtures thereof, a silyl group (including unsubstituted and substituted silyl groups), a siloxane group (including unsubstituted and substituted siloxane groups), a polysilylene group (including unsubstituted and substituted polysilylene groups), typically with from 2 to about 100 repeat silylene units, or a polysiloxane group (including unsubstituted and substituted polysiloxane groups), typically with from 2 to about 200 repeat siloxane units, although the number of repeat siloxane units can be outside of this range, wherein the substituents on the substituted alkyl, aryl, arylalkyl, alkylaryl, alkoxy, aryloxy, arylalkyloxy, alkylaryloxy, polyalkyleneoxy, polyaryleneoxy, polyarylalkyleneoxy, polyalkylaryleneoxy, heterocyclic, silyl, siloxy, polysilylene, and polysiloxy groups are hydroxy groups, halogen atoms, cyano groups, ether groups, aldehyde groups, ketone groups, carboxylic acid groups, ester groups, amide groups, carbonyl groups, thiocarbonyl groups, sulfate groups, sulfonate groups, sulfide groups, sulfoxide groups, phosphate groups, nitrile groups, mercapto groups, nitro groups, nitroso groups, sulfone groups, acyl groups, acid anhydride groups, azide groups, cyanato groups, isocyanato groups, thiocyanato groups, isothiocyanato groups, mixtures thereof, and the like, wherein the substituents on the silylene, siloxy, polysilylene, and polysiloxy groups can also be alkyl groups, aryl groups, arylalkyl groups, and alkylaryl groups, wherein two or more substituents can be joined together to form a ring, and wherein Z and Z' can be the same as each other or different from each other. Up to 4 Z groups can be present on the molecule. Up to 4 Z' groups can be present on the molecule.

The groups Z and X can be joined together to form a ring and the groups Z' and X' can be joined together to form a ring.

Some specific examples of colorants of this formula include

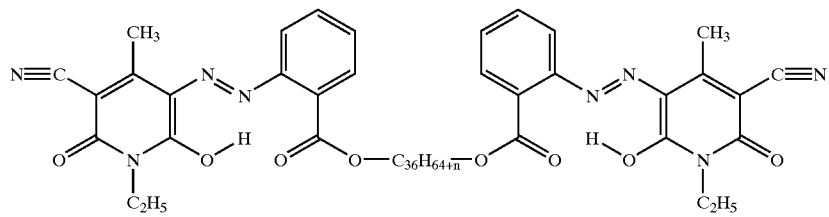
wherein $C_{36}H_{64+n}$ is a branched alkylene group which may include unsaturations and cyclic groups, wherein n is an integer of 0, 1, 2, 3, 4, 5, 6, 7, 8, 9, or 10, and wherein one isomer thereof is of the formula
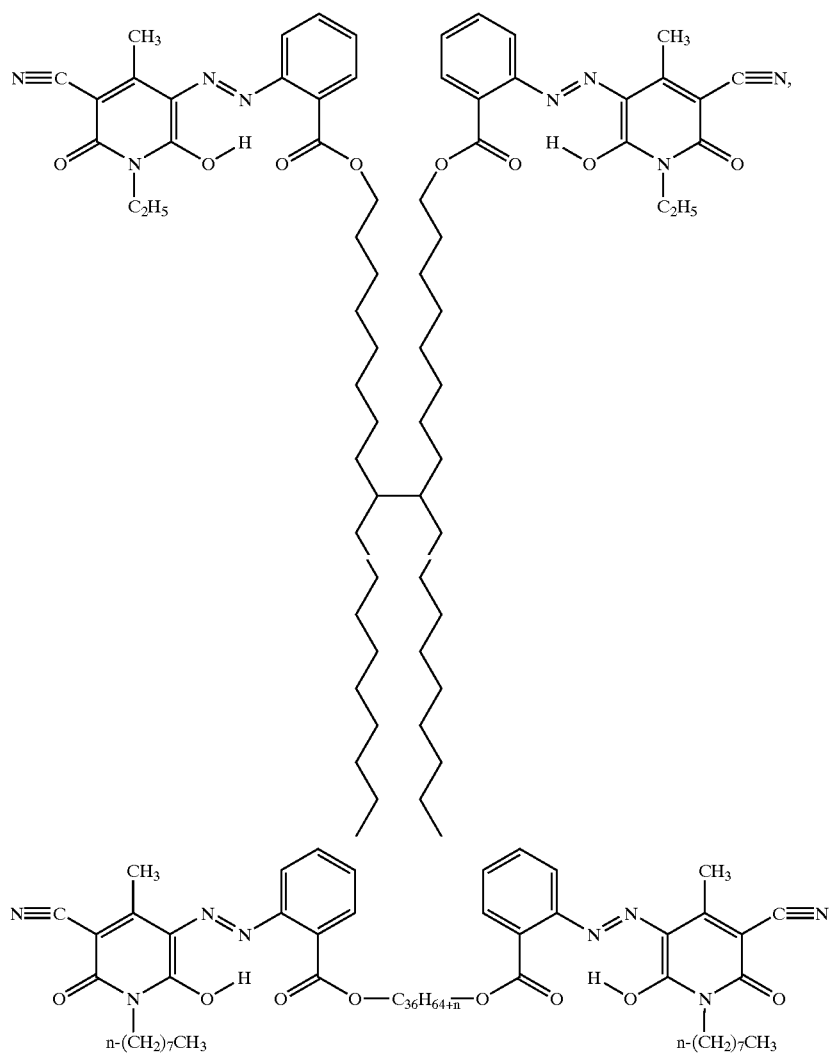
wherein $C_{36}H_{64+n}$ is a branched alkylene group which may include unsaturations and cyclic groups, wherein n is an integer of 0, 1, 2, 3, 4, 5, 6, 7, 8, 9, or 10, and wherein one isomer thereof is of the formula

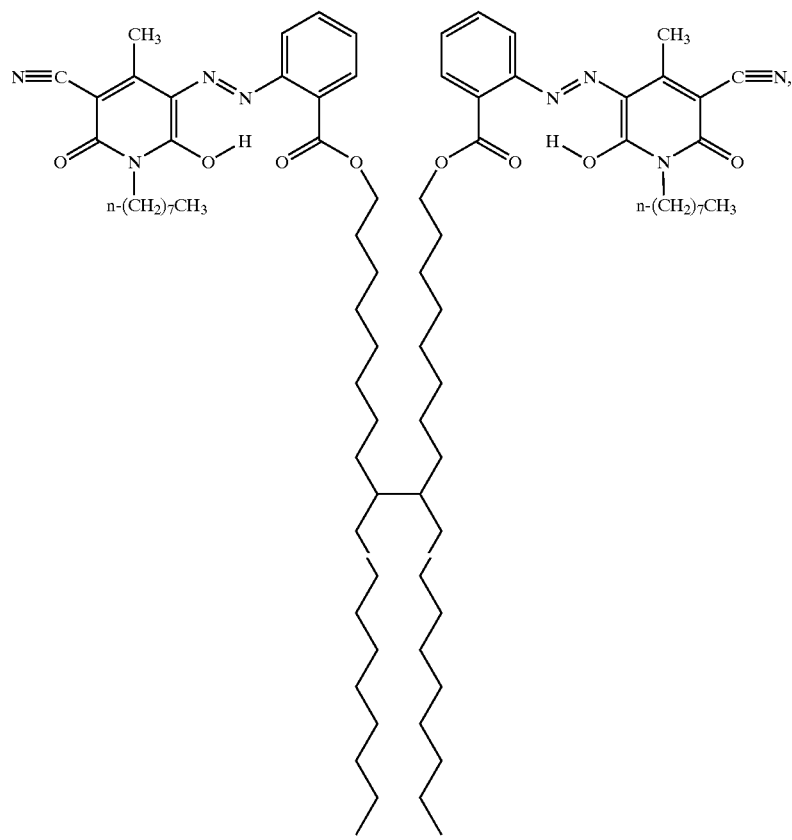
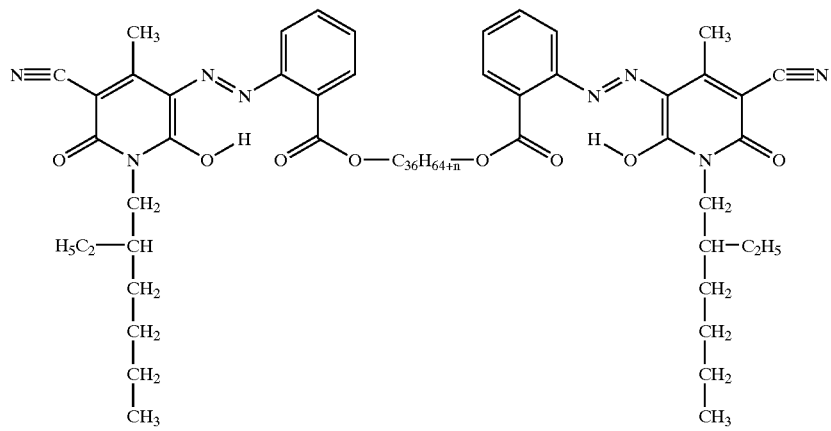
wherein $C_{36}H_{64+n}$ is a branched alkylene group which may include unsaturations and cyclic groups, wherein n is an integer of 0, 1, 2, 3, 4, 5, 6, 7, 8, 9, or 10, and wherein one isomer thereof is of the formula

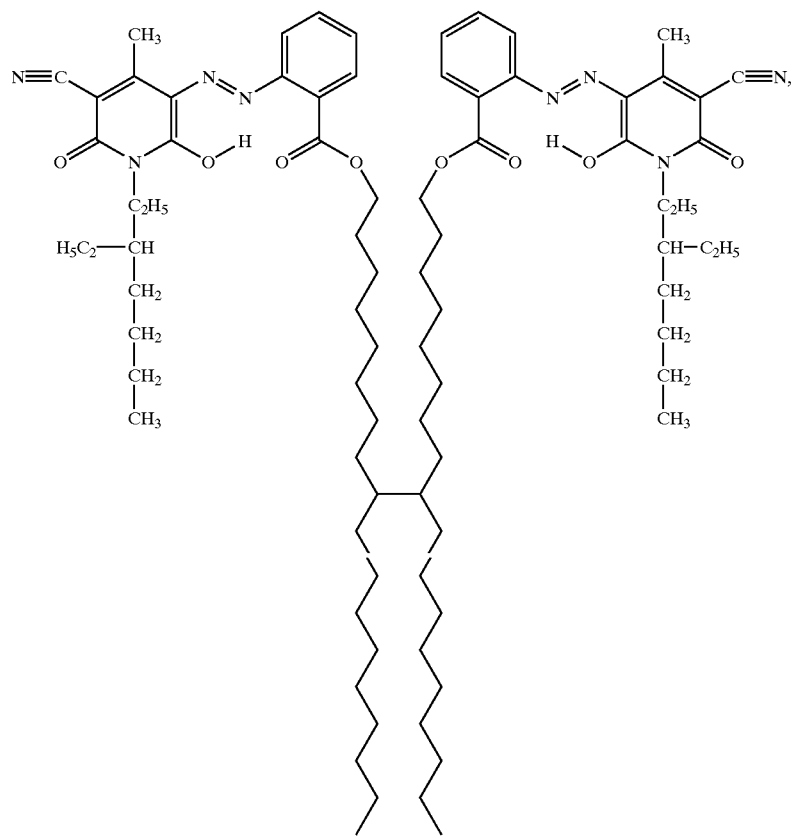
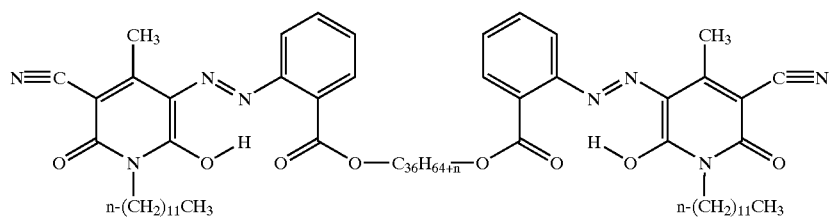
wherein $C_{36}H_{64+n}$ is a branched alkylene group which may include unsaturations and cyclic groups, wherein n is an integer of 0, 1, 2, 3, 4, 5, 6, 7, 8, 9, or 10, and wherein one isomer thereof is of the formula

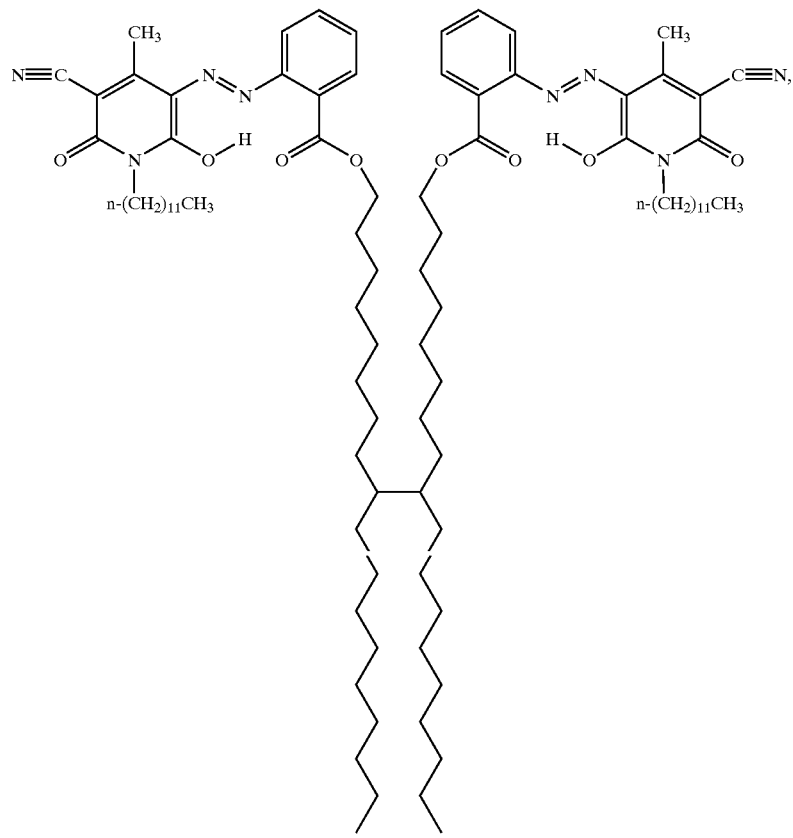
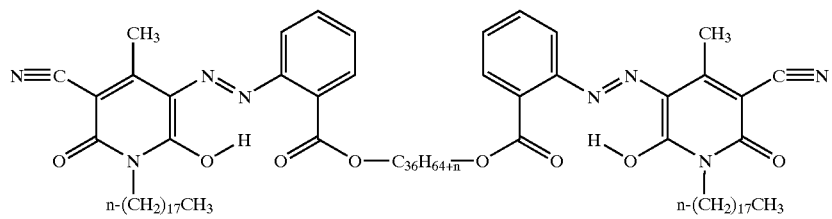
wherein $C_{36}H_{64+n}$ is a branched alkylene group which may include unsaturations and cyclic groups, wherein n is an integer of 0, 1, 2, 3, 4, 5, 6, 7, 8, 9, or 10, and wherein one isomer thereof was of the formula

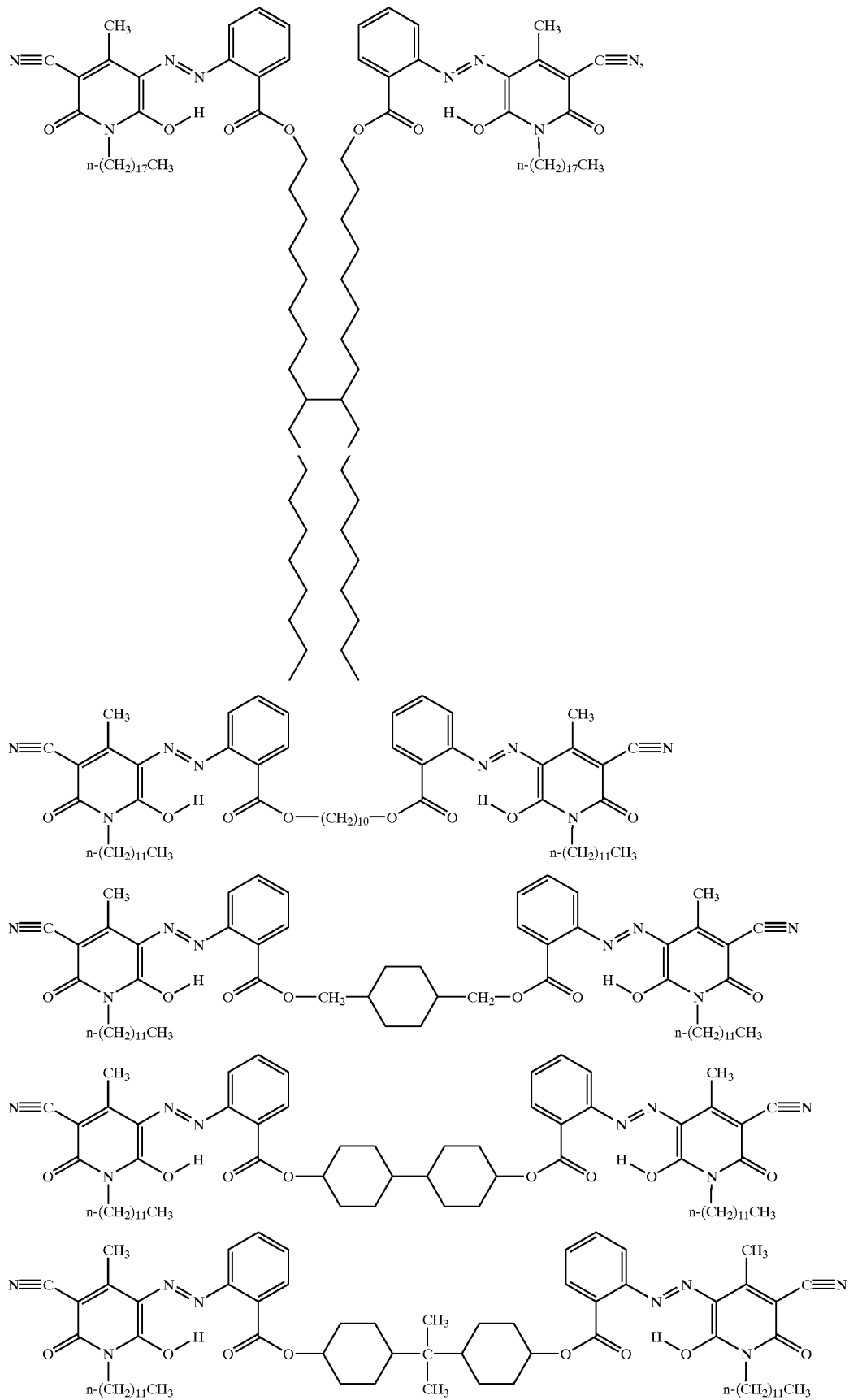

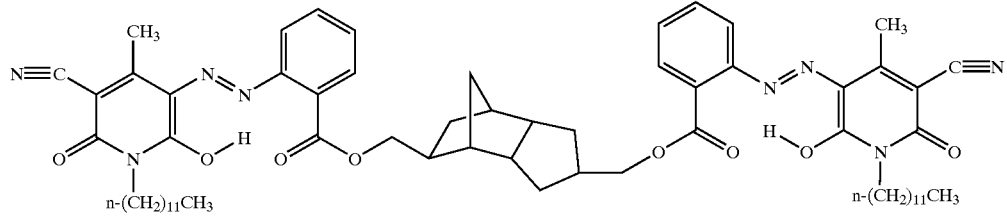
and the like.
The compounds of the formula
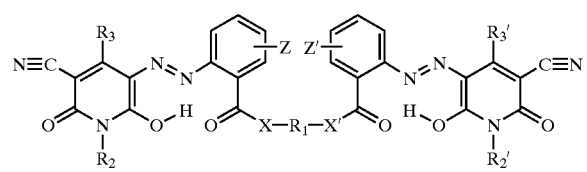
can be prepared by diazotization of the correspondingly substituted dimeric aniline with nitrosylsulfuric acid under cold temperature conditions, followed by coupling with the correspondingly substituted pyridone in a buffered alkaline aqueous solution under cold temperature conditions, as follows:
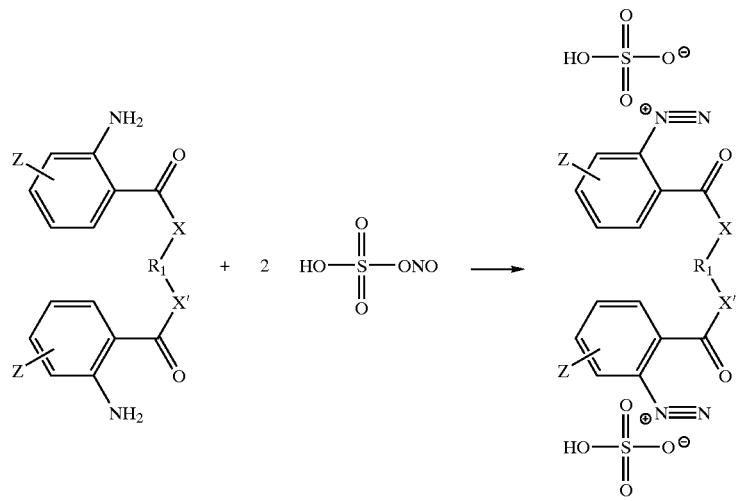
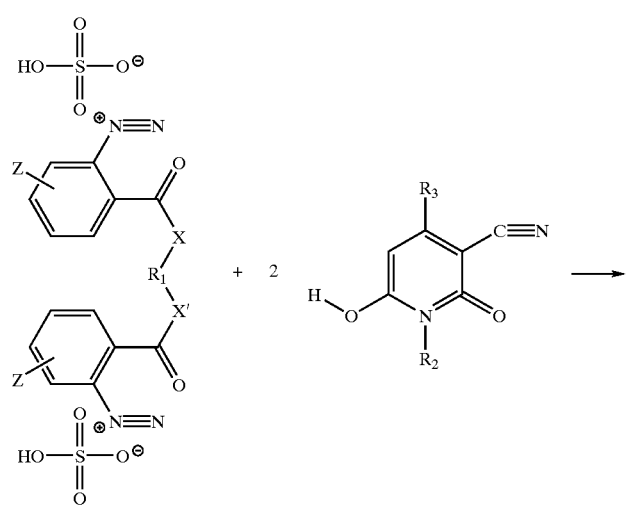

-continued

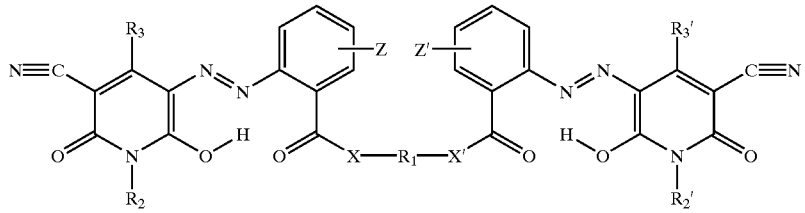

More specifically, the correspondingly substituted dianiline is first subjected to a diazotization reaction by dissolving it in acetic acid diluted with a solvent and, optionally, a second acid, such as sulfuric acid, dodecylbenzene sulfonic acid, propionic acid, hydrochloric acid, phosphoric acid, any other acid useful for a diazotization reaction, or the like, as well as mixtures thereof. The solvent can be any solvent useful in a diazotization reaction, such as water, acetone, dimethylformamide, dimethyacetamide, tetrahydrofuran, dimethoxyethane, analogous higher-boiling ether solvents, and the like, as well as mixtures thereof.

The solvent and the dianiline are present in any desired or effective relative amounts; if, for purposes of determining relative amounts, "solvent" is defined to include whatever solvent has been selected plus any amount of acetic acid and second acid present, the reactants are present in this combined solvent in relative amounts of in one embodiment at least about 100 grams of substituted dianiline per liter of solvent, in another embodiment at least about 200 grams of substituted dianiline per liter of solvent, and in yet another embodiment at least about 230 grams of substituted dianiline per liter of solvent, and in one embodiment of no more than about 400 grams of substituted dianiline per liter of solvent, in another embodiment of no more than about 300 grams of substituted dianiline per liter of solvent, and in yet another embodiment of no more than about 270 grams of substituted dianiline per liter of solvent, although the relative amounts can be outside of these ranges.

The acetic acid is present in any desired or effective amount, in one embodiment at least about 1 gram of acetic acid per gram of substituted dianiline, in another embodiment at least about 2 grams of acetic acid per gram of substituted dianiline, and in yet another embodiment at least about 3 grams of acetic acid per gram of substituted dianiline, and in one embodiment no more than about 10 grams of acetic acid per gram of substituted dianiline, in another embodiment no more than about 7 grams of acetic acid per gram of substituted dianiline, and in yet another embodiment no more than about 5 grams of acetic acid per gram of substituted dianiline, although the relative amounts can be outside of these ranges.

When present, the optional second acid is present in any desired or effective amount, in one embodiment at least about 0.05 gram of acid per gram of substituted dianiline, and in another embodiment at least about 0.1 gram of acid per gram of substituted dianiline, and in one embodiment no more than about 0.5 grams of acid per gram of substituted dianiline, in another embodiment no more than about 0.3 grams of acid per gram of substituted dianiline, and in yet another embodiment no more than about 0.2 grams of acid per gram of substituted dianiline, although the relative amounts can be outside of these ranges.

In the mixture comprising the selected solvent, any optional second acid, and acetic acid, the acetic acid is present in any desired or effective amount, in one embodiment at least about 50 percent by volume of the mixture, in another embodiment at least about 70 percent by volume of the mixture, in yet another embodiment at least about 75 percent by volume of the mixture, and in still another embodiment at least about 95 percent by volume of the mixture, although the relative amount can be outside of these ranges.

Upon complete dissolution of the ingredients, the mixture is cooled, in one embodiment to a temperature of no more than about +15° C., in another embodiment to a temperature of no more than about +10° C., in yet another embodiment to a temperature of no more than about +5° C., in still another embodiment to a temperature of no more than about +3° C., and in one embodiment to a temperature of no lower than about −5° C., and in another embodiment to a temperature of no lower than about −10° C., although the temperature can be outside of these ranges.

Thereafter, nitrosylsulfuric acid is added to the mixture in any desired or effective amount, in one embodiment at least about 2 moles of nitrosylsulfuric acid per mole of substituted dianiline (i.e., at least about 1 mole of nitrosylsulfuric acid per mole of aniline moiety in the dianiline), and in another embodiment at least about 2.1 moles of nitrosylsulfuric acid per mole of substituted dianiline, and in one embodiment no more than about 3 moles of nitrosylsulfuric acid per mole of substituted dianiline, in another embodiment no more than about 2.5 moles of nitrosylsulfuric acid per mole of substituted dianiline, and in yet another embodiment no more than about 2.25 moles of nitrosylsulfuric acid per mole of substituted dianiline, although the relative amounts can be outside of these ranges. In a specific embodiment, the nitrosylsulfuric acid is added dropwise at a rate such that the temperature of the reaction mixture does not exceed 15° C.

The reaction to form the diazonium salt is essentially instantaneous, and upon completion of addition of the nitrosylsulfuric acid the reaction is essentially complete, although, if desired a qualitative test can be performed to confirm reaction completion.

Thereafter, residual excess nitrosylsulfuric acid present in the reaction mixture can be quenched by the addition of a quenching agent, such as sulfamic acid, urea, or the like as well as mixtures thereof, in any desired or effective amount, in one embodiment at least about 0.01 mole of quenching agent per mole of nitrosylsulfuric acid (i.e., per mole of nitrosylsulfuric acid originally added to the reaction mixture), in another embodiment at least about 0.05 mole of quenching agent per mole of nitrosylsulfuric acid, and in yet another embodiment at least about 0.1 mole of quenching agent per mole of nitrosylsulfuric acid, and in one embodiment no more than about 0.5 mole of quenching agent per mole of nitrosylsulfuric acid, in another embodiment no more than about 0.3 mole of quenching agent per mole of nitrosylsulfuric acid, and in yet another embodiment no more than about 0.2 mole of quenching agent per mole of nitrosylsulfdric acid, although the amount can be outside of these ranges. Upon completion of the reaction, the reaction mixture contains the corresponding diazonium salt.

A precursor solution of the pyridone having the desired substituents thereon is prepared in an appropriate solvent, such as a mixture of water, organic solvents, including lower alcohols such as methanol, ethanol, isopropanol, and the like, water-miscible nonbasic organic solvents such as tetrahydrofuran, acetone, dimethoxyethane, N,N-dimethylformamide, N,N-dimethylacetamide, and the like, as well as mixtures thereof. Mixtures of water with an organic solvent can be helpful for ease of solvating inorganic or organic salts that are a reaction by-product. In this instance, water and the organic solvent are present in any desired or effective relative amounts, in one embodiment at least about 0.25 gram of organic solvent per gram of water, in another embodiment at least about 0.3 gram of organic solvent per gram of water, and in yet another embodiment at least about 0.4 gram of organic solvent per gram of water, and in one embodiment no more than about 4 grams of organic solvent per gram of water, in another embodiment no more than about 3 grams of organic solvent per gram of water, and in yet another embodiment no more than about 2 grams of organic solvent per gram of water, although the relative amounts can be outside of these ranges.

The pyridone is present in the precursor solution in any desired or effective amount, in one embodiment at least about 10 grams of pyridone per liter of solvent, in another embodiment at least about 30 grams of pyridone per liter of solvent, and in yet another embodiment at least about 50 grams of pyridone per liter of solvent, and in one embodiment no more than about 200 grams of pyridone per liter of solvent, in another embodiment no more than about 100 grams of pyridone per liter of solvent, and in yet another embodiment no more than about 70 grams of pyridone per liter of solvent although the relative amounts can be outside of these ranges.

The pyridone precursor solution is maintained at an alkaline pH, typically of at least about 10, and in one embodiment no more than about 14, and in another embodiment no more than about 12, although the pH can be outside of these ranges. The pyridone precursor solution can contain a mixture of a base and an optional buffering salt.

Examples of suitable bases include mineral bases, such as sodium hydroxide, potassium hydroxide, and the like, as well as water-miscible organic tertiary amines, such as triethanolamine, N,N-diethylethanolamine, and the like, as well as mixtures thereof, present in any desired or effective amount, in one embodiment at least about 1 mole of base per mole of pyridone, in another embodiment at least about 2 moles of base per mole of pyridone, in yet another embodiment at least about 3 moles of base per mole of pyridone, and in still another embodiment at least about 5 moles of base per mole of pyridone, and in one embodiment no more than about 10 moles of base per mole of pyridone, in another embodiment no more than about 7 moles of base per mole of pyridone, and in yet another embodiment no more than about 5 moles of base per mole of pyridone, although the relative amounts can be outside of these ranges.

Examples of suitable optional buffer salts include those corresponding to the principal acid solvent; for example, when the principal acid solvent is acetic acid, suitable buffers include sodium acetate, potassium acetate, sodium hydrogenphosphate, citric acid, and the like, as well as mixtures thereof. When present, the optional buffer salt is present in any desired or effective amount, in one embodiment at least about 1 mole of buffer per mole of pyridone, in another embodiment at least about 2 moles of buffer per mole of pyridone, in yet another embodiment at least about 3 moles of buffer per mole of pyridone, and in still another embodiment at least about 5 moles of buffer per mole of pyridone, and in one embodiment no more than about 10 moles of buffer per mole of pyridone, in another embodiment no more than about 7 moles of buffer per mole of pyridone, and in yet another embodiment no more than about 5 moles of buffer per mole of pyridone, although the relative amounts can be outside of these ranges. In a specific embodiment, upon dissolution of the pyridone, the thus-formed precursor pyridone solution can be filtered to remove any undissolved solids.

The solution containing the diazonium salt, maintained at a cold temperature, is then slowly added to the pyridone solution in any desired or effective relative amounts, in one embodiment at least about 2 moles of pyridone per mole of diazonium salt, in another embodiment at least about 2.1 moles of pyridone per mole of diazonium salt, and in yet another embodiment at least about 2.25 moles of pyridone per mole of diazonium salt, and in one embodiment no more than about 4 moles of pyridone per mole of diazonium salt, in another embodiment no more than about 3 moles of pyridone per mole of diazonium salt, and in yet another embodiment no more than about 2.5 moles of pyridone per mole of diazonium salt, although the relative amounts can be outside of these ranges, resulting in the immediate formation of a bright yellow precipitate. Thereafter, the yellow precipitate can be collected by filtration and, if desired, washed.

The present invention is also directed to processes for preparing compounds of the formula

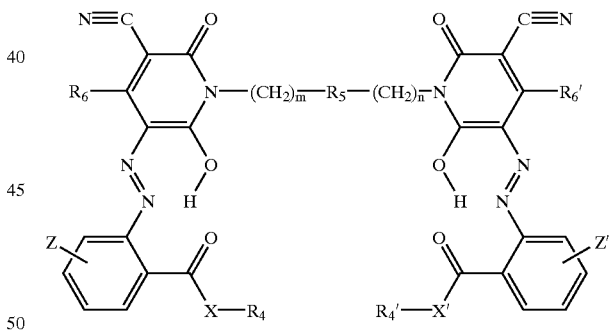

wherein $R_4$ and $R_4'$ each, independently of the other, is (i) an alkyl group (including linear, branched, saturated, unsaturated, cyclic, unsubstituted, and substituted alkyl groups, and wherein hetero atoms, such as oxygen, nitrogen, sulfur, silicon, phosphorus, and the like either may or may not be present in the alkyl group), in one embodiment with at least 1 carbon atom, in another embodiment with at least about 8 carbon atoms, in yet another embodiment with at least about ,10 carbon atoms, in still another embodiment with at least about 12 carbon atoms, in another embodiment with at least about 14 carbon atoms, in yet another embodiment with at least about 16 carbon atoms, in still another embodiment with at least about 18 carbon atoms, in another embodiment with at least about 20 carbon atoms, in yet another embodiment with at least about 22 carbon atoms, in still another embodiment with at least about 24 carbon atoms, in another embodiment with at least about 26 carbon atoms, in yet another embodiment with at least about 28 carbon atoms, in still another embodiment with at least about 30 carbon atoms, in another embodiment with at least about 32 carbon atoms, in yet another embodiment with at least about 34 carbon atoms, and in still another embodiment with at least about 36 carbon atoms, and in one embodiment with no more than about 200 carbon atoms, in another embodiment with no more than about 100 carbon atoms, in yet another embodiment with no more than about 75 carbon atoms, in sill another embodiment with no more than about 60 carbon atoms, in another embodiment with no more than about 50 carbon atoms, and in yet another embodiment with no more than about 40 carbon atoms, although the number of carbon atoms can be outside of these ranges, (ii) an aryl group (including unsubstituted and substituted aryl groups), in one embodiment with at least about 6 carbon atoms, in another embodiment with at least about 10 carbon atoms, in yet another embodiment with at least about 13 carbon atoms, in still another embodiment with at least about 14 carbon atoms, in another embodiment with at least about 16 carbon atoms, in yet another embodiment with at least about 17 carbon atoms, in still another embodiment with at least about 18 carbon atoms, in another embodiment with at least about 19 carbon atoms, in yet another embodiment with at least about 20 carbon atoms, in still another embodiment with at least about 21 carbon atoms, in another embodiment with at least about 22 carbon atoms, and in yet another embodiment with at least about 23 carbon atoms, and in one embodiment with no more than about 100 carbon atoms, in another embodiment with no more than about 75 carbon atoms, and in yet another embodiment with no more than about 50 carbon atoms, although the number of carbon atoms can be outside of these ranges, (iii) an arylalkyl group (including unsubstituted and substituted arylalkyl groups), in one embodiment with at least about 7 carbon atoms in another embodiment with at least about 8 carbon atoms, in another embodiment with at least about 10 carbon atoms, in yet another embodiment with at least about 12 carbon atoms, in still another embodiment with at least about 14 carbon atoms, in another embodiment with at least about 16 carbon atoms, in yet another embodiment with at least about 18 carbon atoms, in still another embodiment with at least about 20 carbon atoms, in another embodiment with at least about 22 carbon atoms, in yet another embodiment with at least about 24 carbon atoms, in still another embodiment with at least about 26 carbon atoms, in another embodiment with at least about 28 carbon atoms, in yet another embodiment with at least about 30 carbon atoms, in still another embodiment with at least about 32 carbon atoms, in another embodiment with at least about 32 carbon atoms, in another embodiment with at least about 34 carbon atoms, in yet another embodiment with at least about 36 carbon atoms, in another embodiment with at least about 38 carbon atoms, in yet another embodiment with at least about 40 carbon atoms, and in still another embodiment with at least about 42 carbon atoms, and in one embodiment with no more than about 200 carbon atoms, in another embodiment with no more than about 100 carbon atoms, and in yet another embodiment with no more than about 44 carbon atoms, although the number of carbon atoms can be outside of these ranges, (iv) an alkylaryl group (including unsubstituted and substituted alkylaryl groups), in one embodiment with at least about 7 carbon atoms, in another embodiment with at least about 8 carbon atoms, in another embodiment with at least about 10 carbon atoms, in yet another embodiment with at least about 12 carbon atoms, in still another embodiment with at least about 14 carbon atoms, in another embodiment with at least about 16 carbon atoms, in yet another embodiment with at least about 18 carbon atoms, in still another embodiment with at least about 20 carbon atoms, in another embodiment with at least about 22 carbon atoms, in yet another embodiment with at least about 24 carbon atoms, in still another embodiment with at least about 26 carbon atoms, in another embodiment with at least about 28 carbon atoms, in yet another embodiment with at least about 30 carbon atoms, in still another embodiment with at least about 32 carbon atoms, in another embodiment with at least about 34 carbon atoms, in yet another embodiment with at least about 36 carbon atoms, in another embodiment with at least about 38 carbon atoms, in yet another embodiment with at least about 40 carbon atoms, and in still another embodiment with at least about 42 carbon atoms, and in one embodiment with no more than about 200 carbon atoms, in another embodiment with no more than about 100 carbon atoms, and in yet another embodiment with no more than about 44 carbon atoms, although the number of carbon atoms can be outside of these ranges, (v) an alkoxy group (including linear, branched, saturated, unsaturated, cyclic, unsubstituted, and substituted alkoxy groups, and wherein hetero atoms, such as oxygen, nitrogen, sulfur, silicon, phosphorus, and the like either may or may not be present in the alkyl portion of the alkoxy group), in one embodiment with at least 1 carbon atom, in another embodiment with at least about 8 carbon atoms, in yet another embodiment with at least about 10 carbon atoms, in still another embodiment with at least about 12 carbon atoms, in another embodiment with at least about 14 carbon atoms, in yet another embodiment with at least about 16 carbon atoms, in still another embodiment with at least about 18 carbon atoms, in another embodiment with at least about 20 carbon atoms, in yet another embodiment with at least about 22 carbon atoms, in still another embodiment with at least about 24 carbon atoms, in another embodiment with at least about 26 carbon atoms, in yet another embodiment with at least about 28 carbon atoms, in still another embodiment with at least about 30 carbon atoms, in another embodiment with at least about 32 carbon atoms, in yet another embodiment with at least about 34 carbon atoms, and in still another embodiment with at least about 36 carbon atoms, and in one embodiment with no more than about 200 carbon atoms, in another embodiment with no more than about 100 carbon atoms, in yet another embodiment with no more than about 75 carbon atoms, in still another embodiment with no more than about 60 carbon atoms, in another embodiment with no more than about 50 carbon atoms, and in yet another embodiment with no more than about 40 carbon atoms, although the number of carbon atoms can be outside of these ranges, (vi) an aryloxy group (including unsubstituted and substituted aryloxy groups), in one embodiment with at least about 6 carbon atoms, in another embodiment with at least about 10 carbon atoms, in yet another embodiment with at least about 13 carbon atoms, in still another embodiment with at least about 14 carbon atoms, in another embodiment with at least about 16 carbon atoms, in yet another embodiment with at least about 17 carbon atoms, in still another embodiment with at least about 18 carbon atoms, in another embodiment with at least about 19 carbon atoms, in yet another embodiment with at least about 20 carbon atoms, in still another embodiment with at least about 21 carbon atoms, in another embodiment with at least about 22 carbon atoms, and in yet another embodiment with at least about 23 carbon atoms, and in one embodiment with no more than about 100 carbon atoms, in another embodiment with no more than about 75 carbon atoms, and in yet another embodiment with no more than about 50 carbon atoms, although the number of carbon atoms can be outside of these ranges, (vii) an arylalkyloxy group (including unsubstituted and substituted arylalkyloxy groups), in one embodiment with at least about 7 carbon atoms, in another embodiment with at least about 8 carbon atoms, in another embodiment with at least about 10 carbon atoms, in yet another embodiment with at least about 12 carbon atoms, in still another embodiment with at least about 14 carbon atoms, in another embodiment with at least about 16 carbon atoms, in yet another embodiment with at least about 18 carbon atoms, in still another embodiment with at least about 20 carbon atoms, in another embodiment with at least about 22 carbon atoms, in yet another embodiment with at least about 24 carbon atoms, in still another embodiment with at least about 26 carbon atoms, in another embodiment with at least about 28 carbon atoms, in yet another embodiment with at least about 30 carbon atoms, in still another embodiment with at least about 32 carbon atoms, in another embodiment with at least about 34 carbon atoms, in yet another embodiment with at least about 36 carbon atoms, in another embodiment with at least about 38 carbon atoms, in yet another embodiment with at least about 40 carbon atoms, and in still another embodiment with at least about 42 carbon atoms, and in one embodiment with no more than about 200 carbon atoms, in another embodiment with no more than about 100 carbon atoms, and in yet another embodiment with no more than about 44 carbon atoms, although the number of carbon atoms can be outside of these ranges, (viii) an alkylaryloxy group (including unsubstituted and substituted alkylaryloxy groups), in one embodiment with at least about 7 carbon atoms, in another embodiment with at least about 8 carbon atoms, in another embodiment with at least about 10 carbon atoms, in yet another embodiment with a t least about 12 carbon atoms, in still another embodiment with at least about 14 carbon atoms, in another embodiment with at least about 16 carbon atoms, in yet another embodiment with at least about 18 carbon atoms, in still another embodiment with at least about 20 carbon atoms, in another embodiment with at least about 22 carbon atoms, in yet another embodiment with at least about 24 carbon atoms, in still another embodiment with at least about 26 carbon atoms, in another embodiment with at least about 28 carbon atoms, in yet another embodiment with at least about 30 carbon atoms, in still another embodiment with at least about 32 carbon atoms, in another embodiment with at least about 34 carbon atoms, in yet another embodiment with at least about 34 carbon atoms, in yet another embodiment with at least about 36 carbon atoms, in another embodiment with at least about 38 carbon atoms, in yet another embodiment with at least about 40 carbon atoms, and in still another embodiment with at least about 42 carbon atoms, and in one embodiment with no more than about 200 carbon atoms, in another embodiment with no more than about 100 carbon atoms, and in yet another embodiment with no more than about 44 carbon atoms, although the number of carbon atoms can be outside of these ranges, (ix) a polyalkyleneoxy group, wherein the alkyl portion of the repeat alkyleneoxy groups typically has from about to about 12 carbon atoms, although the number of carbon atoms can be outside of these ranges, such as a polyethyleneoxy group, a polypropyleneoxy group, a polybutyleneoxy group, or the like, and wherein the number of repeat alkyleneoxy groups typically is from about 2 to about 50 repeat alkyleneoxy groups, although the number of repeat units can be outside of these ranges, (x) a polyaryleneoxy group, wherein the aryl portion of the repeat aryleneoxy groups typically has from about 6 to about 14 carbon atoms, although the number of carbon atoms can be outside of these ranges, such as a polyphenyleneoxy group, a polynaphthaleneoxy group, a polyphenanthreneoxy group, or the like, and wherein the number of repeat aryleneoxy groups typically is from about 2 to about 20 repeat aryleneoxy groups, although the number of repeat units can be outside of these ranges, (xi) a polyarylalkyleneoxy group, wherein the arylalkyl portion of the repeat arylalkylenexy groups typically has from about 7 to about 50 carbon atoms, although the number of carbon atoms can be outside of these ranges, such as a polybenzyleneoxy group, a polyphenylethyleneoxy group, or the like, and wherein the number of repeat arylalkyleneoxy groups typically is from about 2 to about 20 repeat arylalkyleneoxy groups, although the number of repeat units can be outside of these ranges, (xii) a polyalkylaryleneoxy group, wherein the alkylaryl portion of the repeat alkylaryleneoxy groups typically has from about 7 to about 50 carbon atoms, although the number of carbon atoms can be outside of these ranges, such as a polytolueneoxy group or the like, and wherein the number of repeat alkylaryleneoxy groups typically is from about 2 to about 20 repeat alkylaryleneoxy groups, although the number of repeat units can be outside of these ranges, (xiii) a heterocyclic group (including unsubstituted and substituted heterocyclic groups), typically with from about 2 to about 12 carbon atoms, and typically with from about 4 to about 18 ring atoms, although the number of carbon atoms and the number of ring atoms can be outside of these ranges, wherein the heteroatoms in the heterocyclic groups can be (but are not limited to) nitrogen, oxygen, sulfur, silicon, phosphorus, and the like, as well as mixtures thereof, (xiv) a silyl group (including unsubstituted and substituted silyl groups), (xv) a siloxane group (including unsubstituted and substituted siloxane groups), (xvi) a polysilylene group (including unsubstituted and substituted polysilylene groups), typically with from 2 to about 100 repeat silylene units, or (xvii) a polysiloxane group (including unsubstituted and substituted polysiloxane groups), typically with from 2 to about 200 repeat siloxane units, although the number of repeat siloxane units can be outside of this range, wherein the substituents on the substituted alkyl, aryl, arylalkyl, alkylaryl, alkoxy, aryloxy, arylalkyloxy, alkylaryloxy, polyalkyleneoxy, polyaryleneoxy, polyarylalkyleneoxy, polyalkylaryleneoxy, heterocyclic, silyl, siloxy, polysilylene, and polysiloxy groups are hydroxy groups, halogen atoms, cyano groups, ether groups, aldehyde groups, ketone groups, carboxylic acid groups, ester groups, amide groups, carbonyl groups, thiocarbonyl groups, sulfate groups, sulfonate groups, sulfide groups, sulfoxide groups, phosphate groups, nitrile groups, mercapto groups, nitro groups, nitroso groups, sulfone groups, acyl groups, acid anhydride groups, azide groups, cyanato groups, isocyanato groups, thiocyanato groups, isothiocyanato groups, mixtures thereof, and the like, wherein the substituents on the silylene, siloxy, polysilylene, and polysiloxy groups can also be alkyl groups, aryl groups, arylalkyl groups, and alkylaryl groups, wherein two or more substituents can be joined together to form a ring, and wherein $R_4$ and $R_4$ can be the same as each other or different from each other.

Some specific examples of suitable $R_4$ and $R_4'$ groups include (but are not limited to) methyl, of the formula —$CH_3$, ethyl, of the formula —$C_2H_5$, n-octyl, of the formula —$(CH_2)_7CH_3$, stearyl, of the formula —$(CH_2)_{17}CH_3$, methyl, of the formula

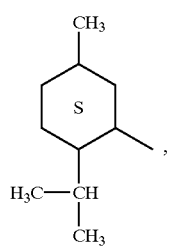

wherein the "S" indicates that the ring is saturated as opposed to being aromatic, branched saturated hydrocarbon groups containing 18 carbon atoms, of the general formula

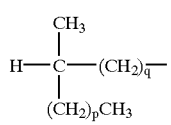

wherein q is an integer of from about 10 to about 15, p is an integer of from 0 to about 3, and the sum of p+q=15, such as isostearyl, oleyl, of the formula

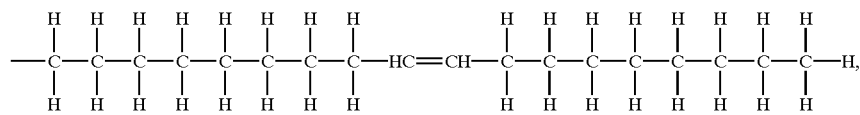

2-octyldodecyl, of the formula

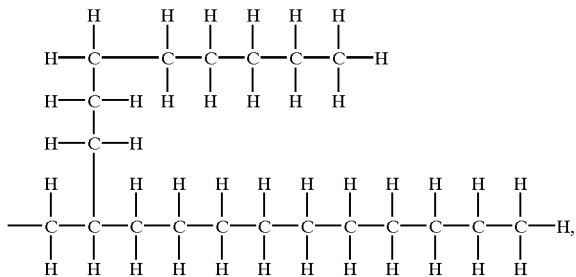

cholesteryl, of the formula

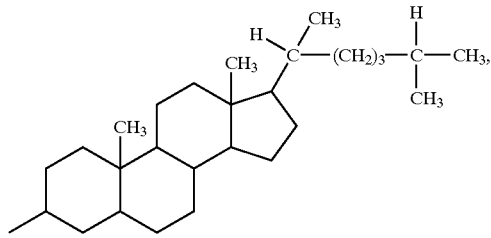

abietyl, including groups of the formula

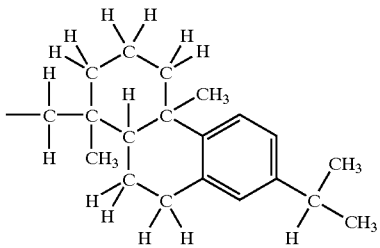

as well as hydrogenated and dehydrogenated isomers of the above formula that are also derivatives of the rosin-derived natural product abietic acid, such as didehydroabietyl and the like, 2-ethylhexyl, of the formula

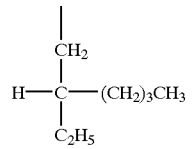

(1-oxypropyl)-2-octyldodecane, of the formula

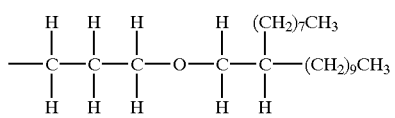

and the like.

The value m is an integer representing the number of repeat —$CH_2$— units, being typically from 0 to about 100, preferably from about 2 to about 50, and more preferably from about 5 to about 20, although the value of m can be outside of these ranges. The value n is an integer representing the number of repeat —$CH_2$— units, being typically from 0 to about 100, preferably from about 2 to about 50, and more preferably from about 5 to about 20, although the value of n can be outside of these ranges.

$R_5$ is (i) an alkylene group (including linear, branched, saturated, unsaturated, cyclic, unsubstituted, and substituted alkylene groups, and wherein hetero atoms, such as oxygen, nitrogen, sulfur, silicon, phosphorus, and the like either may or may not be present in the alkylene group), in one embodiment with at least 1 carbon atom, in another embodiment with at least about 8 carbon atoms, in yet another embodiment with at least about 10 carbon atoms, in still another embodiment with at least about 12 carbon atoms, in another embodiment with at least about 14 carbon atoms, in yet another embodiment with at least about 16 carbon atoms, in still another embodiment with at least about 18 carbon atoms, in another embodiment with at least about 20 carbon atoms, in yet another embodiment with at least about 22 carbon atoms, in still another embodiment with at least about 24 carbon atoms, in another embodiment with at least about 26 carbon atoms, in yet another embodiment with at least about 28 carbon atoms, in still another embodiment with at least about 30 carbon atoms, in another embodiment with at least about 32 carbon atoms, in yet another embodiment with at least about 34 carbon atoms, and in still another embodiment with at least about 36 carbon atoms, and in one embodiment with no more than about 200 carbon atoms, in another embodiment with no more than about 100 carbon atoms, in yet another embodiment with no more than about 75 carbon atoms, in still another embodiment with no more than about 60 carbon atoms, in another embodiment with no more than about 50 carbon atoms, and in yet another embodiment with no more than about 40 carbon atoms, although the number of carbon atoms can be outside of these ranges, (ii) an arylene group (including unsubstituted and substituted arylene groups), in one embodiment with at least about 6 carbon atoms, in another embodiment with a t least about 10 carbon atoms, in yet another embodiment with a t least about 13 carbon atoms, in still another embodiment with at least about 4 carbon atoms, in another embodiment with at least about 16 carbon atoms, in yet another embodiment with at least about 17 carbon atoms, in still another embodiment with at least about 18 carbon atoms, in another embodiment with at least about 19 carbon atoms, in yet another embodiment with at least about 20 carbon atoms, in still another embodiment with at least about 21 carbon atoms, in another embodiment with at least about 22 carbon atoms, and in yet another embodiment with at least about 23 carbon atoms, and in one embodiment with no more than about 100 carbon atoms, in another embodiment with no more than about 75 carbon atoms, and in yet another embodiment with no more than about 50 carbon atoms, although the number of carbon atoms can be outside of these ranges, (iii) an arylalkylene group (including unsubstituted and substituted arylalkylene groups), in one embodiment with at least about 7 carbon atoms, in another embodiment with at least about 8 carbon atoms, in another embodiment with at least about 10 carbon atoms, in yet another embodiment with at least about 12 carbon atoms, in still another embodiment with at least about 14 carbon atoms, in another embodiment with at least about 16 carbon atoms, in still another embodiment with at least about 16 carbon atoms, in still another embodiment with at least about 20 carbon atoms, in still another embodiment with at least about 22 carbon atoms, in still another embodiment with at least about 24 carbon atoms, in still another embodiment with at least about 26 carbon atoms, in still another embodiment with at least about 28 carbon atoms, in still another embodiment with at least about 32 carbon atoms, in still another embodiment with at least about 32 carbon atoms, in still another embodiment with at least about 34 carbon atoms, in another embodiment with at least about 36 carbon atoms, in yet another embodiment with at least about 38 carbon atoms, in yet another embodiment with at least about 40 carbon atoms, and in still another embodiment with at least about 42 carbon atoms, and in one embodiment with no more than about 200 carbon atoms, in another embodiment with no more than about 100 carbon atoms, and in yet another embodiment with no more than about 44 carbon atoms, although the number of carbon atoms can be outside of these ranges, (iv) an alkylarylene group (including unsubstituted and substituted alkylarylene groups), in one embodiment with at least about 7 carbon atoms, in another embodiment with at least about 8 carbon atoms, in another embodiment with at least about 10 carbon atoms, in yet another embodiment with at least about 2 carbon atoms, in still another embodiment with at least about 14 carbon atoms, in another embodiment with at least about 16 carbon atoms, in yet another embodiment with at least about 18 carbon atoms, in still another embodiment with at least about 20 carbon atoms, in another embodiment with at least about 22 carbon atoms, in yet another embodiment with at least about 24 carbon atoms, in still another embodiment with at least about 26 carbon atoms, in another embodiment with at least about 28 carbon atoms, in yet another embodiment with at least about 30 carbon atoms, in still another embodiment with at least about 32 carbon atoms, in another embodiment with at least about 34 carbon atoms, in yet another embodiment with at least about 36 carbon atoms, in another embodiment with at least about 38 carbon atoms, in yet another embodiment with at least about 40 carbon atoms, and in still another embodiment with at least about 42 carbon atoms, and in one embodiment with no more than about 200 carbon atoms, in another embodiment with no more than about 100 carbon atoms, and in yet another embodiment with no more than about 44 carbon atoms, although the number of carbon atoms can be outside of these ranges, (v) an alkyleneoxy group (including linear, branched, saturated, unsaturated, cyclic, unsubstituted, and substituted alkyleneoxy groups, and wherein hetero atoms, such as oxygen, nitrogen, sulfur, silicon, phosphorus, and the like either may or may not be present in the alkyl portion of the alkyleneoxy group), in one embodiment with at least 1 carbon atom, in another embodiment with at least about 8 carbon atoms, in yet another embodiment with at least about 10 carbon atoms, in still another embodiment with at least about 12 carbon atoms in another embodiment with at least about 14 carbon atoms, in yet another embodiment with at least about 16 carbon atoms, in still another embodiment with at least about 18 carbon atoms, in another embodiment with at least about 20 carbon atoms, in yet another embodiment with at least about 22 carbon atoms, in still another embodiment with at least about 24 carbon atoms, in another embodiment with at least about 26 carbon atoms, in yet another embodiment with at least about 28 carbon atoms, in still another embodiment with at least about 30 carbon atoms, in another embodiment with at least about 32 carbon atoms, in yet another embodiment with at least about 34 carbon atoms, and in still another embodiment with at least about 36 carbon atoms, and in one embodiment with no more than about 200 carbon atoms, in another embodiment with no more than about 100 carbon atoms, in yet 3 another embodiment with no more than about 75 carbon atoms, in still another embodiment with no more than about 60 carbon atoms, in another embodiment with no more than about 50 carbon atoms, and in yet another embodiment with no more than about 40 carbon atoms, although the number of carbon atoms can be outside of these ranges, (vi) an aryleneoxy group (including unsubstituted and substituted aryleneoxy groups), in one embodiment with at least about 6 carbon atoms, in another embodiment with at least about 10 carbon atoms, in yet another embodiment with at least about 13 carbon atoms, in still another embodiment with at least about 14 carbon atoms, in another embodiment with at least about 16 carbon atoms, in yet another embodiment with at least about 17 carbon atoms, in still another embodiment with at least about 18 carbon atoms, in another embodiment with at least about 19 carbon atoms, in yet another embodiment with at least about 20 carbon atoms, in still another embodiment with at least about 21 carbon atoms, in another embodiment with at least about 22 carbon atoms, and in yet another embodiment with at least about 23 carbon atoms, and in one embodiment with no more than about 100 carbon atoms, in another embodiment with no more than about 75 carbon atoms, and in yet another embodiment with no more than about 50 carbon atoms, although the number of carbon atoms can be outside of these ranges, (vii) an arylalkyleneoxy group (including unsubstituted and substituted arylalkyleneoxy groups), in one embodiment with at least about 7 carbon atoms, in another embodiment with at least about 8 carbon atoms, in another embodiment with at least about 10 carbon atoms, in yet another embodiment with at least about 12 carbon atoms, in still another embodiment with at least about 14 carbon atoms, in another embodiment with at least about 16 carbon atoms, in yet another embodiment with at least about 18 carbon atoms, in still another embodiment with at least about 20 carbon atoms, in another embodiment with at least about 22 carbon atoms, in yet another embodiment with at least about 24 carbon atoms, in still another embodiment with at least about 26 carbon atoms, in another embodiment with at least about 28 carbon atoms, in yet another embodiment with at least about 30 carbon atoms, in still another embodiment with at least about 32 carbon atoms, in another embodiment with at least about 34 carbon atoms, in yet another embodiment with at least about 36 carbon atoms, in another embodiment with at least about 38 carbon atoms, in yet another embodiment with at least about 40 carbon atoms, and in still another embodiment with at least about 42 carbon atoms, and in one embodiment with no more than about 200 carbon atoms, in another embodiment with no more than about 100 carbon atoms, and in yet another embodiment with no more than about 44 carbon atoms, although the number of carbon atoms can be outside of these ranges, (viii) an alkylaryleneoxy group (including unsubstituted and substituted alkylaryleneoxy groups), in one embodiment with at least about 7 carbon atoms, in another embodiment with at least about 8 carbon atoms, in another embodiment with at least about 10 carbon atoms, in yet another embodiment with at least about 12 carbon atoms, in still another embodiment with at least about 14 carbon atoms, in another embodiment with at least about 16 carbon atoms, in yet another embodiment with at least about 18 carbon atoms, in still another embodiment with at least about 20 carbon atoms, in another embodiment with at least about 22 carbon atoms, in yet another embodiment with at least about 24 carbon atoms, in still another embodiment with at least about 26 carbon atoms, in another embodiment with at least about 28 carbon atoms, in yet another embodiment with at least about 30 carbon atoms, in still another embodiment with at least about 32 carbon atoms, in another embodiment with at least about 34 carbon atoms, in yet another embodiment with at least about 36 carbon atoms, in another embodiment with at least about 38 carbon atoms, in yet another embodiment with at least about 40 carbon atoms, and in still another embodiment with at least about 42 carbon atoms, and in one embodiment with no more than about 200 carbon atoms, in another embodiment with no more than about 100 carbon atoms, and in yet another embodiment with no more than about 44 carbon atoms, although the number of carbon atoms can be outside of these ranges, (ix) a polyalkyleneoxy group, wherein the alkyl portion of the repeat alkyleneoxy groups typically has from about 1 to about 12 carbon atoms, although the number of carbon atoms can be outside of these ranges, such as a polyethyleneoxy group, a polypropyleneoxy group, a polybutyleneoxy group, or the like, and wherein the number of repeat alkyleneoxy groups typically is from about 2 to about 50 repeat alkyleneoxy groups, although the number of repeat units can be outside of these ranges, (x) a polyaryleneoxy group, wherein the aryl portion of the repeat aryleneoxy groups typically has from about 6 to about 14 carbon atoms, although the number of carbon atoms can be outside of these ranges, such as a polyphenyleneoxy group, a polynaphthaleneoxy group, a polyphenanthreneoxy group, or the like, and wherein the number of repeat aryleneoxy groups typically is from about 2 to about 20 repeat aryleneoxy groups, although the number of repeat units can be outside of these ranges, (xi) a polyarylalkyleneoxy group, wherein the arylalkyl portion of the repeat arylalkyleneoxy groups typically has from about 7 to about 50 carbon atoms, although the number of carbon atoms can be outside of these ranges, such as a polybenzyleneoxy group, a polyphenylethyleneoxy group, or the like, and wherein the number of repeat arylalkyleneoxy groups typically is from about 2 to about 20 repeat arylalkyleneoxy groups, although the number of repeat units can be outside of these ranges, (xii), a polyalkylaryleneoxy group, wherein the alkylaryl portion of the repeat alkylaryleneoxy groups typically has from about 7 to about 50 carbon atoms, although the number of carbon atoms can be outside of these ranges, such as a polytolueneoxy group or the like, and wherein the number of repeat alkylaryleneoxy groups typically is from about 2 to about 20 repeat alkylaryleneoxy groups, although the number of repeat units can be outside of these ranges, (xiii) a heterocyclic group (including unsubstituted and substituted heterocyclic groups), typically with from 2 to about 12 carbon atoms, and typically with from about 4 to about 18 ring atoms, although the number of carbon atoms and ,the number of ring atoms can be outside of these ranges, wherein the heteroatoms in the heterocyclic groups can be (but are not limited to) nitrogen, oxygen, sulfur, silicon, phosphorus, and the like, as well as mixtures thereof, (xiv) a silylene group (including unsubstituted and substituted silylene groups), (xv) a siloxane group (including unsubstituted and substituted siloxane groups), (xvi) a polysilylene group (including unsubstituted and substituted polysilylene groups), typically with from 2 to about 100 repeat silylene units, or (xvii) a polysiloxane group (including unsubstituted and substituted polysiloxane groups), typically with from 2 to about 200 repeat siloxane units, although the number of repeat siloxane units can be outside of this range, wherein the substituents on the substituted alkylene, arylene, arylalkylene, alkylarylene, alkyleneoxy, aryleneoxy, arylalkyleneoxy, alkylaryleneoxy, polyalkyleneoxy, polyaryleneoxy, polyarylalkyleneoxy, polyalkylaryleneoxy, heterocyclic, silylene, siloxy, polysilylene, and polysiloxy groups are hydroxy groups, halogen atoms, cyano groups, ether groups, aldehyde groups, ketone groups, carboxylic acid groups, ester groups, amide groups, carbonyl groups, thiocarbonyl groups, sulfate groups, sulfonate groups, sulfide groups, sulfoxide groups, phosphate groups, nitrile groups, mercapto groups, nitro groups, nitrso groups, sulfone groups, acyl groups, acid anhydride groups, azide groups, cyanato groups, isocyanato groups, thiocyanato groups, isothiocyanato groups, mixtures thereof, and the like, wherein the substituents on the silylene, siloxy, polysilylene, and polysiloxy groups can also be alkyl groups, aryl groups, arylalkyl groups, and alkylaryl groups, wherein two or more substituents can be joined together to form a ring.

Some specific examples of suitable $R_5$ groups when m and n are each zero include (but are not limited to) n-hexanediyl, of the formula —$(CH_2)_6$—, n-octanediyl, of the formula —(CH$_2$)$_8$—, n-decanediy, of the formula —(CH$_2$)$_{10}$—, n-dodecanediyl, of the formula —(CH$_2$)$_{12}$—, 2-methyl-1,5-pentanediyl, of the formula

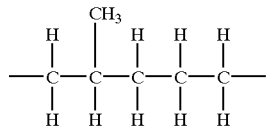

butane-1,4-di(oxypropyl), of the formula —CH$_2$CH$_2$CH$_2$—O—CH$_2$CH$_2$CH$_2$CH$_2$—O—CH$_2$CH$_2$CH$_2$—, 1,3-cyclohexanedimethylene, of the formula (which is not intended to be limited to any particular stereochemistry and includes all cis and trans isomers)

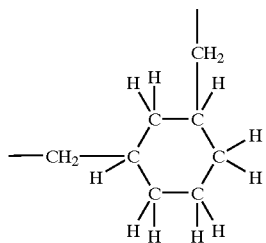

dicyclohexylmethane-4,4'-diyl, of the formula (which is not intended to be limited to any particular stereochemistry and includes all cis and trans isomers)

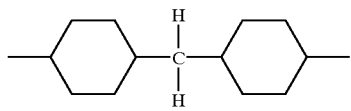

4,8-bis(methylene)tricyclo[5210$^{2,6}$]decanediyl, of the formula (which is not intended to be limited to any particular stereochemistry and includes all cis and trans isomers)

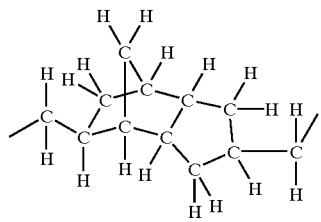

a branched alkylene group having 36 carbon atoms, including isomers of the formula

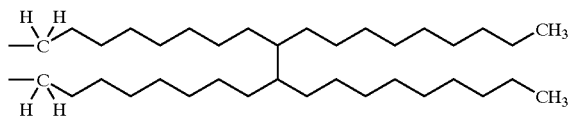

and other branched isomers (which may include unsaturations and cyclic groups), a branched alkylene diester group having 36 carbon atoms, including isomers of the formula

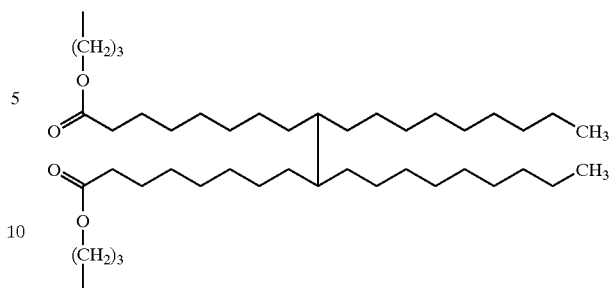

and other branched isomers (which may include unsaturations and cyclic groups), and the like.

R$_6$ and R$_6$' each, independently of the other, is (i) an alkyl group (including linear, branched, saturated, unsaturated, cyclic, unsubstituted, and substituted alkyl groups, and wherein hetero atoms, such as oxygen, nitrogen, sulfur, silicon, phosphorus, and the like can be present in the alkyl group), typically with from 1 to about 100 carbon atoms, preferably with from about 1 to about 10 carbon atoms, and more preferably with from about 1 to about 5 carbon atoms, although the number of carbon atoms can be outside of these ranges, (ii) an aryl group (including unsubstituted and substituted aryl groups), typically with from about 6 to about 100 carbon atoms, and preferably with from about 6 to about 10 carbon atoms, although the number of carbon atoms can be outside of these ranges, (iii) an arylalkyl group (including unsubstituted and substituted arylalkyl groups), typically with from about 7 to about 100 carbon atoms, and preferably with from about 7 to about 10 carbon atoms, although the number of carbon atoms can be outside of these ranges, or (iv) an alkylaryl group (including unsubstituted and substituted alkylaryl groups), typically with from about 7 to about 100 carbon atoms, and preferably with from about 7 to about 10 carbon atoms, although the number of carbon atoms can be outside of these ranges, wherein the substituents on the substituted alkyl, aryl, arylalkyl, and alkylaryl groups can be (but are not limited to) hydroxy groups, halogen atoms, amine groups, amine groups, ammonium groups, pyridine groups, pyridinium groups, ether groups, aldehyde groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, cyanato groups, isocyanato groups, thiocyanato groups, isothiocyanato groups, mixtures thereof, and the like, wherein two or more substituents can be joined together to form a ring, and wherein R$_6$ and R$_6$' can be the same as each other or different from each other.

Specific examples of suitable R$_6$ and R$_6$' groups include methyl (—CH$_3$), linear alkyl groups of the formula —(CH$_2$)$_c$CH$_3$ wherein c is an integer of 1, 2, 3, 4, 5, 6, 7, 8, or 9, and the like.

X and X' each, independently of the others, is (i) a direct bond, (ii) an oxygen atom, (iii) a sulfur atom, (iv) a group of the formula —NR$_{40}$— wherein R$_{40}$ is a hydrogen atom, an alkyl group (including linear, branched, saturated, unsaturated, cyclic, unsubstituted, and substituted alkyl groups, and wherein hetero atoms, such as oxygen, nitrogen, sulfur, silicon, phosphorus, and the like either may or may, not be present in the alkyl group), typically with from 1 to about 50 carbon atoms, preferably with from about 2 to about 20 carbon atoms, and more preferably with from about 4 to about 12 carbon atoms, although the number of carbon atoms can be outside of these ranges, an aryl group (including substituted aryl groups), typically with from about 6 to about 50 carbon atoms, preferably with from about 6 to about 20 carbon atoms, and more preferably with from about 6 to about 10 carbon atoms, although the number of carbon atoms can be outside of these ranges, an arylalkyl group (including substituted arylalkyl groups), typically with from about 7 to about 100 carbon atoms, preferably with from about 7 to about 50 carbon atoms, and more preferably with from about 7 to about 20 carbon atoms, although the number of carbon atoms can be outside of these ranges, or an alkylaryl group (including substituted alkylaryl groups), typically with from about 7 to about 100 carbon atoms, preferably with from about 7 to about 50 carbon atoms, and more preferably with from about 7 to about 20 carbon atoms, although the number of carbon atoms can be outside of these ranges, or (v) a group of the formula —CR$_{50}$R$_{60}$— wherein R$_{50}$ and R$_{60}$ each, independently of the other, is a hydrogen atom, an alkyl group (including linear, branched, saturated, unsaturated, cyclic, unsubstituted, and substituted alkyl groups, and wherein hetero atoms, such as oxygen, nitrogen, sulfur, silicon, phosphorus, and the like either may or may not be present in the alkyl group), typically with from 1 to about 50 carbon atoms, preferably with from about 2 to about, 20 carbon atoms, and more preferably with from about 4 to about 12 carbon atoms, although the number of carbon atoms can be outside of these ranges, an aryl group (including substituted aryl groups), typically with from about 6 to about 50 carbon atoms, preferably with from about 6 to about 20 carbon atoms, and more preferably with from about 6 to about 10 carbon atoms, although the number of carbon atoms can be outside of these ranges, an arylalkyl group (including substituted arylalkyl groups), typically with from about 7 to about 100 carbon atoms, preferably with from about 7 to about 50 carbon atoms, and more preferably with from about 7 to about 20 carbon atoms, although the number of carbon atoms can be outside of these ranges, or an alkylaryl group (including substituted alkylaryl groups), typically with from about 7 to about 100 carbon atoms, preferably with from about 7 to about 50 carbon atoms, and more preferably with from about 7 to about 20 carbon atoms, although the number of carbon atoms can be outside of these ranges, wherein the substituents on the substituted alkyl, aryl, arylalkyl, and alkylaryl groups can be (but are not limited to) hydroxy groups, halogen atoms, amine groups, amine groups, ammonium groups, pyridine groups, pyridinium groups, ether groups, aldehyde groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, cyanato groups, isocyanato groups, thiocyanato groups, isothiocyanato groups, mixtures thereof, and the like, wherein two or more substituents can be joined together to form a ring, and wherein X and X' can be the same as each other or different from each other.

Z and Z' each, independently of the others, is (i) a hydrogen atom, (ii) a halogen atom, including fluorine, chlorine, bromine, and iodine, (iii) a nitro group, (iv) an alkyl group (including linear, branched, saturated, unsaturated, cyclic, unsubstituted, and substituted alkyl groups, and wherein hetero atoms, such as oxygen, nitrogen, sulfur, silicon, phosphorus, and the like either may or may not be present in the alkyl group), typically with from 1 to about 50 carbon atoms, preferably with from about 1 to about 20 carbon atoms, and more preferably with from about 1 to about 10 carbon atoms, although the number of carbon atoms can be outside of these ranges, (v) an aryl group (including substituted aryl groups), typically with from about to about 50 carbon atoms, preferably with from about 6 to about, 14 carbon atoms, and more preferably with from about 6 to about 10 carbon atoms, although the number of carbon atoms can be outside of these ranges, (vi) an arylalkyl group (including substituted arylalkyl groups), typically with from about 7 to about 50 carbon atoms, preferably with from about 7 to about 25 carbon atoms, and more preferably with from about 7 to about 15 carbon atoms, although the number of carbon atoms can be outside of these ranges, (vii) an alkylaryl group (including substituted alkylaryl groups), typically with from about 7 to about 50 carbon atoms, preferably with from about 7 to about 25 carbon atoms, and more preferably with from about 7 to about 15 carbon atoms, although the number of carbon atoms can be outside of these ranges, (viii) a group of the formula

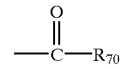

wherein R$_{70}$ is an alkyl group (including linear, branched, saturated, unsaturated, cyclic, unsubstituted, and substituted alkyl groups, and wherein hetero atoms, such as oxygen, nitrogen, sulfur, silicon, phosphorus, and the like either may or may not be present in the alkyl group), typically with from 1 to about 50 carbon atoms, preferably with from about 1 to about 20 carbon atoms, and more preferably with from about 1 to about 10 carbon atoms, although the number of carbon atoms can be outside of these ranges, an aryl group (including substituted aryl groups), typically with from about 6 to about 50 carbon atoms, preferably with from about 6 to about 20 carbon atoms, and more preferably with from about 6 to about 14 carbon atoms, although the number of carbon atoms can be outside of these ranges, an arylalkyl group (including substituted arylalkyl groups), typically with from about 7 to about 50 carbon atoms, preferably with from about 7 to about 25 carbon atoms, and more preferably with from about 7 to about 15 carbon atoms, although the number of carbon atoms can be outside of these ranges, an alkylaryl group (including substituted alkylaryl groups), typically with from about 7 to about 50 carbon atoms, preferably with from about 7 to about 25 carbon atoms, and more preferably with from about 7 to about 15 carbon atoms, although the number of carbon atoms can be outside of these ranges, an alkoxy group (including linear, branched, saturated, unsaturated, cyclic, unsubstituted, and substituted alkoxy groups, and wherein hetero atoms, such as oxygen, nitrogen, sulfur, silicon, phosphorus, and the like either may or may not be present in the alkyl portion of the alkoxy group), typically with from about 1 to about 50 carbon atoms, preferably with from about 4 to about 20 carbon atoms, and more preferably with from about 8 to about 12 carbon atoms, although the number of carbon atoms can be outside of these ranges, an aryloxy group (including substituted aryloxy groups), typically with from about 6 to about 50 carbon atoms, preferably with from about 6 to about 20 carbon atoms, and more preferably with from about 6 to about 14 carbon atoms, although the number of carbon atoms can be outside of these ranges, an arylalkyloxy group (including substituted arylalkyloxy groups), typically with from about 7 to about 50 carbon atoms, preferably with from about 7 to about 25 carbon atoms, and more preferably with from about 7 to about 15 carbon atoms, although the number of carbon atoms can be outside of these ranges, an alkylaryloxy group (including substituted alkylaryloxy groups), typically with from about 7 to about 50 carbon atoms, preferably with from about 7 to about 25 carbon atoms, and more preferably with from about 7 to about 15 carbon atoms, although the number of carbon atoms can be outside of these ranges, a polyalkyleneoxy group, wherein the alkyl portion of the repeat alkyleneoxy groups typically has from about 1 to about 12 carbon atoms, although the number, of carbon atoms can be outside of these ranges, such as, a polyethyleneoxy group, a polypropyleneoxy group, a polybutyleneoxy group, or the like, and wherein the number of repeat alkyleneoxy groups typically is from about 2 to about 50 repeat alkyleneoxy groups, although the number of repeat units can be outside of these ranges, a polyaryleneoxy group, wherein the aryl portion of the repeat aryleneoxy groups typically has from about 6 to about 14 carbon atoms, although the number of carbon atoms can be outside of these ranges, such as a polyphenyleneoxy group, a polynaphthaleneoxy group, a polyphenanthreneoxy group, or the like, and wherein the number of repeat aryleneoxy groups typically is from about 2 to about 20 repeat aryleneoxy groups, although the number of repeat units can be outside of these ranges, a polyarylalkyleneoxy group, wherein the arylalkyl portion of the repeat arylalkyleneoxy groups typically has from about 7 to about 50 carbon atoms, although the number of carbon atoms can be outside of these ranges, such as a polybenzyleneoxy group, a polyphenylethyleneoxy group, or the like, and wherein the number of repeat arylalkyleneoxy groups typically is from about 2 to about 20 repeat arylalkyleneoxy groups, although the number of repeat units can be outside of these ranges, a polyalkylaryleneoxy group, wherein the alkylaryl portion of the repeat alkylaryleneoxy groups typically has from about 7 to about 50 carbon atoms, although the number of carbon atoms can be outside of these ranges, such as a polytolueneoxy group or the like, and wherein the number of repeat alkylaryleneoxy groups typically is from about 2 to about 20 repeat alkylaryleneoxy groups, although the number of repeat units can be outside of these ranges, a heterocyclic group (including unsubstituted and substituted heterocyclic groups), typically with from about 2 to about 12 carbon atoms, and typically with from about 4 to about 18 ring atoms, although the number of carbon atoms and the number of ring atoms can be outside of these ranges, wherein the heteroatoms in the heterocyclic groups can be (but are not limited to) nitrogen, oxygen, sulfur, silicon, phosphorus, and the like, as well as mixtures thereof, a silyl group (including unsubstituted and substituted silyl groups), a siloxane group (including unsubstituted and substituted siloxane groups), a polysilylene group (including unsubstituted and substituted polysilylene groups), typically with from 2 to about 100 repeat silylene units, or a polysiloxane group (including unsubstituted and substituted polysiloxane groups), typically with from 2 to about 200 repeat siloxane units, although the number of repeat siloxane units can be outside of this range, (ix) a sulfonyl group of the formula —SO$_2$R$_{80}$, wherein R$_{80}$ is a hydrogen atom, an alkyl group (including linear, branched, saturated, unsaturated, cyclic, unsubstituted, and substituted alkyl groups, and wherein hetero atoms, such as oxygen, nitrogen, sulfur, silicon, phosphorus, and the like either may or may pot be present in the alkyl group), typically with from 1 to about 50 carbon atoms, preferably with from about 1 to about 20 carbon atoms, and more preferably with from about 1 to about 10 carbon atoms, although the number of carbon atoms can be outside of these ranges, an aryl group (including substituted aryl groups), typically with from about 6 to about 50 carbon atoms, preferably with from about 6 to about 20 carbon atoms, and more preferably with from about 6 to about 14 carbon atoms, although the number of carbon atoms can be outside of these ranges, an arylalkyl group (including substituted arylalkyl groups), typically with from about 7 to about 50 carbon atoms, preferably with from about 7 to about 25 carbon atoms, and more preferably with from about 7 to about 15 carbon atoms, although the number of carbon atoms can be outside of these ranges, an alkylaryl group (including substituted alkylaryl groups), typically with from about 7 to about 50 carbon atoms, preferably with from about 7 to about 25 carbon atoms, and more preferably with from about 7 to about 15 carbon atoms, although the number of carbon atoms can be outside of these ranges, an alkoxy group (including linear, branched, saturated, unsaturated, cyclic, unsubstituted, and substituted alkoxy groups, and wherein hetero atoms, such as oxygen, nitrogen, sulfur, silicon, phosphorus, and the like either may or may not be present in the alkyl portion of the alkoxy group), typically with from about 1 to about 50 carbon atoms, preferably with from about 4 to about 20 carbon atoms, and more preferably with from about 8 to about 12 carbon atoms, although the number of carbon atoms can be outside of these ranges, an aryloxy group (including substituted aryloxy groups), typically with from about 6 to about 50 carbon atoms, preferably with from about 6 to about 20 carbon atoms, and more preferably with from about 6 to about 14 carbon atoms, although the number of carbon atoms can be outside of these ranges, an arylalkyloxy group (including substituted arylalkyloxy groups), typically with from about 7 to about 50 carbon atoms, preferably with from about 7 to about 25 carbon atoms, and more preferably with from about 7 to about 15 carbon atoms, although the number of carbon atoms can be outside of these ranges, an alkylaryloxy group (including substituted alkylaryloxy groups), typically with from about 7 to about 50 carbon atoms, preferably with from about 7 to about 25 carbon atoms, and more preferably with from about 7 to about 15 carbon atoms, although the number of carbon atoms can be outside of these ranges, a polyalkyleneoxy group, wherein the alkyl portion of the repeat alkyleneoxy groups typically has from about 1 to about 12 carbon atoms, although the number of carbon atoms can be outside of these ranges, such as a polyethyleneoxy group, a polypropyleneoxy group, a polybutylenegxy group, or the like, and wherein the number of repeat alkyleneoxy groups typically is from about 2 to about 50 repeat alkyleneoxy groups, although the number of repeat units can be outside of these ranges, a polyaryleneoxy group, wherein the aryl portion of the repeat aryleneoxy groups typically has from about 6 to about 14 carbon atoms, although the number of carbon atoms can be outside of these ranges, such as a polyphenyleneoxy group, a polynaphthaleneoxy group, a polyphenanthreneoxy group, or the like, and wherein the number of repeat aryleneoxy groups typically is from about 2 to about 20 repeat aryleneoxy groups, although the number of repeat units can be outside of these ranges, a polyarylalkyleneoxy group, wherein the arylalkyl portion of the repeat arylalkyleneoxy groups typically has from about 7 to about 50 carbon atoms, although the number of carbon atoms can be outside of these ranges, such as a polybenzyleneoxy group, a polyphenylethyleneoxy group, or the like, and wherein the number of repeat arylalkyleneoxy groups typically is from about 2 to about 20 repeat arylalkyleneoxy groups, although the number of repeat units can be outside of these ranges, a polyalkylaryleneoxy group, wherein the alkylaryl portion of the repeat alkylaryleneoxy groups typically has from about 7 to about 50 carbon atoms, although the number of carbon atoms can be outside of these ranges, such as a polytolueneoxy group or the like, and wherein the number of repeat alkylaryleneoxy groups typically is from about 2 to about 20 repeat alkylaryleneoxy groups, although the number of repeat units can be outside of these ranges, a heterocyclic group (including unsubstituted and substituted heterocyclic groups), typically with from about 21 to about 12 carbon atoms, and typically with from about 4 to about 18 ring atoms, although the number of carbon atoms and the number of ring atoms can be outside of these ranges, wherein the heteroatoms in the heterocyclic groups can be (but are not limited to) nitrogen, oxygen, sulfur, silicon, phosphorus, and the like, as well as mixtures thereof, a silyl group (including unsubstituted and substituted silyl groups), a siloxane group (including unsubstituted and substituted siloxane groups), a polysilylene group (including unsubstituted and substituted polysilylene groups), typically with from 2 to about 1,00 repeat silylene units, or a polysiloxone group (including unsubstituted and substituted polysiloxane groups), typically with from 2 to about 200 repeat siloxane units, although the number of repeat siloxane units can be outside of this range, or (x) a phosphoryl group of the formula —$PO_3R_{90}$, wherein $R_{90}$ is a hydrogen atom, an alkyl group (including linear, branched, saturated, unsaturated, cyclic, unsubstituted, and substituted alkyl groups, and wherein hetero atoms, such as oxygen, nitrogen, sulfur, silicon, phosphorus, and the like either may or may not be present in the alkyl group), typically with from 1 to about 50 carbon atoms, preferably with from about 1 to about 20 carbon atoms, and more preferably with from about 1 to about 10 carbon atoms, although the number of carbon atoms can be outside of these ranges, an aryl group (including substituted aryl groups), typically with from about 6 to about 50 carbon atoms, preferably with from about 6 to about 20 carbon atoms, and more preferably with from about 6 to about 14 carbon atoms, although the number of carbon atoms can be outside of these ranges, an arylalkyl group (including substituted arylalkyl groups), typically with from about 7 to about 50 carbon atoms, preferably with from about 7 to about 25 carbon atoms, and more preferably with from about 7 to about 15 carbon atoms, although the number of carbon atoms can be outside of these ranges, an alkylaryl group (including substituted alkylaryl groups), typically with from about 7 to about 50 carbon atoms, preferably with from about 7 to about 25 carbon atoms, and more preferably with from about 7 to about 15 carbon atoms, although the number of carbon atoms can be outside of these ranges, an alkoxy group (including linear, branched, saturated, unsaturated, cyclic, unsubstituted, and substituted alkoxy groups, and wherein hetero atoms, such as oxygen, nitrogen, sulfur, silicon, phosphorus, and the like either may or may not be present in the alkyl portion of the alkoxy group), typically with from about 1 to about 50 carbon atoms, preferably with from about 4 to about 20 carbon atoms, and more preferably with from about 8 to about 12 carbon atoms, although the number of carbon atoms can be outside of these ranges, an aryloxy group (including substituted aryloxy groups), typically with from about 6 to about 50 carbon atoms, preferably with from about 6 to about 20 carbon atoms, and more preferably with from about 6 to about 14 carbon atoms, although the number of carbon atoms can be outside of these ranges, an arylalkyloxy group (including substituted arylalkyloxy groups), typically with from about 7 to about 50 carbon atoms, preferably with from about 7 to about 25 carbon atoms, and more preferably with from about 7 to about 15 carbon atoms, although the number of carbon atoms can be outside of these ranges, an alkylaryloxy group (including substituted alkylaryloxy groups), typically with from about 7 to about 50 carbon atoms, preferably with from about 7 to about 25 carbon atoms, and more preferably with from about 7 to about 15 carbon atoms, although the number of carbon atoms can be outside of these ranges, a polyalkyleneoxy group, wherein the alkyl portion of the repeat alkyleneoxy groups typically has from about 1 to about 12 carbon atoms, although the number of carbon atoms can be outside of these ranges, such as a polyethyleneoxy group, a polypropyleneoxy group, a polybutyleneoxy group, or the like, and wherein the number of repeat alkyleneoxy groups typically is from about 2 to about 50 repeat alkyleneoxy groups, although the number of repeat units can be outside of these ranges, a polyaryleneoxy group, wherein the aryl portion of the repeat aryleneoxy groups typically has from about 6 to about 14 carbon atoms, although the number of carbon atoms can be outside of these ranges, such as a polyphenyleneoxy group, a polynaphthaleneoxy group, a polyphenanthreneoxy group, or the like, and wherein the number of repeat aryleneoxy groups typically is from about 2 to about 20 repeat aryleneoxy groups, although the number of repeat units can be outside of these ranges, a polyarylalkyleneoxy group, wherein the arylalkyl portion of the repeat arylalkyleneoxy groups typically has from about 7 to about 50 carbon atoms, although the number of carbon atoms can be outside of these ranges, such as a polybenzyleneoxy group, a polyphenylethyleneoxy group, or the like, and wherein the number of repeat arylalkyleneoxy groups typically is from about 2 to about 20 repeat arylalkyleneoxy groups, although the number of repeat units can be outside of these ranges, a polyalkylaryleneoxy group, wherein the alkylaryl portion of the repeat alkylaryleneoxy groups typically has from about 7 to about 50 carbon atoms, although the number of carbon atoms can be outside of these ranges, such as a polytolueneoxy group or the like, and wherein the number of repeat alkylaryleneoxy groups typically is from about 2 to about 20 repeat alkylaryleneoxy groups, although the number of repeat units can be outside of these ranges, a heterocyclic group (including unsubstituted and substituted heterocyclic groups), typically with from about 2 to about 12 carbon atoms, and typically with from about 4 to about 18 ring atoms, although the number of carbon atoms and the number of ring atoms can be outside of these ranges, wherein the heteroatoms in the heterocyclic groups can be (but are not limited to) nitrogen, oxygen, sulfur, silicon, phosphorus, and the like, as well as mixtures thereof, a silyl group (including unsubstituted and substituted silyl groups), a siloxane group (including unsubstituted and substituted siloxane groups), a polysilylene group (including unsubstituted and substituted polysilylene groups), typically with from 2 to about 100 repeat silylene units, or a polysiloxane group (including unsubstituted and substituted polysiloxane groups), typically with from 2 to about 200 repeat siloxane units, although the number of repeat siloxane units can be outside of this range, wherein the substituents on the substituted alkyl, aryl, arylalkyl, alkylaryl, alkoxy, aryloxy, arylalkyloxy, alkylaryloxy, polyalkyleneoxy, polyaryleneoxy, polyarylalkylenedxy, polyalkylaryleneoxy, heterocyclic, silyl, siloxy, polysilylene, and polysiloxy groups are hydroxy groups, halogen atoms, cyano groups, ether groups, aldehyde groups, ketone groups, carboxylic acid groups, ester groups, amide groups, carbonyl groups, thiocarbonyl groups, sulfate groups, sulfonate groups, sulfide groups, sulfoxide groups, phosphate groups, nitrile groups, mercapto groups, nitro groups, nitroso groups, sulfone groups, acyl groups, acid anhydride groups, azide groups, cyanato groups, isocyanato groups, thiocyanato groups, isothiocyanato groups, mixtures thereof, and the like, wherein the substituents on the silylene, siloxy, polysilylene, and polysiloxy groups can also be alkyl groups, aryl groups, arylalkyl groups, and alkylaryl groups, wherein two or more substituents can be joined together to form a ring, and wherein Z and Z' can be the same as each other or different from each other. Up to 4 Z groups can be present on the molecule. Up to 4 Z' groups can be present on the molecule.

Two or more of the groups $R_4$, Z, and X can be joined together to form a ring and two or more of the groups $R_4'$, Z and X' can be joined together to form a ring.

Some specific examples of compounds of this formula include

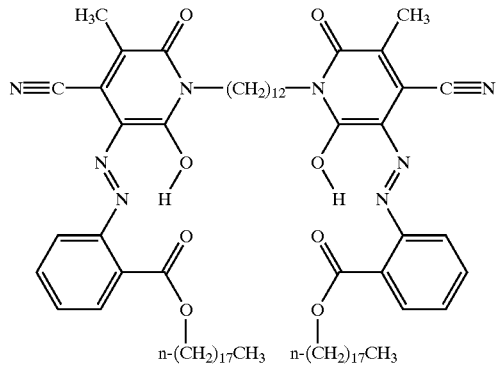

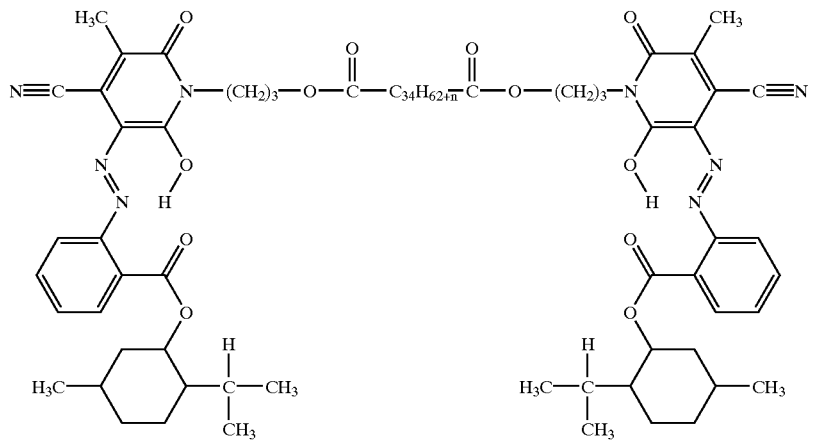

81
wherein $C_{34}H_{62+n}$ is a branched alkylene group which may include unsaturations and cyclic groups, wherein n is an integer of 0, 1, 2, 3, 4, 5, 6, 7, 8, 9, or 10,
82
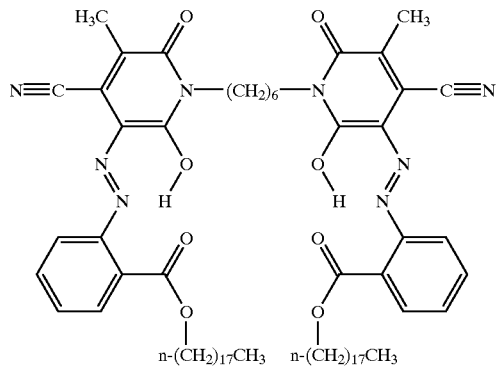
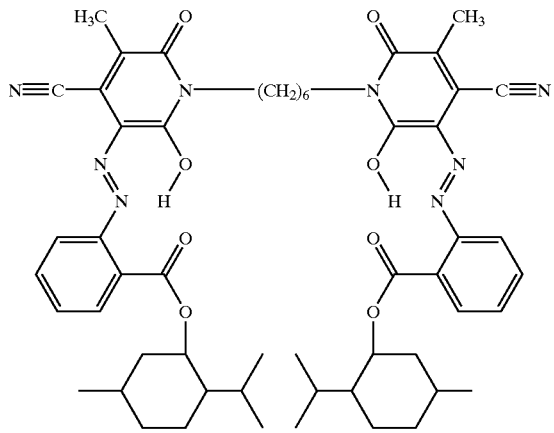
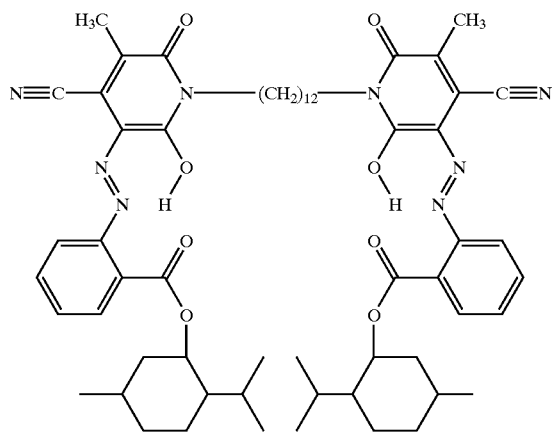
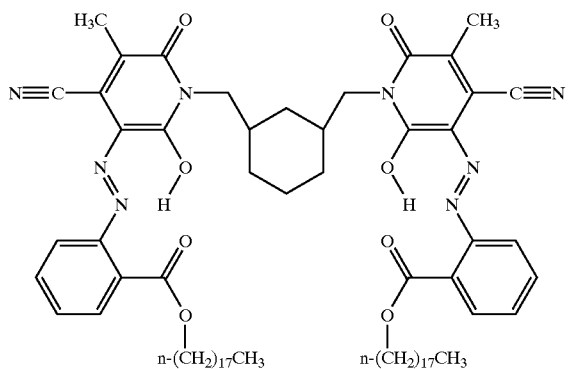
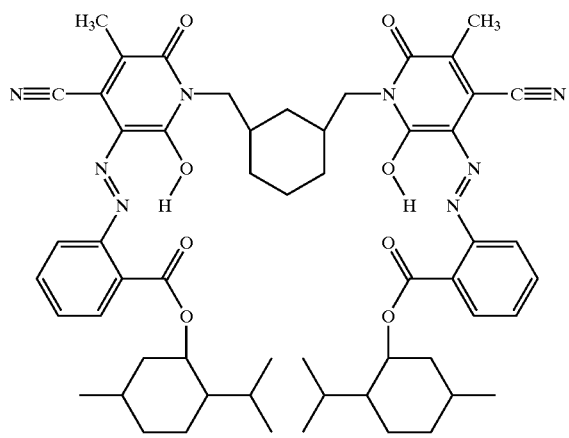

-continued
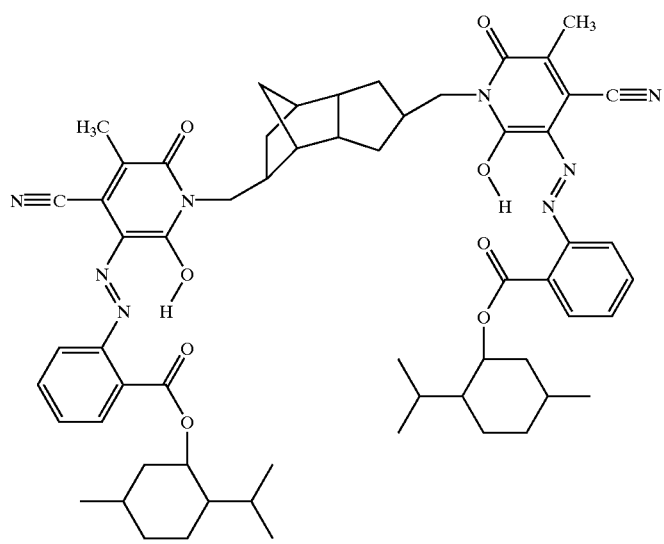
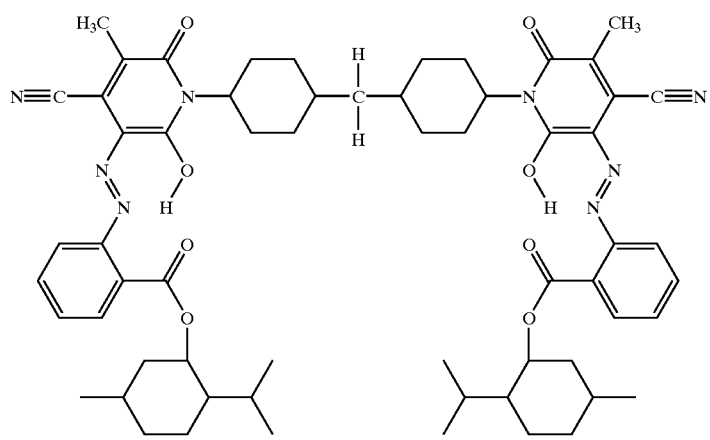
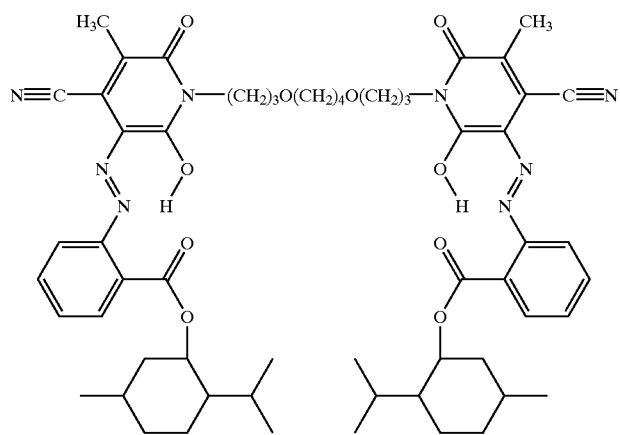

-continued
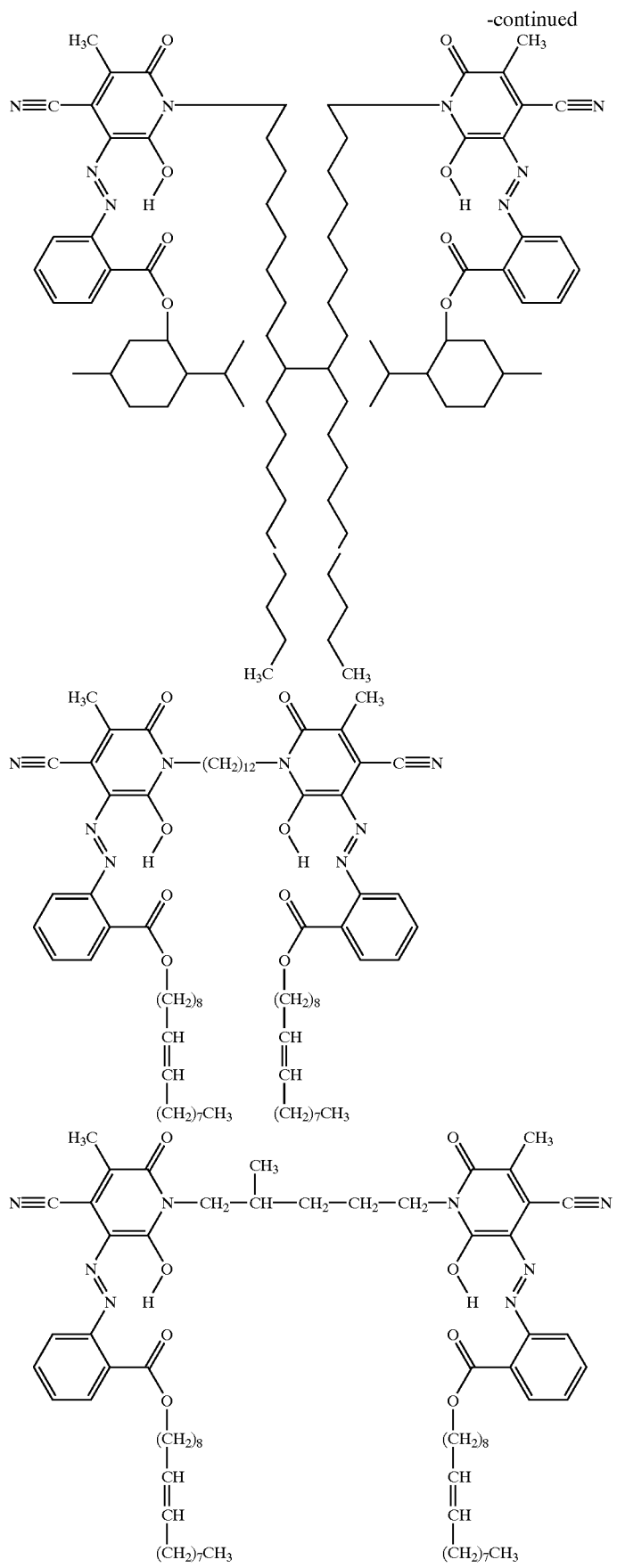

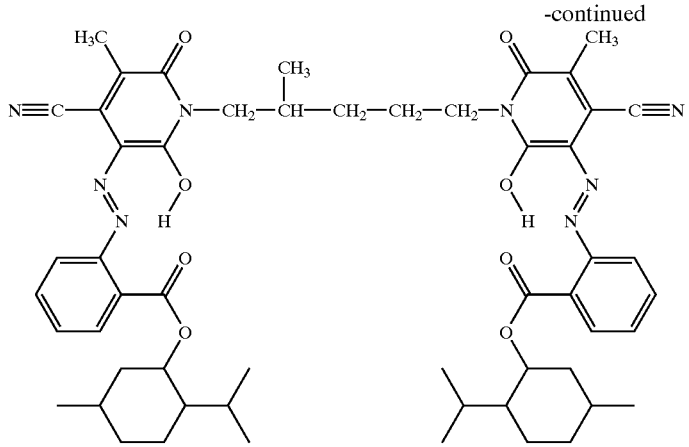

and the like.

The compounds of the formula

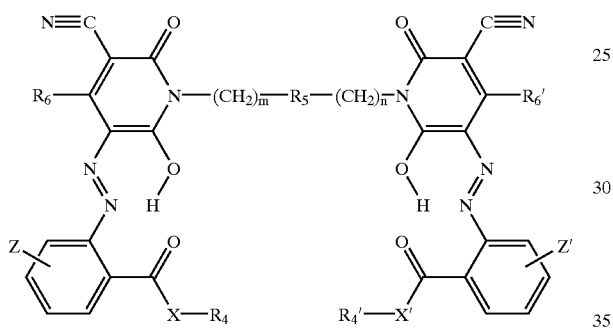

can be prepared by diazotization of the correspondingly substituted aniline with nitrosylsulfuric acid under cold temperature conditions, followed by coupling with the correspondingly-substituted dipyridone in a buffered alkaline aqueous solution under cold temperature conditions, as follows:

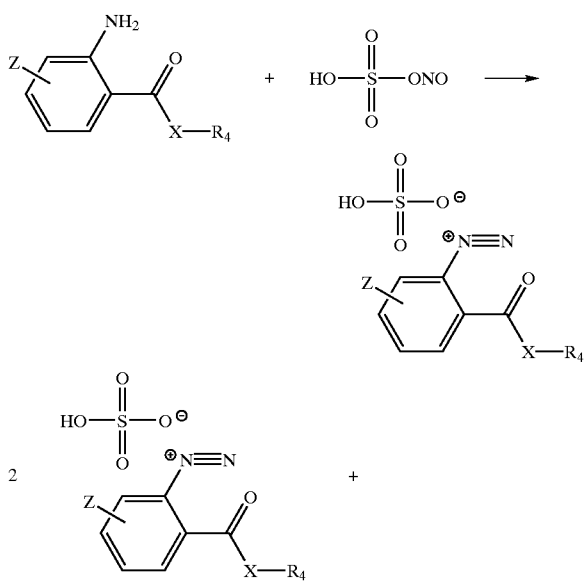

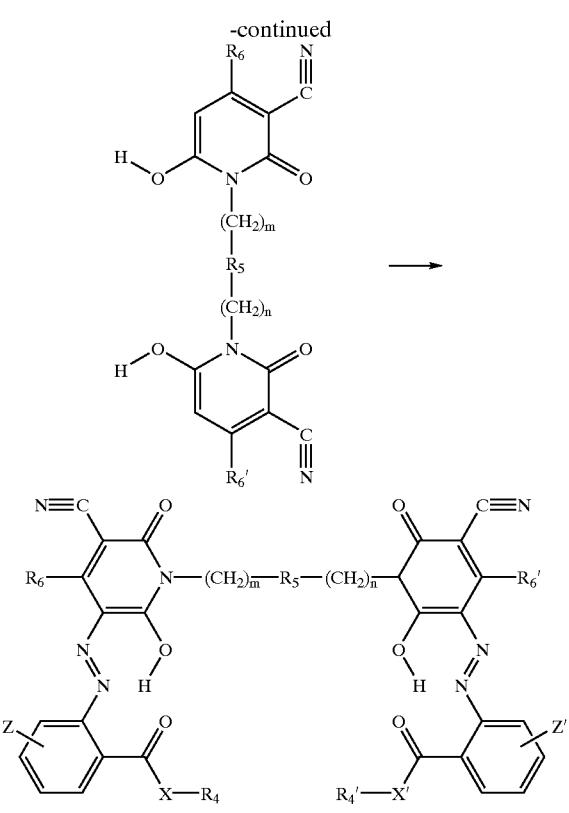

More specifically, the correspondingly substituted aniline is first subjected to a diazotization reaction by dissolving it in acetic acid diluted with a solvent and, optionally, a second acid, such as sulfuric acid, dodecylbenzene sulfonic acid, propionic acid, hydrochloric acid, phosphoric acid, any other acid useful for a diazotization reaction, or the like, as well as mixtures thereof. The solvent can be any solvent useful in a diazotization reaction, such as water, acetone, dimethylformamide, dimethyacetamide, tetrahydrofuran, dimethoxyethane, analogous higher-boiling ether solvents, and the like, as well as mixtures thereof.

The solvent and the aniline are present in any desired or effective relative amounts; if, for purposes of determining relative amounts, "solvent" is defined to include whatever solvent has been selected plus any amount of acetic acid and second acid present, the reactants are present in this combined solvent in relative amounts of in one embodiment at least about 100 grams of substituted aniline per liter of solvent, in another embodiment at least about 200 grams of substituted aniline per liter of solvent, and in yet another embodiment at least about 230 grams of substituted aniline per liter of solvent, and in one embodiment of no more than about 400 grams of substituted aniline per liter of solvent, in another embodiment of no more than about 300 grams of substituted aniline per liter of solvent, and in yet another embodiment of no more than about 270 grams of substituted aniline per liter of solvent, although the relative amounts can be outside of these ranges.

The acetic acid is present in any desired or effective amount, in one embodiment at least about I gram of acetic acid per gram of substituted aniline, in another embodiment at least about 2 grams of acetic acid per gram of substituted aniline, and in yet another embodiment at least about 3 grams of acetic acid per gram of substituted aniline, and in one embodiment no more than about to grams of acetic acid per gram of substituted aniline, in another embodiment no more than about 7 grams of acetic acid per gram of substituted aniline, and in yet another embodiment no more than about 5 grams of acetic acid per gram of substituted aniline, although the relative amounts can be outside of these ranges.

When present, the optional second acid is present in any desired or effective amount, in one embodiment at least about 0.05 gram of acid per gram of substituted aniline, and in another embodiment at least about 0.1 gram of acid per gram of substituted aniline, and in one embodiment no more than about 0.5 grams of acid per gram of substituted aniline, in another embodiment no more than about 0.3 grams of acid per gram of substituted aniline, and in yet another embodiment no more than about 0.2 grams of acid per gram of substituted aniline, although the relative amounts can be outside of these ranges.

Upon complete dissolution of the ingredients, the mixture is cooled, in one embodiment to a temperature of no more than about +15° C., in another embodiment to a temperature of no more than about +1° C., in yet another embodiment to a temperature of no more than about +5° C., in still another embodiment to a temperature of no more than about +3° C., and in one embodiment to a temperature of, no lower than about −5° C., and in another embodiment to a temperature of no lower than about −10 C., although the temperature can be outside of these ranges.

Thereafter, nitrosylsulfuric acid is added to the mixture in any desired or effective amount, in one embodiment at least about 1 mole of nitrosylsulfuric acid per mole of substituted aniline, and in another embodiment at least about 1.05 moles of nitrosylsulfuric acid per mole of substituted aniline, and in one embodiment no more than about 1.5 moles of nitrosylsulfuric acid per mole of substituted aniline, in another embodiment no more than about 1.25 moles of nitrosylsulfuric acid per mole of substituted aniline, and in yet another embodiment no more than about 1.1 moles of nitrosylsulfuric acid per mole of substituted aniline, although the relative amounts can be outside of these ranges. In a specific embodiment, the nitrosylsulfuric acid, is added dropwise at a rate such that the temperature of the reaction mixture does not exceed 15° C.

The reaction is essentially instantaneous, and upon completion of addition of the nitrosylsulfuric acid the reaction is essentially complete, although, if desired, a qualitative test can be performed to confirm reaction completion.

Thereafter, residual excess nitrosylsulfuric acid present in the reaction mixture can be quenched by the addition of a quenching agent, such as sulfamic acid, urea, or the like as well as mixtures thereof, in any desired or effective amount, in one embodiment at least about 0.01 mole of quenching agent per mole of nitrosylsulfuric acid (i.e., per mole of nitrosylsulfuric acid originally added to the reaction mixture), in another embodiment at least about 0.05 mole of quenching agent per mole of nitrosylsulfuric acid, and in yet another embodiment at least about 0.1 mole of quenching agent per mole of nitrosylsulfuric acid, and in one embodiment no more than about 0.5 mole of quenching agent per mole of nitrosylsulfuric acid, in another embodiment no more than about 0.3 mole of quenching agent per mole of nitrosylsulfuric acid, and in yet another embodiment no more than about 0.2 mole of quenching agent per mole of nitrosylsulfuric acid, although the amount can be outside of these ranges. Upon completion of the reaction, the reaction mixture contains the corresponding diazonium salt.

A precursor solution of the dipyridone having the desired substituents thereon is prepared in an appropriate solvent, such as a mixture of water, organic solvents, including lower alcohols such as methanol, ethanol, isopropanol, and the like, water-miscible nonbasic organic solvents such as tetrahydrofuran, acetone, dimethoxyethane, N,N-dimethylformamide, N,N-dimethylacetamide, and the like, as well as mixtures thereof. Mixtures of water with an organic solvent can be helpful for ease of solvating inorganic and organic salts that are a reaction by-product. In this instance, water and the organic solvent are present in any desired or effective relative amounts, in one embodiment at least about 0.25 gram of organic solvent per gram of water, in another embodiment at least about 0.3 gram of organic solvent per gram of water, and in yet another embodiment at least about 0.4 gram of organic solvent per gram of water, and in one embodiment no more than about 4 grams of organic solvent per gram of water, in another embodiment no more than about 3 grams of organic solvent per gram of water, and in yet another embodiment no more than about 2 grams of organic solvent per gram of water, although the relative amounts can be outside of these ranges.

The dipyridone is present in the precursor solution in any desired or effective amount, in one embodiment at least about 10 grams of dipyridone per liter of solvent, in another embodiment at least about 30 grams of dipyridone per liter of solvent, and in yet another embodiment at least about 50 grams of dipyridone per liter of solvent, and in one embodiment no more than about 200 grams of dipyridonre per liter of solvent, in another embodiment no more than about 10 grams of dipyridone per liter of solvent, and in yet another embodiment no more than about 70 grams of dipyridone per liter of solvent, although the relative amounts can be outside of these ranges.

The dipyridone precursor solution is maintained at an alkaline pH, typically of at least about 10, and in one embodiment no more than about 14, and in another embodiment no more than about 12, although the pH can be outside of these ranges. The dipyridone precursor solution can contain a mixture of a base and an optional buffering salt.

Examples of suitable bases include mineral bases, such as sodium hydroxide, potassium hydroxide, and the like, as well as water-miscible organic tertiary amines, such as triethanolamine, N,N-diethylethanolamine, and the like, as well as mixtures thereof, present in any desired or effective amount, in one embodiment at least about 2 mole of base per mole of dipyridone (i.e., at least about 1 mole of base per mole of pyridone moiety in the dipyridone), in another embodiment at least about 4 moles of base per mole of dipyridone, in yet another embodiment at least about 6 moles of base per mole of dipyridone, and in still another embodiment at least about 10 moles of base per mole of dipyridone, and in one embodiment no more than about 20 moles of base per mole of dipyridone, in another embodiment no more than about 14 moles of base per mole of dipyridone, and in yet another embodiment no more than about 10 moles of base per mole of dipyridone, although the relative amounts can be outside of these ranges.

Examples of suitable buffer salts include those corresponding to the principal acid solvent; for example, when the principal acid solvent is acetic acid, suitable buffers include sodium acetate, potassium acetate, sodium hydrogenphosphate, citric acid, and the like, as well as mixtures thereof, present in any desired or effective amount, in one embodiment at least about 2 moles of buffer per mole of dipyridone (i.e., at least about 1 mole of buffer per mole of pyridone moieties in the dipyridone), in another embodiment at least about 4 moles of buffer per mole of dipyridone, in yet another embodiment at least about 6 moles of buffer per mole of dipyridone, and in still another embodiment at least about 10 moles of buffer per mole of dipyridone, and in one embodiment no more than about 20 moles of buffer per mole of dipyridone, in another embodiment no more than about 14 moles of buffer per mole of dipyridone, and in yet another embodiment no more than about 10 moles of buffer per mole of dipyridone, although the relative amounts can be outside of these ranges. In a specific embodiment, upon dissolution of the dipyridonie, the thus-formed precursor dipyridone solution can be filtered to remove any undissolved solids.

The solution containing the diazonium salt, maintained at a cold temperature, is then slowly added to the dipyridone solution in any desired or effective relative amounts, in one embodiment at least about 0.5 mole of dipyridone per mole of diazonium salt, in another embodiment at least about 0.6 mole of dipyridone per mole of diazonium salt, and in yet another embodiment at least about 0.75 mole of dipyridone per mole of diazonium salt, and in one embodiment no more than about 1.5 moles of dipyridone per mole of diazonium salt, in another embodiment no more than about 1 mole of dipyridone per mole of diazonium salt, and in yet another embodiment no more than about 0.8 mole of dipyridone per mole of diazonium salt, although the relative amounts can be outside of these ranges, resulting in the immediate formation of a bright yellow precipitate. Thereafter, the yellow precipitate can be collected by filtration and, if desired, washed.

Precursor anilines and dianilines can be prepared by any desired or effective method, such as that disclosed in, for example, "The Chemistry of Isatoic Anhydride," G. M. Coppola, *Synthesis*, p. 505 (1980); "Isatoic Anhydride. IV. Reactions with Various Nucleophiles," R. P. Staiger et al., *J. Org. Chem.*, Vol. 24, p. 1214 (1959); $R_1$ P. Staiger et al., *J. Chem,. Eng. Data* B, p. 454 (1963); and U.S. Pat. No. 4,016,143; the disclosures of each of which are totally incorporated herein by reference.

Precursor pyridones and dipyridones can be prepared by any desired or effective method, such as that disclosed in, for example, "Investigation of the Reaction Conditions for the Synthesis of 4,6-Disubstituted-3-cyano-2-pyridones and 4-Methyl-3-cyano-6-hydroxy-2-pyridone," D. Z. Mijin et al., *J. Serb. Chem. Soc.*, Vol. 59, No. 12, p. 959 (1994); "Synthesis of Isoquinoline Alkaloids. II. The Synthesis and Reactions of 4-Methyl-3-pyridinecarboxaldehyde and Other 4-Methyl-3-substituted Pyridines, J. M. Bobbitt et al., *J. Org. Chem.*, Vol 25, p. 560 (1960); "Synthesis and Dyeing Characteristics of 5-(4-Arylazophenyl)azo-3-cyano-4-methyl-6-hydroxy-2-pyridones," J. M. Kanhere et al., *Indian Journal of Textile Research*, Vol. 13, p. 213 (1988); "Synthesis of Some Pyridone Azo Dyes from 1-Substituted 2-Hydroxy-6-pyridone Derivatives and their Colour Assessment," C. Chen et al., *Dyes and Pigments*, Vol. 15, p. 69 (1991); "Synthesis of 3-Cyano-6-hydroxy-5-(2-(perfluoroalkyl)phenylazo)-2-pyridones and their Application for Dye Diffusion Thermal Transfer Printing," M. Matsui et al., *Bull. Chem. Soc. Jpn.*, 1993, Vol. 66, Iss. 6, Pp. 1790–4; "Synthesis of N-alkylcyanopyridones," B. Peng et al., Faming Zhuanli Shenqing Gongkai Shuomingshu (1997), CN 1158845; "Synthesis of 1-Butyl-3-cyano-4-methyl-6-hydroxypyrid-2-one," X. Kong et al., Huaxue Shiji (1998), 20(1), 58–59; "Regioselective Conversion of 3-Cyano-6-hydroxy-2-pyridones into 3-Cyano-6-amino-2-pyridones," A. R. Katritzky et al., J. Heterocycd. Chem. (1995), 32(3), 1007–10; "The Synthesis of Some Hetarylazopyridone Dyes and Solvent Effects on their Absorption Spectra," N. Ertan et al., Dyes Pigm. (1995), 27(4), 313–20; "Process for the Preparation of Pyridone Compounds," H. Schmid, Ger. Offen. DE 4314430 (1994); Tautomerism of 4-Methyl-6-hydroxy-2-pyridone derivatives," H. Liu et al., Dalian Ligong Daxue Xuebao (1992), 32(4), 405–11; "Preparation of 1-Alkyl-3-cyano-4-methyl-6-hydroxy-2-pyridone-type Mixed Azo Coupling Components," J. Prikryl et al., Czech. (1991) 8 pp. CODEN: CZXXA9 CS 273045 B1 19911220 CAN 118:256604 AN 1993:256604 CAPLUS; "Structural Characteristics of Hydroxypyridone Derivatives," Q. Peng et al., Dalian Ligong Daxue Xueboo (1991), 31(3), 279–86; and "6-Hydroxypyridin-2-ones," F. Schmidt, Ger. Often. DE 2845863 (1980); the disclosures of each of which are totally incorporated herein by reference.

While not being limited to any particular theory, it is believed that the ortho-substitution structural feature of the colorant molecules of the present invention enables the formation of strong intramolecular hydrogen bonds between the azo group, the hydroxyl group, and the carbonyl group that imparts rigidity and significant photostability to the colorant under visible light conditions. It is believed that these bonds form as follows (showing here both the enol and the hydrazone tautomers in which this type of molecule exists, as taught by, for example, "Synthesis of Some Pyridone Azo Dyes from 1-Substituted 2-Hydroxy-6-pyridone Derivatives and their Colour Assessment," C. Chen et al., *Dyes and Pigments*, Vol.15, p. 69 (1991), the disclosure of which is totally incorporated herein by reference):

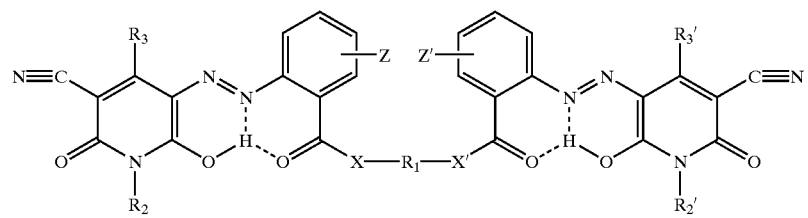

-continued

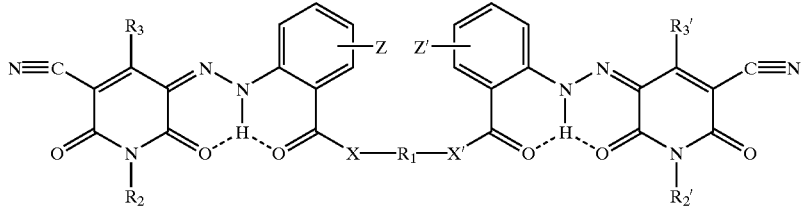

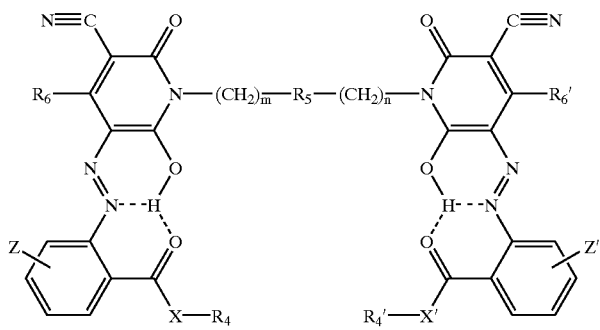

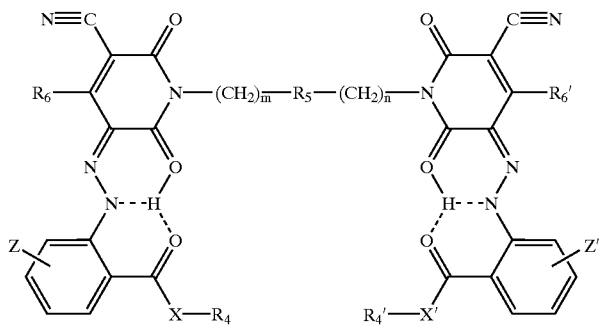

It is believed that this structural feature can also impart thermal stability and chemical stability to the colorant molecule. Further, while not being limited to any particular theory, it is believed that including alkyl or alkylene groups with at least about 12 carbon atoms, particularly (although not necessarily) branched alkyl groups of this type, in the colorant molecule further reduce diffusion or leaching of the colorant molecule from a medium such as a phase change ink vehicle into adjacent inks of different colors (leading to intercolor bleed), adjacent unprinted areas (leading to edge raggedness), tape adhesives (leading to edge raggedness and possible illegibility), and the like. Additionally, it is believed that by including two azo pyridone chromophores within the colorant molecule, the spectral strength of the colorant is substantially increased, enabling the use of substantially reduced amounts of colorant in, for example, an ink without decreasing the color and the spectral properties (L*a*b*) of the ink or jeopardizing the optical density or color of the prints generated with the ink.

In addition to being suitable for use in phase change inks, the colorants of the present invention can be used in applications such as textile dying, biological dying applications that rely on high spectral strength chromophores, electronics applications, such as organic photoconductors, optical filters, and the like, color filters for liquid crystal display systems, and the like.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

A colorant of the formula

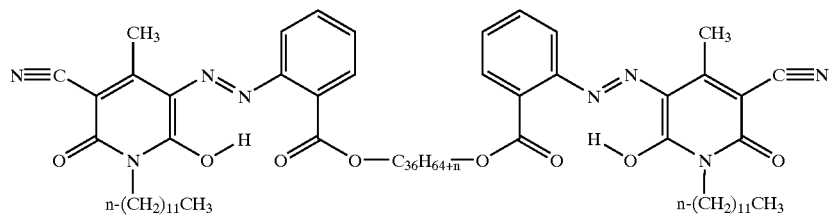

wherein $C_{36}H_{64+n}$ was a branched alkylene group which may include unsaturations and cyclic groups, wherein n is an integer of 0, 1, 2, 3, 4, 5, 6, 7, 8, 9, or 10, and wherein one isomer thereof was of the formula

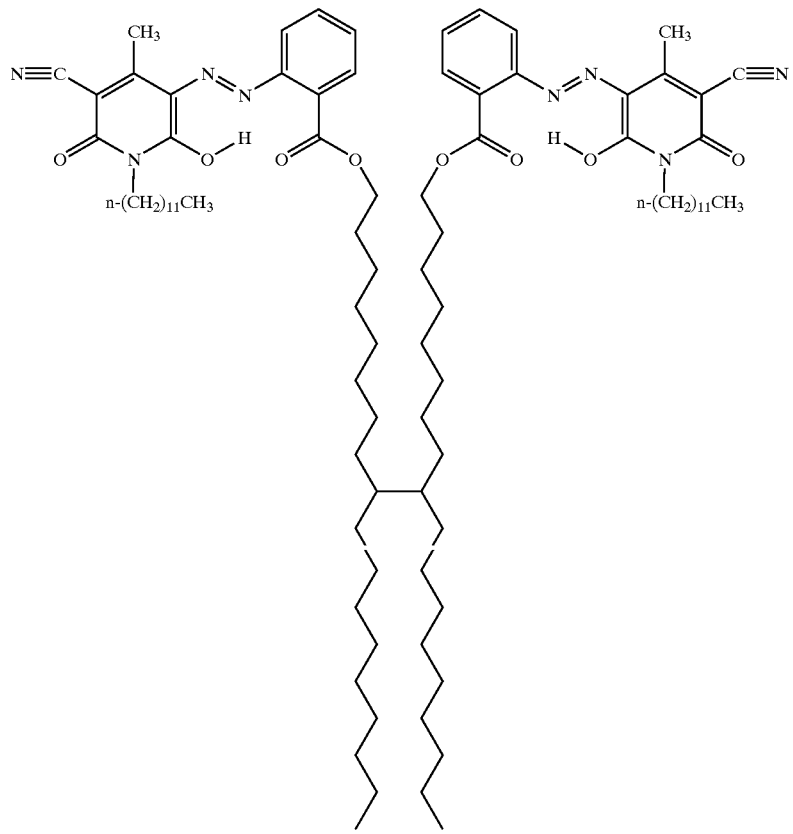

was prepared as follows.

A dimer ester anthranilate of the formula

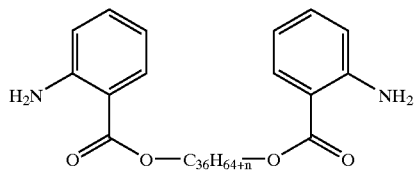

wherein $C_{36}H_{64+n}$ was a branched alkylene group which may include unsaturation and cyclic groups, wherein n is an integer of 0, 1, 2, 3, 4, 5, 6, 7, 8, 9, or 10, and wherein one isomer thereof was of the formula

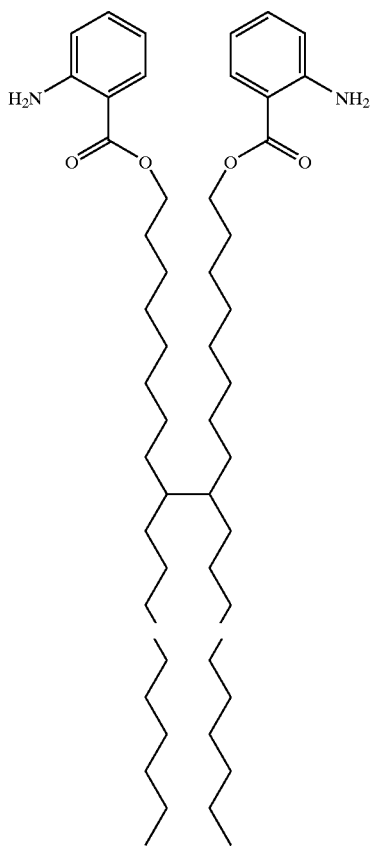

was prepared as follows. Into a 3 liter kettle equipped with mechanical stirrer, water condenser, and thermometer was sequentially charged: isatoic anhydride (203.9 grams, 1.25 mol; obtained from Sigma-Aldrich, Milwaukee, Wis.), PRIPOL® 2033 (C-36 dimer diol mixture including isomers of the formula

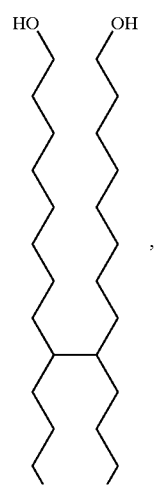

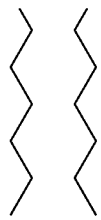

as well as other branched isomers which may include unsaturations and cyclic groups; 267 grams, 0.5 mol, obtained from Uniqema, New Castle, Del.; further information on $C_{36}$ dimer diols of this type is disclosed in, for example, "Dimer Acids," *Kirk-Othmer Encyclopedia of Chemical Technology*, Vol. 8, $4^{th}$ Ed. (1 992), pp. 223 to 237, the disclosure of which is totally incorporated herein by reference), 1,4-diazabicyclo[2.2.2]octane (28 grams, 0.25 mol; obtained from Sigma-Aldrich Co.), and toluene (750 milliliters). The heterogeneous mixture thus formed was heated to 115° C. (internal temperature). During the ensuing reaction, evolution of gaseous $CO_2$ byproduct was observed. After approximately 3 hours of heating time, the reaction was complete. The mixture was cooled to room temperature and a 1.0 Molar aqueous solution of sodium hydroxide (500 milliliters, 0.5 mol) was added to the mixture. The mixture was divided into two 2 liter separatory funnels. Into each funnel was added ethyl acetate (350 milliliters), followed by the addition of brine (saturated aqueous sodium chloride) solution whereby the volume ratio of organic phase to aqueous phase was about 2 to 1. The organic phase was washed with 5×300 milliliter aliquots of brine solution until the pH was neutral. The organic layer extracts obtained were combined, dried over anhydrous $MgSO_4$ powder, and then filtered. The solvents were removed by distillation in vacuo with a rotary evaporator, giving an amber-colored viscous oil which was subsequently dried under high vacuum to give 372 grams (96 percent yield) of product. The purity of the dimer ester anthranilate product was observed to be very high by $^1$H-NMR spectroscopy, estimated at 97 percent, with 3 percent attributed to residual toluene solvent. $^1$H-NMR spectral assignments (300 MHz, $CDCl_3$): 7.85 ppm (doublet, 2H integration), 7.22 ppm (triplet, 2H), 6.60 ppm (superimposed doublet+triplet, 4H), 5.7 ppm (broad singlet), 4.25 ppm (triplet, $CH_2OC=O$, 4H), 1.75 ppm to 0.8 ppm (aliphatic CH, $CH_2$, $CH_3$ protons, 3 signals totaling 80 H integration).

Into a 2 liter round-bottom flask equipped with mechanical stirrer and Dean Stark trap was charged melted dodecylamine (185.0 grams, 1.0 mol; melting point 30 to 32° C.; obtained from Akzo Nobel Chemicals, Mississauga, Ontario), followed with ethyl cyanoacetate (135.6 grams, 1.2 mol, density 1.06 grams per milliliter; obtained from Spectrum Chemicals, New Brunswick, N.J.). The mixture was stirred and heated to 120° C. for a period of 1 hour, during which time a liquid by-product was distilled away. To the hot reaction mixture while stirring was then sequentially added the solvent N,N-dimethylformamide (320 grams, obtained from Caledon Labs, Brampton, Ontario), ethyl acetoacetate (260.0 grams, 2.0 mol, density 1.02 grams per milliliter; obtained from Lonza Group, Germany), and piperazine (192.2 grants, 2.0 mol; obtained from Spectrum Chemicals, New Brunswick, N.J.). The resultant mixture was heated to 110° C. internal temperature for 4 hours, during which time more liquid by-product was distilled away. A golden brown viscous solution resulted thereafter which was cooled to room temperature. The solution was carefully poured, with vigorous stirring while at room temperature, into a prepared solution of methanol (1,624 grams), deionized water (684 grams), and concentrated nitric acid (322 grams, 3.6 mol). A solid material precipitated immediately, and the resulting slurry was stirred for an additional 30 minutes. The slurry was vacuum filtered, and the solid filter cake was rinsed several times with 500 milliliter portions of a solvent mixture comprising 70 percent by volume methanol and 30 percent by volume water, until the conductivity of the filtrate was low. The solid cake was dried at 40° C. under vacuum for 24 hours to give 277 grams (87 percent yield) of the dodecyl pyridone product as a light beige solid. $^1$H-NMR spectral analysis indicated that the product was of high purity, with no evidence of contaminants exceeding approximately 2 percent of the product yield. $^1$H-NMR spectral assignments (300 MHz, DMSO-$d_6$): 5.6 ppm (singlet, H at ring position C-5), 3.88 ppm (broad triplet, 2H, $CH_2$ adjacent ring N), 2.2 ppm (singlet, 3H, $CH_3$ at ring position C-4), 1.6 ppm to 0.8 ppm ($CH_2$ and $CH_3$ protons from dodecyl group, 3 signals totaling 65 H integration).

Into a 1 liter round bottom flask equipped with a mechanical stirrer, dropping funnel, and thermometer was charged the dianthranilate prepared above (108 grams, 0.139 mol), followed sequentially with 210 milliliters of glacial acetic acid, 18 milliliters of concentrated sulfuric acid, 20 milliliters of deionized water, and 20 milliliters of propionic acid (obtained from Sigma-Aldrich Co.). The dark solution was chilled to an internal temperature of +3° to +50° C. Nitrosylsulfuric acid (NSA, commercial solution containing 40 percent by weight NSA in sulfuric acid, obtained from Sigma-Aldrich Co.; 56 milliliters, 0.285 mol) was then charged into the dropping funnel and was dripped slowly into the dianthranilate solution so as to keep the internal temperature between +3° and +5° C. and to minimize the emission of $NO_x$ gases. After about 1.5 hours, the NSA addition was completed. A small portion of sulfamic acid (1 gram, 0.01 mol) was then added to the mixture to quench any residual NSA, and the mixture was stirred for an additional 15 minutes.

The solution of dodecyl pyridone was prepared using a 10 liter graduated beaker equipped with a mechanical stirrer. Into this vessel was charged sodium hydroxide (55 grams, 1.39 mol) and sodium acetate (114 grams, 1.39 mol), followed with deionized water (3.5 liters) and isopropanol (2.5 liters). Once all of the ingredients had dissolved, the dodecylpyridone prepared above was added to the solution and stirred vigorously until all pyridone solids were dissolved. The cold diazonium salt solution was then slowly poured into the dodecylpyridone coupling solution at room temperature. An instant bright yellow precipitate was formed, and after complete addition, the resulting slurry was stirred for an additional 0.5 hour prior to recovering the colorant material. The yellow slurry was vacuum filtered through a 3 micron hydrophobic membrane. The yellow filter cake was then reslurried again into a 20:80 mixture of isopropanol:deionized water, stirred for 30 minutes, and then filtered again. The filter cake was then subjected to the following treatment several times: redispersion into 1 liter of deionized water, stirring for 30 minutes, then filtration through a 3 micron hydrophobic membrane, until the pH of the resulting filtrate was greater than 5.0 and the conductivity of the filtrate was low. The cake was then dried in a vacuum-oven at 30° C. over 36 hours, affording 192.6 grams (96.3 percent yield) of the crude product as a mustard-yellow granular powder, melting point range of 123 to 134° C. The crude product was purified further by stirring in 2 liters of a hot mixture of 1:1 acetone and isopropanol to afford a bright orange-yellow powder. This purified material had a melting point of 128 to 134° C., UV/vis wavelength maximum of 430 nm (toluene), and spectral strength in toluene of $5.37 \times 10^4$ milliliters per gram-centimeter. $^1$H-NMR spectral assignments (300 MHz, $CDCl_3$): 8.18 ppm (doublet, 2H integration, aromatic H), 8.05 ppm (doublet, 2H integration, aromatic H), 7.65 ppm (triplet, 2H integration, aromatic H), 7.30 ppm (triplet, 2H integration, aromatic H), 4.45 ppm (doublet of doublets, 4H integration, $CH_2$ adjacent ester), 4.00 ppm (doublet of doublets, 4H integration, $CH_2$ adjacent pyridone), 2.65 ppm (singlet, 6H integration, $CH_3$ on pyridone ring), 1.90–0.80 ppm (multiplets, CH, $CH_2$, $CH_3$ integrating for >60H, all other alkyl protons).

EXAMPLE II

A colorant of the formula shown in Example I was prepared as follows. A dimer ester anthranilate of the formula shown in Example I was prepared as described in Example I. Into a 1 liter round bottom flask equipped with mechanical stirrer, dropping funnel, and thermometer, was charged under agitation the dianthranilate (54.4 grams, 0.070 mol) followed with a prepared solution containing 173 milliliters of glacial acetic acid, 43 milliliters of deionized water, and 15 milliliters of concentrated sulfuric acid. The resulting dark solution was chilled to an internal temperature of +3 to +5° C. Nitrosylsulfuric acid (NSA, commercial solution containing 40 percent by weight NSA in sulfuric acid, obtained from Sigma-Aldrich Co., Milwaukee, Wis., 45.6 grams, 0.144 mol) was charged into the dropping funnel and then dripped slowly into the solution at a rate whereby the internal temperature was maintained between 0° C. and +8° C. After 20 minutes, the NSA addition was completed and the mixture was stirred for an additional 15 minutes while being cooled at 0° C. Urea (0.2 grams, 3.3 mmol) was then added to the mixture to quench any residual NSA reagent and the mixture was stirred for 15 more minutes.

A coupling solution of dodecyl pyridone was prepared in a 2 liter kettle equipped with mechanical stirrer. Into this vessel was charged dodecyl pyridone (45.7 grams, 0.144 mol) prepared as described in Example I, followed with 457 milliliters of isopropanol. A solution of sodium hydroxide (21.5 grams, 0.538 mol), sodium acetate trihydrate (73.2 grams, 0.538 mol), and 457 milliliters of deionized water was prepared and then added to the briskly stirred dispersion of the pyridone in isopropanol. A brown solution was formed after 15 minutes of stirring at room temperature. The cold diazonium salt solution was then slowly poured into the vigorously stirring dodecyl pyridone coupling solution. A bright yellow precipitate was formed instantly, and after complete addition of the diazonium salt solution, the yellow slurry was stirred an additional 30 minutes.

The yellow slurry was vacuum filtered through a 3 micron hydrophobic membrane media. The yellow dye cake was then redispersed into a 50:50 mixture of isopropanol and deionized water and stirred for 30 minutes. The filter cake was then subjected to the following treatment several times—redispersion into 1 liter of a 50:50 mixture of isopropanol and deionized water, stirring for 30 minutes, and filtration through 3 micron hydrophobic membrane—until the pH of the resulting filtrate was greater than 5.0 and the conductivity of the filtrate was low. The filter cake was given two final rinses with 1 liter volumes of methanol. The cake was then dried in a vacuum-oven at 40° C. for 36 hours, affording 90 grams (89.6 percent yield) of the crude product as a bright yellow powder, melting point range of 121 to 133° C., UV/vis wavelength maximum of 430 nm (toluene) and spectral strength in toluene of $5.14 \times 10^4$ milliliters per gram-centimeter. If desired, this material can be further purified by recrystallization as described in Example I.

EXAMPLE III

A colorant of the formula

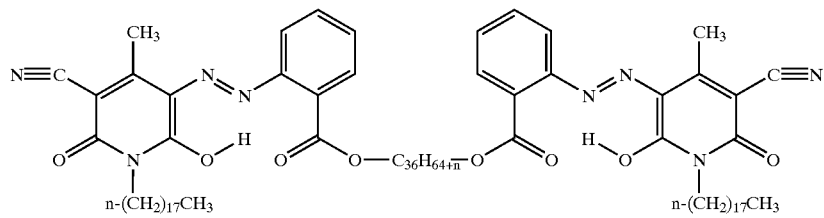

wherein $C_{36}H_{64+n}$ was a branched alkylene group which may include unsaturations and cyclic groups, wherein n is an integer of 0, 1, 2, 3, 4, 5, 6, 7, 8, 9, or 10, and wherein one isomer thereof was of the formula

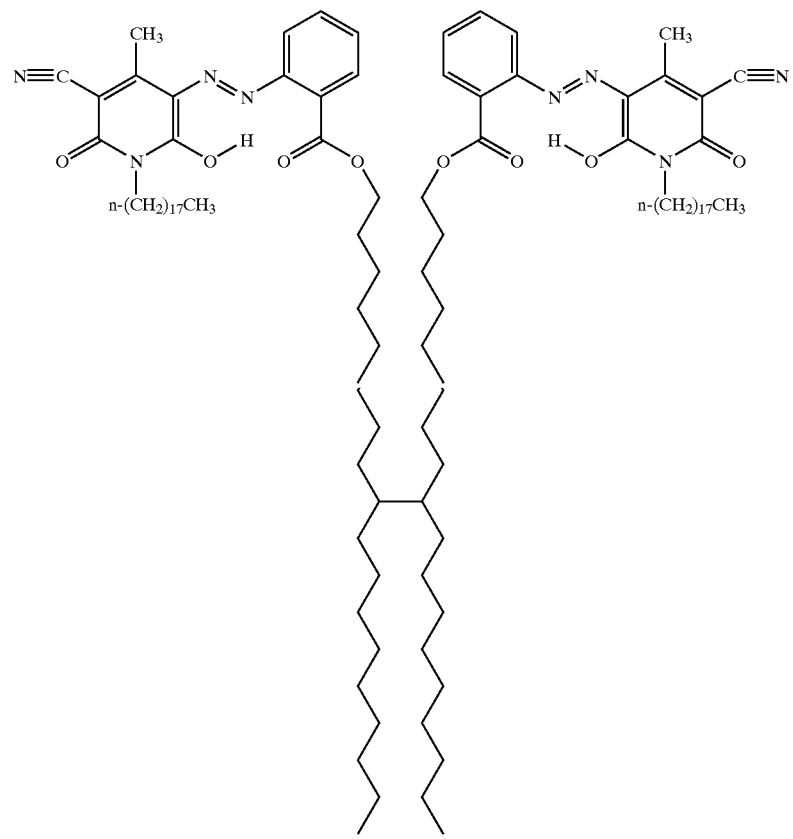

was prepared as follows.

A dimer ester anthranilate of the formula

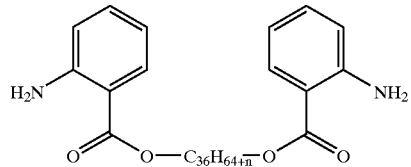

wherein $C_{36}H_{64+n}$ was a branched alkylene group which may include unsaturations and cyclic groups, wherein n is an integer of 0, 1, 2, 3, 4, 5, 6, 7, 8, 9, or 10, and wherein one isomer thereof was of the formula

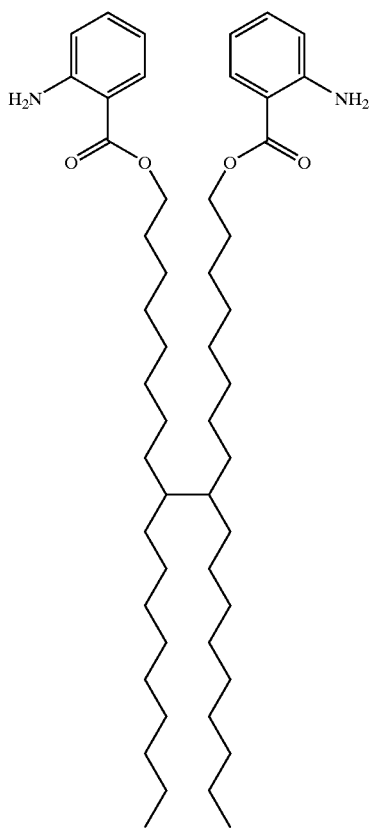

was prepared as described in Example I.

Into a 2 liter flask equipped with magnetic stir bar and temperature thermostat was charged octadecylamine (stearylaminle, 18.9 grams, 0.07 mol; obtained from Sigma-Aldrich-Co., Milwaukee, Wis.) followed with ethyl cyanoacetate (7.9 grams, 0.07 mol, density 1.06 grams per milliliter; obtained from Spectrum Chemicals, New Brunswick, N.J.). The resulting mixture was stirred and heated to 120° C. internal temperature for 1 hour, during which time a liquid byproduct was distilled away. To the hot reaction mixture was then sequentially added ethyl acetoacetate (10.08 grams, 0.0775 mol, density 1.02 grams per milliliter; obtained from Lonza Group, Germany), piperidine (11.0 grams, 0.13 mol, density 0.861 grams per milliliter; obtained from Sigma-Aldrich Co.), and a solvent mixture (60 milliliters) containing 5 parts by weight toluene and 1 part by weight 1,2-dimethoxyethane. The reaction proceeded with stirring at 120° C. for another 24 hours. The solvents were then distilled off in vacuo, and the remaining viscous solution was carefully poured into a stirring solution of methanol (80 milliliters), deionized water (20 milliliters), and concentrated hydrochloric acid (16 milliliters, 2.5 mol). A solid precipitate formed instantly and the slurry wads vacuum filtered followed by rinsing of the solid cake with 2×50 milliliter portions of 80 percent aqueous methanol. The cake thus obtained was air-dried for 24 hours to afford 24.5 grams (0.061 mol, 87 percent yield) of N-stearyl pyridone product as light tan powder.

Into a 1 liter round bottom flask equipped with a mechanical stirrer, dropping funnel, and thermometer was charged the dimer ester anthranilate prepared above (87 grams, 0.112 mol), followed sequentially with 170 milliliters of glacial acetic acid, 17 milliliters of concentrated sulfuric acid, 17 milliliters of deionized water, and 17 milliliters of propionic acid (obtained from Sigma-Aldrich Co.). The dark solution was chilled to an internal temperature of +3° C. to +5° C. while stirring. Nitrosylsulfuric acid (NSA, commercial solution containing 40 percent by weight NSA in sulfuric acid, obtained from Sigma-Aldrich Co.; 71 grams, 0.224 mol) was then charged into the dropping funnel and was dripped slowly into the solution so as to keep the internal temperature between 0° and+8° C. After 1 hour, the NSA addition was completed, and the mixture was stirred for an additional 0.5 hour while chilled. Sulfamic acid (1 gram, 0.01 mol) was then added to the mixture to quench any residual NSA, and the mixture was stirred for an additional 15 minutes.

The solution of stearyl pyridone was prepared in a 4 liter flask equipped with mechanical stirrer. Into this vessel was charged sodium hydroxide (45 grams, 1.12 mol) and sodium acetate (92 grams, 1.12 mol), followed with deionized water (2 liters) and isopropanol (1.5 liter). Once all of the ingredients had dissolved, excess stearyl pyridone (139.5 grams, 0.35 mol) was added to the solution under vigorous agitation. The mixture was agitated for 30 minutes, after which any undissolved solids were removed by filtration. The pyridone solution was then transferred to a 10 liter glass vessel equipped with mechanical stirrer. The cold diazonium salt solution was then slowly poured into the briskly stirring stearyl pyridone solution at room temperature. A bright yellow precipitate was formed instantly, and the slurry viscosity increased as more diazonium salt solution was added, requiring an additional 1.0 liter of deionized water to aid stirring. The slurry was stirred for 1 hour at room temperature prior to recovering the colorant material. The slurry was vacuum filtered through a 3 micron hydrophobic membrane media. All of the colorant material from the filter cake was then dissolved into 4 liters of dichloromethane solvent and divided into two 2 liter separatory funnels. Several extractions of the dichloromethane layer were performed using 1 liter portions of deionized water until the final aqueous layer measured a pH of about 5 and a low conductivity. The dichloromethane solvent was removed in vacuo by distillation, leaving a crude yellow-brown solid. The crude product was recrystallized in boiling isopropanol (about 3 liters) to afford a bright yellow-orange granular powder, melting point range of 122 to 123° C. $^1$H-NMR spectral analysis showed this material to be of high purity in accordance with the structure shown.

EXAMPLE IV

A colorant of the formula

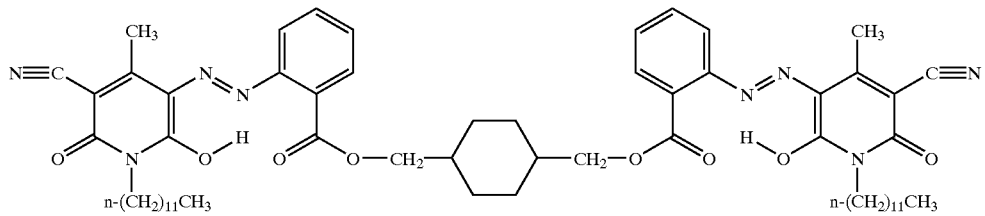

(including both the cis and the trans configurational isomers within the central cyclohexane ring) was prepared as follows.

A dimer ester anthranilate of the formula

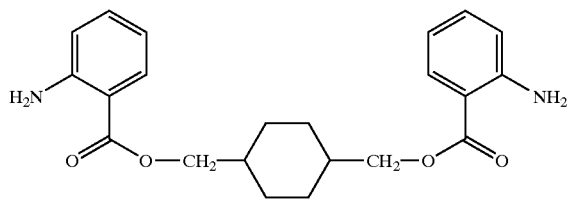

(including both the cis and the trans configurational isomers within the central cyclohexane ring) was prepared as follows. 1,4-Cyclohexanedimethanol (144.2 grams, 1.0 mol), isatoic anhydride (408 grams, 2.50 mol; obtained from Sigma-Aldrich Co.), and triethylamine (22.4 grams, 0.20 mol; obtained from Sigma-Aldrich Co.) in 500 milliliters of N,N-dimethylformamide in a 4 liter beaker was stirred and heated to 100° C. for 2.5 hours. The reaction solution was then cooled to 50° C. and treated with 2 liters of methanol. The resultant white suspension was stirred for 2 hours, followed by filtration and washing of the solid in the filter funnel with 5×100 milliliter portions of methanol. Drying at 60° C. for 24 hours gave 195.5 grams of white solid, identified as pure 1,4-cyclohexanedimethyl dianthranilate (greater than 99 percent by $^1$H-NMR spectroscopy). The melting point of this product was 144 to 145° C.

Dodecyl pyridone was prepared as described in Example I.

To a suspension of the 1,4-dimethylcyclohexane dianthranilate prepared above (19.1 grams, 0.050 mol) in 100 milliliters of glacial acetic acid was added concentrated sulfuric acid (10 milliliters) followed sequentially with 20 milliliters of water. The resultant suspension was cooled in an ice-salt bath and the temperature was maintained between +3 and +6° C. as nitrosyl sulfuric acid (NSA, commercial solution containing 40 percent by weight NSA in sulfuric acid, obtained from Sigma-Aldrich Co.; 21 milliliters, 0.105 mol) was slowly dripped into the stirred mixture over 45 minutes. The resultant suspension was stirred at about 5° C. for 1 hour.

The coupler solution of dodecyl pyridone was prepared by suspending the dodecyl pyridone prepared as described in Example I (31 grams, 0.105 mol) in 800 milliliters of water and adding sodium hydroxide (20 grams, 0.50 mol), sodium acetate (49 grams, 0.60 mol), and isopropanol (400 milliliters). The resultant turbid solution was vigorously stirred while the suspension of the diazotized dianthranilate was slowly poured into it. A bright yellow suspension formed at once. The suspension was stirred at room temperature for 1 hour, followed by filtration and washing of the solid with 3×500 milliliter portions of water. The wet cake was redispersed in 2 liters of water and was then filtered and washed with 3×100 milliliters of water followed by 3×100 milliliters of isopropanol. The wet cake was then stirred in 100 milliliters of isopropanol at 80° C. for 1 hour. Filtration and washing with isopropanol followed by drying in air for 24 hours gave the crude product as a green-yellow solid (26.7 grams). The product was stirred in 400 milliliters of dichloromethane, and the suspension thus obtained was then treated with 100 milliliters of methanol. The mixture was filtered and the solid was washed with 4×50 milliliter portions of methanol. The collected solid was dried at 60° C. to give 23.1 grams (44 percent yield) of the colorant as bright yellow powder.

EXAMPLE V

A colorant of the formula

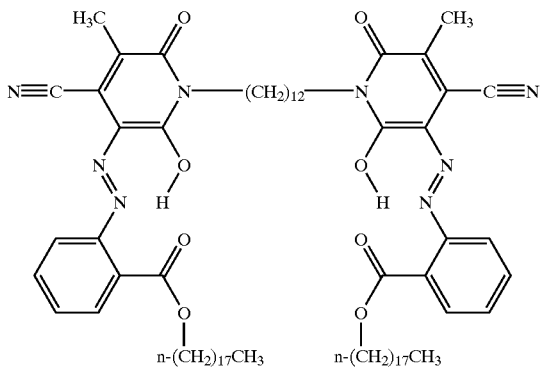

was prepared as follows.

A mixture of octadecanol (270 grams, 1.0 mol; obtained from Sigma-Aldrich Co.), isatoic anhydride (244 grams, 1.5 mol; obtained from Sigma-Aldrich Co.), and 1,4-diazabicyclo[2.2.2]octane (56 grams, 0.50 mol; obtained from Sigma-Aldrich Co.), in 1,000 milliliters of dimethylformamide was stirred and heated to 100° C. in a 4 liter beaker. Vigorous gas evolution occurred. After 10 minutes, the resultant dark solution was heated to 150° C. for 15 minutes. The reaction mixture was then cooled to 50° C. and vigorously stirred while 3,000 milliliters of methanol was added. The resultant suspension was stirred for 0.5 hour, followed by vacuum filtration. The solid thus obtained was washed in the filter funnel with 4×300 milliliter portions of methanol and was then dried in air to give the product stearyl anthranilate as white powder (330.5 grams, 85 percent yield).

A mixture of 1,12-diaminododecane (100.1 grams, 0.50 mol; obtained from Sigma-Aldrich Co.) and ethyl cyanoacetate (135.2 grams, 128 milliliters, 1.20 mol; obtained from Spectrum Chemicals, New Brunswick, N.J.), in a 2 liter flask was stirred and heated at 150° C. for 1 hour, after which time the amine had been completely converted to the bis (cyanoacetate) as indicated by $^1$H-NMR analysis. Ethyl acetoacetate (383 milliliters, 3.00 mol; obtained from Lonza Group, Germany), piperazine (172 grams, 2.00 mol; obtained from Spectrum Chemicals), and dimethyl formarmide (300 milliliters) were then added to the reaction mixture and the mixture was heated at 120° C. for 4 hours. The resultant pale brown solution was then cooled to 25° C. and was poured into a mixture of methanol (1,500 milliliters), water (500 milliliters), and concentrated (70 percent) nitric acid (300 grams, 258 milliliters, 4.0 mol). A precipitate formed at once. The suspension was stirred overnight, followed by filtration and washing of the solid with 5×500 milliliter portions of 75:25 (volume ratio) of a methanol-water mixture and subsequent drying at 60° C. to give 198 grams (85 percent yield) of dodecamethylene dipyridone as a cream-white solid, which decomposed without melting at 210° C.

The stearyl anthranilate prepared above (25.3 grams, 0.065 mol) was dissolved in a mixture of glacial acetic acid (65 milliliters) and dodecylbenzene sulfonic acid (65 milliliters; obtained from Stepan Chemicals as BIOSOFT® S-101, Northfield, Ill.). The resulting solution was stirred and cooled in an ice bath and the temperature was maintained between 120 and 160° C. while nitrosyl sulfuric acid (NSA, commercial solution containing 40 percent by weight NSA in sulfuric acid, obtained from Sigma-Aldrich Co.;

22.2 grams, 14 milliliters, 0.07 mol) was slowly dripped into the solution. The solution was stirred for an additional 0.5 hour at about 5° C.

A dipyridone solution was prepared by dissolving the 1,12-dodecamethylene dipyridone prepared above (16.3 grams, 0.035 mol) in 800 milliliters of water containing 12 grams (0.30 mol) of sodium hydroxide, 33 grams (0.40 mol) of sodium acetate, and 200 milliliters of isopropanol. The diazonium salt solution was slowly poured into the turbid dipyridone solution with vigorous stirring. The resultant yellow suspension was stirred for 30 minutes at room temperature, followed by vacuum filtration. The collected solid was washed in the funnel with 3×50 milliliter portions of water. The wet cake was then dispersed in 1,000 milliliters of hot (70° C.) water and then was refiltered and the solid washed with 3×100 milliliter portions of water. The wet cake was thereafter dispersed in 100 milliliters of isopropanol, which was then heated at reflux for 1 hour. Hot filtration followed by washing with isopropanol (3×50 milliliter portions) followed by methanol (3×100 milliliter portions) and drying at 60° C. gave the colorant as a green-yellow solid (38.2 grams, 93 percent yield).

EXAMPLE VI

A colorant of the formula

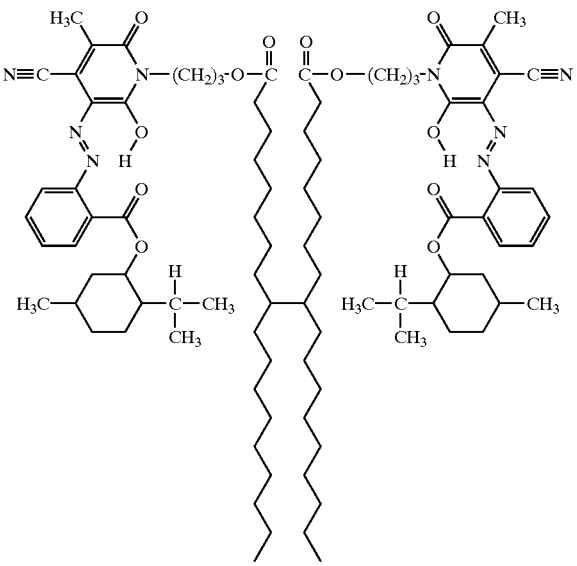

was prepared as follows.

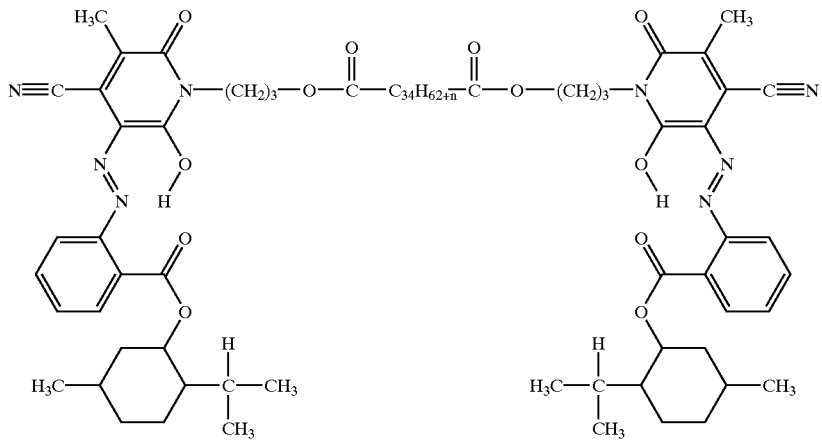

wherein $C_{34}H_{62+n}$ was a branched alkylene group which may include unsaturations and cyclic groups, wherein n is an integer of 0, 1, 2, 3, 4, 5, 6, 7, 8, 9, or 10, and wherein one isomer thereof was of the formula A 500 milliliter round-bottom flask was charged sequentidlly with ethyl cyanoacetate (10.4 grams, 0.092 mol; obtained from Sigma-Aldrich Co.), ethanol (60 milliliters), and 3-aminopropanol (7 grams, 0.095 mol; obtained from Sigma-Aldrich Co.). The mixture thus formed was stirred and heated to 50° C. over 2 hours, after which time neat ethyl acetoacetate (12 grams, 0.092 mol; obtained from Sigma-Aldrich Co.) was added into the mixture, followed by the addition of potassium carbonate powder (13.4 grams, 0.097 mol). The mixture was then stirred and heated at 90° C. for 8 to 10 hours. The mixture was then chilled in an ice bath and carefully acidified with 25 milliliters of 50 percent hydrochloric acid. A white precipitate formed instantly, and after stirring for 30 minutes, the slurry was vacuum filtered. The white solid cake thus collected was rinsed with cold tetrahydrofuran, and was then air-dried to give 16 grams of a white granular solid (84 percent yield). $^1$H-NMR analysis indicated that the material was pure N-(3-hydroxypropyl) pyridone.

A 250 milliliter round bottom flask equipped with thermometer and dropping funnel was charged with menthyl anthranilate (7.6 grams, 0.027 mol; obtained from Sigma- Aldrich Co.), followed sequentially by addition of glacial acetic acid (25 milliliters), water (5 milliliters), and concentrated sulfuric acid (1 milliliter), giving a clear colorless solution. The solution thus formed was cooled to an internal temperature of 0° C. Thereafter, nitrosyl sulfuric acid (NSA, commercial solution containing 40 percent by weight NSA in sulfuric acid, obtained from Sigma-Aldrich Co.; 5.4 milliliters, 0.027 mol) was added slowly by a dropping funnel at a rate such that the internal temperature was maintained between 0° C. and 8° C. After addition was completed, the mixture was stirred for 30 minutes, and then excess NSA was quenched by adding sulfamic acid (0.5 grams, obtained from Sigma-Aldrich Co.).

A solution containing the N-(3-hydroxypropyl) pyridone prepared above was then prepared as follows. A 500 milliliter vesisel equipped with mechanical stirrer was charged with sodium hydroxide (7.75 grams, 0.194 mol), anhydrous sodium acetate (22.7 grams, 0.277 mol), and water (200 milliliters). Once the solids were all dissolved, the N-(3-hydroxypropyl) pyridone (7.6 grams, 0.029 mol) was added and dissolved with stirring. The cold didzonium salt solution was then slowly poured into the pyridone solution with stirring, instantly forming a bright orange-yellow slurry. The mixture was stirred for 30 minutes more, followed by vacuum filtration. The orange yellow cake thus collected was repeatedly washed and reslurried with water until the filtrate pH was greater than 5.0 and the filtrate conductivity was low. The colorant thus formed was air-dried, giving 13.4 grams (quantitative yield) of a bright orange-yellow powder.

A 250 milliliter flask equipped with a water condenser and thermometer was charged with the menthyl anthranilate/3-hydroxypropylpyridone yellow colorant thus prepared (6 grams, 0.012 mol), a C-36 dimeric diacid (commercially sold as PRIPOL® 1009, obtained from Uniqema, Newcastle, Del.; 3.44 grams, 0.0061 mol) along with toluene (100 milliliters) and p-toluenesulfonic acid (460 milligrams, 2.4 mmol). The heterogeneous mixture thus formed was heated to dissolution at 1 10° C. After 9 hours the reaction was complete and the mixture was subsequently cooled to room temperature, resulting in the precipitation of an orange-yellow solid. The solid was extracted into a mixture of toluene (40 milliliters) and tetrahydrofuran (10 milliliters), then washed with deionized water (3×150 milliliter portions) until the pH of the aqueous layer was neutral. The organic layer was concentrated in vacuo to about 20 milliliters in volume, and was then treated with isopropanol to precipitate the colorant product. The colorant solid was filtered and air-dried to give 6.68 grams (72 percent yield) of a bright orange-yellow solid with a melting point of 156° C., UV/vis wavelength maximum of 430 nm (toluene), and spectral strength in toluene of $5.11 \times 10^4$ milliliters per gram-centimeter.

EXAMPLE VII

Various characteristics of the colorants prepared in Examples I through VI were measured. Structural confirmation of the anilines, pyridones, and colorants synthesized was obtained by $^1$H-NMR spectroscopy using a 300 mega-Hertz (7 Tesla) Bruker Avance DPX300 nuclear magnetic resonance spectrometer with a broadband X-transmitter four nucleus probe (two channel system), and performing the NMR analysis for a 50 milligram sample dissolved in deuterated solvents such as deuterated chloroform ($CDCl_3$) or hexa-deutero dimethylsulfoxide ($DMSO-d_6$), obtained from Sigma-Aldrich Co, Milwaukee, Wis. Melting points were determined by differential scanning calorimetry method using a TA Instruments DSC 2010 calorimeter and whereby a 10 milligram sample of the colorant was heated over one heating cycle at a heating rate of 10° C. per minute up to a maximum of 250° C. For some of the example colorants, quantitative weight percent content of carbon (C), hydrogen (H), and nitrogen (N) was determined by combustion analysis using a LECO CHNS 932 analyzer, for a 2 milligram sample of the colorant. UV/vis wavelength maximum and spectral strength of the colorants were measured in either toluene or dichloromethane solvents using a Hewlett-Packard 8452A diode-array spectrophotometer at a concentration of approximately 0.01 to 0.02 milligrams per milliliter. The results for average molecular weight (MW), melting point range (mp, ° C.), wavelength maximum in toluene ($\lambda_{max}$, nanometers), spectral strength (in toluene, except where otherwise indicated) (SS, $mL^*g^{-1}cm^{-1}$), and molar absorptivity ($\epsilon$, $L^*mol^{-1}cm^{-1}$) are shown in the table below. Molar Absorptivity $\epsilon$ is defined as the molar extinction coefficient of the colorant, and is expressed by the Beer-Lambert law:

$$\varepsilon = \frac{\text{(measured absorbance)}}{\text{(colorant concentration)} \times \text{(cell path length)}}$$

where colorant concentration has units of mole per liter and path length is 1 centimeter. In addition, Molar Absorptivity, $\epsilon(L^*mol^{-1}cm^-)$=Spectral Strength $(mL^*g^-{}_1cm^{-1}) \times$(colorant molecular weight)÷1000

For comparison purposes, these values are also provided for commercially available NEOPEN 075 YELLOW from BASF.

| Example | MW | mp | $\lambda_{max}$ | SS | $\epsilon$ |
| --- | --- | --- | --- | --- | --- |
| I | 1,436 | 123–134 (128–134)† | 430 | $4.87 \times 10^4$ | $6.99 \times 10^4$ |
| II | 1,436 | 123–134 (128–134)† | 430 | $4.25 \times 10^4$ | $6.82 \times 10^4$ |
| III | 1,604 | 122–123 | 430 | $4.89 \times 10^4$ | $7.84 \times 10^4$ |
| IV | 1,041 | 270 | 432* | $8.09 \times 10^{4*}$ | $8.44 \times 10^{4*}$ |
| V | 1,268 | 156 | 432* | $5.00 \times 10^{4*}$ | $6.34 \times 10^{4*}$ |
| VI | 1,520 | 155–157 | 430 | $5.11 \times 10^4$ | $7.77 \times 10^4$ |
| NEOPEN 075 | unknown | not measured | 430 | $7.47 \times 10^4$ | unknown |

† value in parentheses obtained using a recrystallized sample
*measured in dichloromethane

EXAMPLE VIII

Ink compositions containing the colorants of Examples I, II, III, and IV and, for comparison purposes, commercially available NEOPEN 075 YELLOW from BASF were prepared as follows.

Ink A: In a stainless steel beaker were combined 209.68 grams of polyethylene wax (PE 655, obtained from Baker Petrolite, Tulsa, Okla., of the formula $CH_3(CH_2)_{50}CH_3$), 95.54 grams of stearyl stearamide wax (KEMAMIDE® S-180, obtained from Crompton Corporation, Greenwich, Conn.), 114.76 grams of a tetra-amide resin obtained from the reaction of one equivalent of dimer diacid with two equivalents of ethylene diamine and UNICID® 700 (a carboxylic acid derivative of a long chain alcohol obtained from Baker Petrolite, Tulsa, Okla.), prepared as described in Example 1 of U.S. Pat. No. 6,174,937, the disclosure of which is totally incorporated herein by reference, 49.81 grams of a urethane resin obtained from the reaction of two equivalents of ABITOL® E hydroabietyl alcohol (obtained from Hercules Inc., Wilmington, Del.) and one equivalent of isophorone diisocyanate, prepared as described in Example 1 of U.S. Pat. No. 5,782,966, the disclosure of which is totally incorporated herein by reference, 20.23 grams of a urethane resin that was the adduct of three equivalents of stearyl isocyanate and a glycerol-based alcohol prepared as described in Example 4 of U.S. Pat. No. 6,309,453, the disclosure of which is totally incorporated herein by reference, and 1.01 gram of NAUGUARD® 445 antioxidant (obtained from Uniroyal Chemical Co., Middlebury, Conn.). The materials were melted together at a temperature of about 135° C. in an oven, then blended by stirring in a temperature controlled mantle at about 135° C. for about 0.2 hour. To this mixture was then added 24.58 grams of the yellow dye prepared as described in Example I. After stirring for about 2 additional hours, the yellow ink thus formed was filtered through a heated MOTTU apparatus (obtained from Mott Metallurgical) using NAE 0.2 micro filter and Whatman #3 filter paper (on top) under a pressure of about 15 pounds per square inch. The filtered phase change ink was poured into molds and allowed to solidify to form ink sticks. The yellow phase change ink thus prepared exhibited a viscosity of about 10.7 centipoise as measured by a Rheometrics cone-plate viscometer at about 140° C., melting points of about 85° C. and 105° C. as measured by differential scanning calorimetry using a DuPont 2100 calorimeter, a glass transition temperature ($T_g$) of about 15° C., and a spectral strength of about 2314 milliliters absorbance per gram at 428 nanometers, determined by using a spectrophotographic procedure based on the measurement of the colorant in solution by dissolving the solid ink in n-butanol and measuring the absorbance using a Perkin Elmer Lambda 2S UV/VIS spectrophotometer.

Ink B: Ink B was prepared in a similar manner to that usedito prepare Ink A but using a different formulation for the ink composition as described in the table below. The properties of Ink B were obtained using the same methods as those used for Ink A. As shown in the table, the predominant difference between Ink A and Ink B is the relative dye concentration in the ink. The spectral strength of the ink containing a colorant will decrease according to decreasing dye concentration in the ink. The viscosities of Ink A and Ink B are virtually the same.

Ink C: An ink was prepared by the process described for Ink A except that instead of the colorant from Example I, the colorant from Example III was used. The properties of Ink C were obtained using the same methods as those used for Ink A.

Ink D (Comparative): An ink was prepared by the process described for Ink A except that instead of the colorant from Example I, the commercially available NEOPEN 075 colorant (obtained from BASF) was used. The properties of Ink D were obtained using the same methods as those used for Ink A.

Colorant-free Ink Base: A colorless phase change ink base was prepared in the same manner as described for Ink A except that no colorant was used. The colorless ink base was made for the purpose of evaluating the extent of colorant diffusion into colorless ink base.

The following table summarizes the compositions of the various inks and the amounts of ingredients (weight percentage numbers given in the table) therein:

| Ingredient | Ink A | Ink B | Ink C | Ink D | Colorless Ink Base |
|---|---|---|---|---|---|
| POLYWAX | 40.67 | 41.08 | 41.35 | 41.07 | 41.18 |
| S-180 | 18.53 | 18.63 | 18.76 | 18.61 | 19.51 |
| Tetra-amide | 22.26 | 23.61 | 19.88 | 22.60 | 20.16 |
| Urethane Resin 1* | 9.66 | 10.25 | 8.63 | 9.85 | 14.09 |
| Urethane Resin 2** | 3.92 | 4.16 | 3.51 | 3.71 | 4.86 |

-continued

| Ingredient | Ink A | Ink B | Ink C | Ink D | Colorless Ink Base |
|---|---|---|---|---|---|
| Example I colorant | 4.77 | 2.05 | — | — | — |
| Example III colorant | — | — | 7.70 | — | — |
| NEOPEN 075 | — | — | — | 3.99 | — |
| NAUGUARD 445 | 0.20 | 0.21 | 0.17 | 0.17 | 0.20 |
| Total | 100.0 | 100.0 | 100.0 | 100.0 | 100.0 |

*ABITOL E based urethane resin
**glycerol alcohol based urethane resin

The yellow inks thus prepared were successfully printed on HAMMERMILL LASERPRINT® paper (obtained from International Paper, Memphis, Tenn.) in a XEROX® PHASER 850 printer, which uses a printing process wherein the ink is first jetted in an image wise pattern onto an intermediate transfer member followed by transfer of the image wise pattern from the intermediate transfer member to a final recording substrate. The solid field images with a resolution of 355 dpi×464 dpi were generated from the printer, and their color space data were obtained on the ACS® Spectro Sensor® II Colorimeter (from Applied Color Systems Inc.) in accordance with the measuring methods stipulated in ASTM 1E805 (Standard Practice of Instrumental Methods of Color or Color Difference Measurements of Materials) using the appropriate calibration standards supplied by the instrument manufacturer. For purposes of verifying and quantifying the overall colorimetric performance of the inks, measurement data were reduced, via tristimulus integration, following ASTM E308 (Standard Method for Computing the Colors of Objects using the CIE System) in order to calculate the 1976 CIE L* (Lightness), a* (redness-greenness), and b* (yellowness-blueness) CIELAB values for each phase change ink sample. In addition, the values for CIELAB Psychometric Chroma, $C^*_{db}$, and CIELAB Psychometric Hue Angle, were calculated according to publication CIE15.2, Colorimetry (Second Edition, Central Bureau de la CIE, Vienna, 1986).

Printed samples of the yellow inks were evaluated for color characteristics, which are reported in the table below. As is apparent to one skilled in the art, the CIE L*a*b* values for inks made with colorants according to the present invention represent an excellent yellow shade printed ink. The table below lists the viscosity (η, centipoise) of the inks at 140° C., the spectral strength in n-butanol (SS, mL*g$^-$1cm$^{-1}$) of the inks, and the CIE L*a*b color coordinates of the prints made with the inks using the XEROX PHASER® 850 printer:

| Ink | η | SS | L*/a*/b* |
|---|---|---|---|
| A | 10.72 | 2314 | 85.4 |
|  |  |  | −2.1 |
|  |  |  | 102.3 |
| B | 10.53 | 3082 | 94.2 |
|  |  |  | −8.7 |
|  |  |  | 114.7 |
| C | 10.72 | 2314 | 85.4 |
|  |  |  | −2.1 |
|  |  |  | 102.3 |
| D | 10.69 | 3366 | 89.4 |
|  |  |  | −14.7 |
|  |  |  | 98.0 |

The color values in the above table indicate that the colorant of Example I and the colorant of Example III can be used in hot melt inks with good yellow color as evidenced by the high b* values of the prints. A lower concentration of the colorant of Example I was used in Ink B, which generated a similar degree of yellow color, as evidenced in the value of b*, to that of comparative Ink D, which was formulated with the commercial colorant NEOPEN 075 and at higher colorant concentration.

EXAMPLE IX

The solubility of the colorants of Examples I and III and, for comparative purposes, commercially available Neopen 075 dye, in a phase change ink carrier was examined. Ink compositions containing these colorants (Inks A, C, and D, respectively) were prepared as described in Example VIII. Since phase change inks are subjected to a range of temperatures during printer warm-up and standby mode as well as during operation, it is desirable for the colorants to be complete soluble in the inks at temperatures as low as 125° C. The solubility of each colorant in its respective ink was tested at different temperatures by first heating the inks up to 145° C. and then cooling them down, followed by reheating. The results were as follows:

| Temperature | Ink A | Ink C | Ink D |
|---|---|---|---|
| 135° C. | soluble | soluble | soluble |
| 125° C. | soluble | soluble | soluble |
| 115° C. | soluble | soluble | insoluble |
| 105° C. | insoluble | soluble | insoluble |
| 100° C. | insoluble | soluble | insoluble |
| reheating after cooldown | | | |
| 105° C. | insoluble | soluble | insoluble |
| 115° C. | insoluble | soluble | insoluble |
| 120° C. | soluble | soluble | soluble |
| 125° C. | soluble | soluble | soluble |

As the results indicate, the colorants of Examples I and III remained completely soluble in their respective inks at temperatures equal to or higher than 125° C.

EXAMPLE X

Inks were prepared as described in Example VIII containing the colorant of Example I, the colorant of Example III, and, for comparative purposes, commercially available NEOPEN 075 dye (Inks A, C, and D, respectively). Colorant thermal stability in the inks was evaluated by heating the test inks for several days at 145° C. temperatures. Degradation of the colorants was evaluated by monitoring the change (loss) in ink spectral strength at a given test temperature as a function of time. The remaining spectral strength was used here as the measurement of remaining undegraded colorant in the ink for each day of heating at 145° C. The results were as follows:

| Day | Ink A | Ink C | Ink D |
|---|---|---|---|
| 0 | 100% | 100% | 100% |
| 1 | 98% | — | — |
| 2 | 96% | 97% | 99% |
| 4 | 93% | — | — |
| 5 | — | — | 74% |
| 6 | — | 94% | — |
| 7 | 90% | — | — |
| 8 | — | 92% | 50% |
| 10 | 86% | — | — |
| 11 | — | 90% | — |
| 14 | — | — | 24% |
| 15 | 80% | 86% | — |

— = not measured

As the results indicate, the colorants of Example I and Example III exhibit clearly superior thermal stability in the Inks A and C compared to Ink D formulated with the commercial colorant NEOPEN 075.

EXAMPLE XI

Inks were prepared as described in Example VIII containing the colorant of Example I, the colorant of Example III, and, for comparative purposes, commercially available NEOPEN 075 dye (Inks A, B, C, and D). A clear ink was also prepared of the same composition as the base carrier of the yellow inks of Example VIII but containing no colorants.

Colorant degradation not only leads to a decrease in spectral strength (as shown in Example X) but can also generate undesirable color as a result of the colorant decomposition reaction in the ink. Both of these phenomena can adversely affect the color quality of prints from the inks if the colorant is not thermally stable. From a practical application point of view, it is the overall color change of the ink (measured as ΔE change in color values) that matters most when evaluating colorant thermal stability.

A thermal stability test was performed by heating the test inks and the colorless ink base in a printer and measuring the color change of the prints as a function of time (referred to as the "No-standby" test). The color changes of the resultant prints were monitored by CIELAB values and expressed by Delta E relative to the initial CIELAB values. The color change of each sample was determined according to the methods described herein above for obtaining CIELAB values. Color changes were determined following ASTM D2244-89 (Standard Test Method for Calculation of Color Differences From instrumentally Measured Color Coordinates) (delta $E=[(L^*_1-L^*_2)^2+(a^*_1-a^*_2)^2+(b^*_1-b^*_2)^2]^{1/2}$). The results for Inks A, C, and D and for the clear ink base were as follows:

| Day | Ink A ΔE | Ink B ΔE | Ink C ΔE | Ink D ΔE | colorless ink base ΔE |
|---|---|---|---|---|---|
| 0 | 0 | 0 | 0 | 0 | 0 |
| 1 | 2.2 | 6.2 | 4.8 | 7.4 | 1.1 |
| 2 | 3.6 | 3.8 | 9.7 | 16.5 | 1.5 |
| 4 | 5.9 | 6.4 | 18.3 | 32.6 | 2.6 |
| 7 | 9.4 | 10.4 | — | — | 7.9 |
| 9 | 11.0 | 12.9 | 37.2 | 53.4 | 10.2 |
| 11 | — | 15.2 | 43.6 | 53.2 | 12.4 |
| 14 | — | 18.6 | 47.8 | 62.2 | 16.1 |

— = not measured

As the data indicate, Inks A and B containing the colorant of Example I demonstrated substantially better color stability than comparative Ink D containing NEOPEN 075. In addition, the color changes observed in Inks A and B containing the colorant of Example I can be attributed largely to discoloring of the ink base, as shown by the data for the colorless ink base, providing further evidence of the excellent thermal stability of the colorant of Example I. Ink C containing the colorant of Example III also showed better color stability than Ink D.

EXAMPLE XII

Inks A, B, C, and D prepared as described in Example VIII were tested for diffusion. A clear ink base was also prepared as described in Example VIII. This diffusion evaluation method used printed images to test for the ability of the colorant from a yellow ink pixel to diffuse into neighboring colorless ink pixels that surrounded the yellow ink pixel. The test prints were generated to contain about 20 percent individual yellow pixels surrounded by 80 percent clear ink pixels. The prints were analyzed at 45° C. and 60° C. over a number of days for overall color change detected using a color image analyzer, and the response was measured as change in delta E (ΔE) over time and shown in the table below. The color difference of each sample was determined according to the methods described herein above for obtaining CIELAB values. Color differences were determined following ASTM D2244-89 (Standard Test Method for Calculation of Color Differences From instrumentally Measured Color Coordinates) (delta $E=[(L^*_1-L^*_2)^2+(a^*_1-a^*_2)^2+(b^*_1-b^*_2)^2]^{1/2}$). Heating the prints served to mimic the conditions when prints are handled in warm climates or passed through high-speed document handlers. The 60° C. print tests were designed as an accelerated test to offer information on colorant diffusion over long periods of time at temperatures lower than 60° C.

| Day | Ink A | Ink B | Ink C | Ink D |
|---|---|---|---|---|
| 0 | 0.0 | 0.0 | 0.0 | 0.0 |
| 1 | 2.3 | 1.6 | 2.4 | 9.8 |
| 2 | 3.7 | 2.5 | 3.4 | 13.3 |
| 3 | 4.5 | 3.0 | 4.2 | 15.6 |
| 4 | 5.2 | 3.6 | 4.6 | 17.3 |
| 7 | 6.8 | 4.8 | 6.1 | 21.1 |
| 10 | 7.8 | 5.3 | 6.8 | 23.4 |
| 14 | — | — | 7.8 | — |
| 15 | 9.0 | 6.3 | — | 26.2 |
| 21 | 10.2 | 7.2 | — | 28.2 |
| 39 | 12.0 | 8.5 | — | 31.4 |
| ΔE after extended heating at 45° C.; — = not measured | | | | |
| 0 | 0.0 | 0.0 | 0.0 | 0.0 |
| 1 | 5.8 | 4.1 | 5.0 | 17.0 |
| 2 | 8.2 | 5.7 | 7.3 | 22.1 |
| 3 | 9.4 | 6.7 | 8.9 | 25.2 |
| 4 | 10.8 | 7.8 | 10.1 | 27.5 |
| 7 | 13.0 | 9.6 | 12.4 | 31.0 |
| 10 | 14.2 | 10.7 | 14.2 | 32.7 |
| 14 | — | — | 15.3 | — |
| 15 | 15.5 | 11.9 | — | 34.2 |
| 21 | 16.6 | 12.9 | — | 35.0 |
| 39 | 18.0 | 14.7 | — | 35.5 |

ΔE after extended heating at 60° C.; — = not measured

As the data indicate, at test temperatures of 45° C. and 60° C., all colorants examined had diffused into surrounding clear base pixels, as evident by the color change and measured as a change in delta E (ΔE). However, the colorants of Examples I, II, and III (Inks A, B, and C) underwent diffusion to a significantly lesser degree than the comparative colorant NEOPEN 075 in Ink D. Therefore, the colorants of Examples I, II, and III are superior to the comparative commercial colorant NEOPEN 075 in their ability for minimal dye diffusion.

EXAMPLE XIII

The inks with the colorants of Examples I and III (Inks A and C, respectively) were tested for colorant diffusion. Ink compositions were prepared containing the colorants of Examples I and III (Inks A and C) and, for comparison purposes, commercial colorant NEOPEN 075 (Ink D) were prepared as described in Example VIII. A colorless ink was also prepared of the same composition as the base carrier of the yellow inks of Example VIII but containing no colorants. This diffusion evaluation method entailed generating text prints of the yellow inks, applying SCOTCH® tape (obtained from 3M, St. Paul, Minn.) adhesive to a portion of the text, and examining the extent of colorant diffusion into the adhesive material over time. The text print samples were studied at room temperature and 60° C. to observe how heat amplified the ability for colorant diffusion. This test simulated the real situation when one applies SCOTCH® tape adhesive labels onto prints generated with inks containing the colorants. Heating the prints served to mimic the conditions when prints are handled in warm climates or passed through high-speed document handlers. The 60° C. print tests were designed as an accelerated test to offer information on colorant diffusion over long periods of time at temperatures lower than 60° C. A rating system was developed to evaluate the degree of relative colorant diffusion between ink examples, with a rating scale of 1 to 5 wherein a score of 5 represents no noticeable colorant diffusion in the affected text area, and 1 represents excessive colorant diffusion resulting in totally illegible text characters in the affected area.

After seven days at 60° C., the printed text area using comparative Ink D with commercial colorant NEOPEN 075 displayed extensive colorant diffusion into the applied tape resulting in totally illegible text characters, and this ink was assigned a score of 1. For Inks A and C containing the colorants of Example I and III, the extent of diffusion was minimally noticeable and the printed text situated beneath the adhesive tape was still legible even under the 60° C. heating conditions, and inks A and C were each assigned a relative score of 3. The accelerated test performed at 60° C. heating temperature provided results that clearly demonstrate greatly improved diffusion performance of the colorants of Examples I and III, as compared to commercial colorant NEOPEN 075. Diffusion testing with applied adhesive tape under room temperature (20° C.) conditions showed that the extent of colorant diffusion was virtually negligible for all the example inks A, C, and D. The table below summarizes the colorant diffusion testing scores for inks A, C, and D after 7 days of aging at both room temperature (20° C.) and 60° C. heating conditions.

| Ink | 0 days (score before aging) | 7 days at 20° C. | 7 days at 60° C. |
|---|---|---|---|
| A | 5 | 5 | 3 |
| C | 5 | 5 | 3 |
| D | 5 | 4 | 1 |

EXAMPLE XIV

The solid prints with a resolution of 355 dpi×464 dpi, printed on Hammermill papers by using PHASER® 850 from Inks A, C, and D were tested for lightfastness. The prints were irradiated with a 2500-W xenon Arc lamp in Fade-Ometer (Atlas Electric Devices Co., Chicago, Ill.) for varied periods of time at room temperature. The color difference of each irradiated sample relative to its respective un-irradiated control swatch was determined according to the methods described herein above for obtaining CIELAB values. Color differences were determined following ASTM D2244-89 (Standard Test Method for Calculation of Color Differences From instrumentally Measured Color Coordinates) $\Delta E=[(L^*_1-L^*_2)^2+(a^*_1-a^*_2)^2+(b^*_1-b^*_2)^2]^{1/2}$. The table below shows the values of ΔE indicating the change in color values as a function of time:

| Exposure Hours | Ink A ΔE | Ink C ΔE | Ink D ΔE |
|---|---|---|---|
| 0 | 0 | 0 | 0 |
| 5 | 1.6 | 1.2 | 0.4 |
| 10 | 1.8 | 1.2 | 0.8 |
| 20 | 2.1 | 1.3 | 1.1 |
| 50 | 2.1 | 1.5 | 1.4 |
| 100 | 2.0 | 1.8 | 2.6 |

As the data indicate, all of these yellow inks exhibited excellent lightfastness, with ΔE being substantially less than 10 even after 100 hours of irradiation.

EXAMPLE XV

A phase change ink according to the present invention is prepared as follows. A solid ink carrier composition is prepared as described in Example 11 of U.S. Pat. No. 5,780,528, the disclosure of which is totally incorporated herein by reference. To this composition is added about 2.0 percent by weight of the yellow colorant prepared as described in Example I. After stirring for about 3 additional hours, the yellow ink thus formed is filtered through a heated MOTT® apparatus (obtained from Mott Metallurgical) using #3 Whatman filter paper and a pressure of about 15 pounds per square inch. The filtered phase change ink is then poured into molds and allowed to solidify to form ink sticks.

It is believed that the yellow phase change ink thus prepared will exhibit a viscosity of about 11 to 13 centipoise as measured by a Rheometrics cone-plate viscometer at about 140° C., a melting point of about 80° C. as measured by differential scanning calorimetry using a DuPont 2100 calorimeter, a glass transition temperature ($T_g$) of about 14° C., and a spectral strength (determined by using a spectrophotometric method based on the measurement of the colorant in solution by dissolving the solid ink in toluene and measuring the absorbance using a Perkin Elmer Lambda 2S UV/VIS spectrophotometer) of about 150 milliliters absorbance per gram at about 555 nanometers.

EXAMPLE XVI

Into a 2 liter round-bottom flask equipped with mechanical stirrer and Dean Stark trap was charged octylamine (194 grams, 1.5 mol; obtained from Aldrich Chemicals, Oakville, Ontario) followed with ethyl cyanoacetate (203 grams, 1.8 mol; obtained from Spectrum Chemicals, New Brunswick, N.J.). The mixture thus formed was stirred and then heated to 1400° C. for a period of 1 hour, during which time a by-product formed and was allowed to distill away.

To the hot reaction mixture was then sequentially added a imethylformamide solvent (375 milliliters; obtained from Caledon Labs, Brampton, Ontario), ethyl acetoacetate (390 grams, 3.0 mol; obtained from Lonza Group, Germany), and piperazine (258 grams, 3.0 mol; obtained from Spectrum Chemicals, New Brunswick, N.J.). The mixture thus formed was heated at 110° C. for a period of 4 hours, during which time more by-product was distilled off. The resulting solution was then allowed to cool to room temperature.

The solution was then carefully poured, with vigorous stirring, into a prepared room temperature solution of methanol (2 liters), deionized water (2 liters), and concentrated nitric acid (448 grams, 5 mol). A solid precipitate formed almost at once, and the resulting slurry was stirred for 30 minutes. The slurry was then vacuum filtered and the, solid cake was rinsed in the funnel with 1 liter portions of a solvent mixture containing 50 percent by volume methanol and 50 percent by volume water. The solid was dried at 40° C. under vacuum for 24 hours to give the octyl pyridone product as a light beige solid (yield 343 grams; 87 percent). $^1$H-NMR spectral analysis indicated that the product was of high purity, with no evidence of contaminants exceeding approximately 2 percent of the product yield.

EXAMPLE XVII

Into a 2 liter round-bottom flask equipped with mechanical stirrer and Dean Stark trap was charged 1,12-diaminododecane (100.1 grams, 0.5 mol; obtained from Aldrich Chemicals, Oakville, Ontario) followed with ethyl cyanoacetate (135.5 grams, 1.2 mol; obtained from Spectrum Chemicals, New Brunswick, N.J.). The mixture thus formed was stirred and then heated to 150° C. for a period of 1 hour, during which time a by-product had distilled away.

To the hot reaction mixture was then sequentially added a dimethylformamide solvent (300 milliliters; obtained from Caledon Labs, Brampton, Ontario), ethyl acetoacetate (325 grams, 2.5 mol; obtained from Lonza Group, Germany), and piperazine (172 grams, 2.0 mol; obtained from Spectrum Chemicals, New Brunswick, N.J.). The mixture thus formed was heated at 120° C. for a period of 4 hours, during which time more by-product had distilled away. The resulting solution was then allowed to cool to room temperature.

The solution was then carefully poured, with vigorous, stirring, into a room temperature solution of methanol (1.5 liter), deionized water (500 milliliters), and concentrated nitric acid (360, grams, 4 mol). A solid precipitate formed, and the resulting slurry was stirred for 30 minutes. The slurry was then vacuum filtered and the solid cake was rinsed in the funnel with 1 liter portions of a solvent mixture containing 75 percent by volume methanol and 25 percent by volume water. The solid was dried at 40° C. under vacuum for 24 hours to give the dipyridone product as a light beige solid (yield 183 grams; 79 percent). $^1$H-NMR spectral analysis indicated that the product was of high purity, with no evidence of contaminants exceeding approximately 2 percent of the product yield.

EXAMPLE XVIII

Into a 2 liter round-bottom flask equipped with mechanical stirrer and Dean Stark trap was charged 4—(aminomethyl)-1,8-diaminooctane (86.7 grams, 0.5 mol; obtained from Aldrich Chemicals, Oakville, Ontario) followed with ethyl cyanoacetate (186.5 grams, 1.65 obtained from Spectrum Chemicals, New Brunswick, N.J.). The mixture thus formed was stirred and heated at 1200° C. for a period of 1 hour, during which time a by-product had distilled away.

To the hot reaction mixture was then sequentially added ethyl acetoacetate (599 grams, 4.5 mol; obtained from Lonza Group, Germany) and piperazine (258 grams, 3.0 mol; obtained from Spectrumn Chemicals, New Brunswick, N.J.). The mixture thus formed was heated at 110° C. for a period of 3 hours, during which time more by-product was distilled off. The resulting solution was then allowed to cool to room temperature.

The solution was then carefully poured, with vigorous stirring, into a room temperature solution of methanol (1.2 liter), deionized water (1.4 liters), and concentrated nitric acid (590 grams, 6.5 mol). A solid precipitate formed, and the resulting slurry was stirred for 30 minutes. The slurry was then vacuum filtered and the solid cake was, rinsed in the funnel with 1 liter portions of a solvent mixture containing 75 percent by volume methanol and 25 percent by volume water. The solid was dried at 400° C. under vacuum for 24 hours to give the tripyridone product as a light beige solid (yield 131 grams; 46 percent). $^1$H-NMR spectral analysis indicated that the product was of high purity, with no evidence of contaminants exceeding approximately 2 percent of the product yield.

EXAMPLE XIX

Into a 1 liter round-bottom flask equipped with mechanical stirrer and Dean Stark trap was charged melted stearylamine (135.0 grams, 0.5 mol; obtained from Aldrich Chemical, Oakville, Ontario) followed with ethyl cyanoacetate (67.8 grams, 0.6 mol, density 1.06 grams per milliliter; obtained from Spectrum Chemicals, New Brunswick, N.J.). The mixture thus formed was stirred and then heated to 120° C. for a period of 1 hour, during which time a by-product had distilled away.

To the hot reaction mixture stirring at 120° C. internal temperature was then sequentially added dimethylformamide (190 grams; obtained from Caledon Labs, Brampton, Ontario), ethyl, acetoacetate (130.0 grams, 1.0 mol, density 1.02 grams per milliliter, obtained from Lonza Group, Germany), and piperazine (86.2 grams, 1.0, mol; obtained from Spectrum Chemicals, New Brunswick, N.J.). The mixture thus formed was heated to 120° C. for a period of 6 hours, during which time more by-product had distilled off. The resulting solution was then allowed to cool to room temperature.

The solution was then carefully poured, with vigorous stirring, into a room temperature solution of methanol (1,975 grams) and concentrated nitric acid (180 grams, 2.0 mol). A solid precipitate formed almost at once, and the resulting slurry was stirred for 30 minutes. The slurry was then vacuum filtered in a 25 centimeter Buchner funnel, and the solid cake was rinsed in the funnel with 500 milliliter portions of a solvent mixture containing 50 percent by volume methanol and 50 percent by volume water until the conductivity of the filtrate was low. The solid was dried at 60° C. for 48 hours to give the stearyl pyridone product as a light beige solid (yield 169.5 grams; 84 percent). $^1$H-NMR spectral analysis indicated that the product was of high purity, with no evidence of contaminants exceeding approximately 2 percent of the product yield.

EXAMPLE XX 1,4-Cyclohexanedimethanol (144.2 grams, 1.0 mol), isatoict anhydride (408 grams, 2.50 mol; obtained from Sigma-Aldrich), and triethyamine (22.4 grams, 0.20 mol; obtained from Sigma-Aldrich), in 506 milliliters of dimethyl formamide in a 4 liter beaker was stirred and heated to 1 00° C. for 2.5 hours. The reaction solution was then cooled to 50° C. and treated with 2 liters of methanol. The resultant white suspension was stirred for 2 hours, then was filtered, and the solid was washed in the filter funnel with 5×100 milliliter portions of methanol. Drying at 60° C. for 24 hours gave 195.5 grams of white solid, identified as pure (greater than 99 percent by NMR) 1,4-cyclohexanedimethyl dianthranilate. The melting point of this product as measured by Differential Scanning Calorimetry was 144.5° C.

EXAMPLE XXI 1,12-dodecandiol (50.6 grams, 0.25 mol; obtained from TCI America, Portland, Oreg.), isatoic anhydride (114.3 grams, 0.70 mol), and triethylamine (10.1 grams, 0.10 mol) in 125 milliliters of dimethyl formamide was stirred and heated at 100° C. for 3.5 hours. The solution was then cooled to 30° C. and was treated first with methanol (600 milliliters) and then with water (200 milliliters). The resultant precipitated oil was separated from the supernatant liquid by decantation. The oil was then stirred in 500 milliliters of methanol, which caused crystal to form. The crystal suspension was filtered after 2 hours and the solid was washed with 3×50 milliliter portions of methanol, then was dried in air to give 47 grams of light beige solid identified by $^1$H-NMR as highly pure (greater than 98 percent) 1,12-dodecanediyl dianthranilate. The melting point of this product as measured by Differential Scanning Calorimetry was 62.5° C.

EXAMPLE XXII

A mixture of 4,4'-isopropylidenedicyclohexanol (240 grams, 1.0 mol; obtained from Sigma-Aldrich), isatoic anhydride (490 grams, 3.0 mol), and 1,4-diazabicyclo[2.2.2]octane (29.0 grams, 0.25 mol) in 500, milliliters of dimethyl formamide was stirred at 130° C. for 2 hours. The solution was then cooled to about 50° C., then was treated first with 800 milliliters of methanol and then with 100 milliliters of water. The resultant cloudy solution formed crystals which were filtered after 1 hour. The solid was washed with 3×200 milliliter portions of methanol, then was dried at 60° C. to give 86 grams (18 percent yield) of brownish solid which was judged by $^1$H-NMR to be the expected 4,4'-isopropylidenedicyclohexanediyl dianthranilatei in about 95 percent purity. The product was recrystallized from dimethyl formamide/methanol to give 33.5 grams of white solid judged by $^1$H-NMR to be highly pure (greater than 99 percent) dianthranilate. The melting point of this product as measured by Differential Scanning Calorimetry was 211° C.

EXAMPLE XXIII

A mixture of 4,4'-bicyclohexanol (49.5 grams, 0.25 mol; obtained from Sigma-Aldrich), isatoic anhydride (122 grams, 0.75 mol), and 1,4-diazabicyclo[2.2.2]octane (66.0 grams, 0.50 mol) in 200 milliliters of dimethyl formamide was stirred at 120° C. for 1 hour, then was cooled to about 80° C. The solution was then treated first with dimethyl formamide (100 milliliters) and then.with methanol (900 milliliters). The resultant suspension was stirred for 2 hours, and then was filtered. The solid was washed with 4×100 milliliter portions of methanol and was dried at 60° C. for 20 hours. The 4,4'-bicyclohexanediyl dianthranilate product was obtained as a cream solid (58.2 grams, 53 percent yield) which was adjudged by $^1$H-NMR spectroscopy to be pure (greater than 98 percent). The melting point of this product as measured by, Differential Scanning Calorimetry was 236° C.

EXAMPLE XXIV

In a 2 liter beaker were combined 3-methyl-1,5-pentanediol (35.4 grams, 0.30 mol; obtained from Sigma-Aldrich), isatoic anhydride (122 grams, 0.75 mol), 1,4-diazabicyclo[2.2.2]octane (11.2 grams, 0.10 mol), and dimethyl formamide (150 milliliters). The resultant suspension was heated at 120° C. for about 1 hour, then was cooled to 40° C. Addition of first methanol (600 milliliters) and then water (100 milliliters) gave a 2 phase mixture. Water (200 milliliters) and methylene chloride (200 milliliters) were then added and the mixture was shaken and separated in a separatory funnel. The bottom phase was washed with 2×300 milliliter portions of water and then was dried on a rotary evaporator. The recovered brown oil (116 grams) was heated at 140° C. under vacuum in a Kugelrohr distillation system (available from Sigma-Aldrich Company, Milwaukee, Wis.) to remove residual solvents and methyl anthranilate. The final 3-methyl-1,5-pentanediyl dianthranilate product was a viscous brown oil, 104.5 grams, 98 percent yield, adjudged to be about 95 percent pure by $^1$H-NMR.

EXAMPLE XXV 4,8-Bis(hydroxymethyl)tricyclo[5210$^{2,6}$]decane (98.2 grams 0.50 mol, mixed isomers; obtained from TCI America, Portland, Oreg.), isatoic anhydride (204 grams, 1.25 mol), 1,4-diazabicyclo[2.2.2]octane (28.2 grams, 0.25 mol), and dimethyl formamide (250 milliliters) were combined in a 2 liter beaker, and the resulting mixture was heated at 120° C. for 3 hours. The solution was then cooled to room temperature and was treated first with 1,000 milliliters of methanol and then with 200 milliliters of water. A two-phase mixture was obtained. The bottom layer was separated by decantation and then was extracted with 2×300 milliliter portions of methanol by vigorously stirring the methanol with the bottom layer and then separating the separated layers by decantation. The resultant brown oil was heated in a Kugelrohr distillation apparatus for 2 hours at 140° C. under vacuum to remove most of the residual solvent and volatile side-products. The 4,8-bis (hydroxymethyl)tricyclo[5210$^{2,6}$]decane dianthranilate product was obtained as a glassy solid (59.5 grams, 27 percent yield), which was adjudged by $^1$H-NMR to be in about 98 percent purity.

EXAMPLE XXVI 1,10-Decanediol (174 grams, 1.0 mol), isatoic anhydride (367 g, 2.25 mol; obtained from Sigma-Aldrich), 1,4-diazabicyclo[2.2.2]octane (22.4 grams, 0.20 mol), and dimethyl formamide (500 milliliters) were combined in 2 liter beaker and the resulting mixture was heated at 120° C. for 1 hour. The mixture was then cooled to room temperature and was treated first with methanol (1,500 milliliters) and then with water (500 milliliters). The solution turned cloudy, and then formed crystals. The crystal suspension was stirred for 2 hours at room temperature, and then was filtered. The solid was washed with 4×200 milliliter portions of a 75:25 (volume:volume) mixture of methanol/water, and then was dried to give 1,10-decanediyl dianthranilate as a light beige solid (119 grams, 29 percent yield). The product was adjudged to be highly pure (greater than 98 percent) by $^1$H-NMR$_1$ The melting point of this product as measured by Differential Scanning Calorimetry was 77° C.

EXAMPLE XXVII

A mixture of 1,6-hexanediol (118 grams, 1.0 mol; obtained i from Sigma-Aldrich), isatoic anhydride (367 grams, 2.25 mol), and 1,4-diazabicyclo[2.2.2]octane (22.4 grams, 0.20 mol) in 500 milliliters of dimethyl formamide in a 4 liter beaker was heated at 120° C. for 1.5 hours. The mixture was then cooled to room temperature and was stirred as first methanol (1,500 milliliters) and then water (750 milliliters) were added. The resultant suspension was stirred for 2 hours, and then was filtered. The solid was washed in the filter funnel with 2×200 milliliter portions of 75:25 methanol/water, then with 250 milliliters of water, and again with 2×200 milliliter portions of 75:25 methanol/water. Drying in the air for 72 hours gave the desired 1,6-hexanediyl dianthranilate product as a light beige solid (277.5 grams, 78 percent yield). A $^1$H-NMR spectrum indicated that the product was highly pure (greater than 98 percent). The melting point of this product as measured by Differential Scanning Calorimetry was 780° C.

Other embodiments and modifications of the present invention may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. A process for preparing a diazopyridone compound which comprises (a) preparing a first solution comprising (1) either (A) a dianiline of the formula

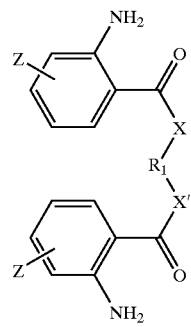

wherein $R^1$ is (i) an alkylene group, (ii) an arylene group, (iii) an arylalkylene group, (iv) an alkylarylene group, (v) an alkyleneoxy group, (vi) an aryleneoxy group, (vii) an arylalkyleneoxy group, (viii) an alkylaryleneoxy group, (ix) a polyalkyleneoxy group, (x) a polyaryleneoxy group, (xi) a polyarylalkyleneoxy group, (xii) a polyalkylaryleneoxy group, (xiii) a heterocyclic group, (xiv) a silylene group, (xv) a siloxane group, (xvi) a polysilylene group, or (xvii) a polysiloxane group, X and X' each, independently of the other, is (i) a direct bond, (ii) an oxygen atom, (iii) a sulfur atom, (iv) a group of the formula —$NR_{40}$— wherein $R_{40}$ is a hydrogen atom, an alkyl group, an aryl group, an arylalkyl group, or an alkylaryl group, or (v) a group of the formula —$CR_{50}R_{60}$— wherein $R_{50}$ and $R_{60}$ each, independently of the other, is a hydrogen atom, an alkyl group, an aryl group, an arylalkyl group, or an alkylaryl group, and Z and Z' each, independently of the other, is (i) a hydrogen atom, (ii) a halogen atom, (iii) a nitro group, (iv) an alkyl group, (v) an aryl group, (vi) an arylalkyl group, (vii) an alkylaryl group, (viii) a group of the formula

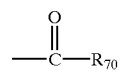

wherein $R_{70}$ is an alkyl group, an aryl group, an arylalkyl group, an alkylaryl group, an alkoxy group, an aryloxy group, an arylalkyloxy group, an alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group, (ix) a sulfonyl group of the formula —$SO_2R_{80}$ wherein $R_{80}$ is a hydrogen atom, an alkyl group, an aryl group, an arylalkyl group, an alkylaryl group, an alkoxy group, an aryloxy group, an arylalkyloxy group, an alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group, or (x) a phosphoryl group of the formula —$PO_3R_{90}$ wherein $R_{90}$ is a hydrogen atom, an alkyl group, an aryl group, an arylalkyl group, an alkylaryl group, an alkoxy group, an aryloxy group, an arylalkyloxy group, an alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group, or (B) an aniline of the formula

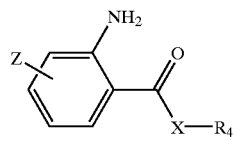

wherein $R_4$ is (i) an alkyl group, (ii) an aryl group, (iii) an arylalkyl group, (iv) an alkylaryl group, (v) an alkoxy group, (vi) an aryloxy group, (vii) an arylalkyloxy group, (viii) an alkylaryloxy group, (ix) a polyalkyleneoxy group, (x) a polyaryleneoxy group, (xi) a polyarylalkyleneoxy group, (xii) a polyalkylaryleneoxy group, (xiii) a heterocyclic group, (xiv) a silyl group, (xv) a siloxane group, (xvi) a polysilylene group, or (xvii) a polysiloxane group, X is (i) a direct bond, (ii) an oxygen atom, (iii) a sulfur atom, (iv) a group of the formula —$NR_{40}$— wherein $R_{40}$ is a hydrogen atom, an alkyl group, an aryl group, an arylalkyl group, or an alkylaryl group, or (v) a group of the formula —$CR_{50}R_{60}$— wherein $R_{50}$ and $R_{60}$ each, independently of the other, is a hydrogen atom, an alkyl group, an aryl group, an arylalkyl group, or an alkylaryl group, and Z is (i) a hydrogen atom, (ii) a halogen atom, (iii) a nitro group, (iv) an alkyl group, (v) an aryl group, (vi) an arylalkyl group, (vii) an alkylaryl group, (viii) a group of the formula

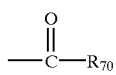

wherein $R_{70}$ is an alkyl group, an aryl group, an arylalkyl group, an alkylaryl group, an alkoxy group, an aryloxy group, an arylalkyloxy group, an alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group, (ix) a sulfonyl group of the formula —$SO_2R_{80}$ wherein $R_{80}$ is a hydrogen atom, an alkyl group, an aryl group, an arylalkyl group, an alkylaryl group, an alkoxy group, an aryloxy group, an arylalkyloxy group, an alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group, or (x) a phosphoryl group of the formula —$PO_3R_{90}$ wherein $R_{90}$ is a hydrogen atom, an alkyl group, an aryl group, an arylalkyl group, an alkylaryl group, an alkoxy group, an aryloxy group, an arylalkyloxy group, an alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group, and (2) a first solvent mixture comprising (I) a solvent, (II) acetic acid, and (III) an optional second acid, said acetic acid being present in the solvent mixture in an amount of at least about 95 percent by weight of the solvent mixture, said first solution being at a temperature of about +15° C. or lower; (b) adding to the first solution nitrosylsulfuric acid, thereby forming a diazonium salt either (A) of the formula

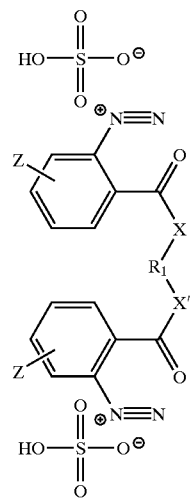

or (B) of the formula

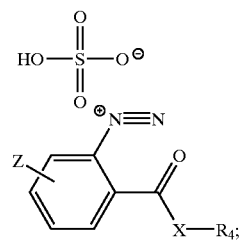

(c) preparing a second solution comprising (1) a second solvent mixture comprising water and an organic solvent soluble in or miscible in water, (2) either (A) a pyridone of the formula

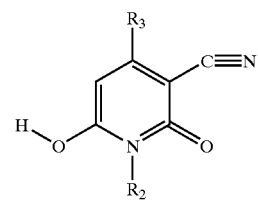

wherein $R_2$ is (i) an alkyl group, (ii) an aryl group, (iii) an arylalkyl group, (iv) an alkylaryl group, (v) an alkoxy group, (vi) an aryloxy group, (vii) an arylalkyloxy group, (viii) an alkylaryloxy group, (ix) a polyalkyleneoxy group, (x) a polyaryleneoxy group, (xi) a polyarylalkyleneoxy group, (xii) a polyalkylaryleneoxy group, (xiii) a heterocyclic group, (xiv) a silyl group, (xv) a siloxane group, (xvi) a polysilylene group, (xvii) a polysiloxane group, or (xviii) a group of the formula

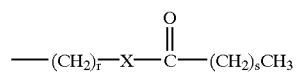

wherein r and s are each, independently of the other, integers representing a number of repeat —$CH_2$— groups, and $R_3$ is (i) an alkyl group, (ii) an aryl group, (iii) an arylalkyl group, or (iv) an alkylaryl group, or (B) a dipyridone of the formula

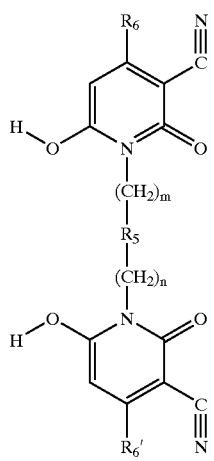

wherein $R_5$ is (i) an alkylene group, (ii) an arylene group, (iii) an arylalkylene group, (iv) an alkylarylene group, (v) an alkyleneoxy group, (vi) an aryleneoxy group, (vii) an arylalkyleneoxy group, (viii) an alkylaryleneoxy group, (ix) a polyalkyleneoxy group, (x) a polyaryleneoxy group, (xi) a polyarylalkyleneoxy group, (xii) a polyalkylaryleneoxy group, (xiii) a heterocyclic group, (xiv) a silylene group, (xv) a siloxane group, (xvi) a polysilylene group, or (xvii) a polysiloxane group, $R_6$ and $R_6'$ each, independently of the other, is (i) an alkyl group, (ii) an aryl group, (iii) an arylalkyl group, or (iv) an alkylaryl group, n is an integer representing the number of repeat —$CH_2$— units, and m is an integer representing the number of repeat —$CH_2$— units, (3) a base present in an amount of at least about 3 molar equivalents of base per mole of pyridone moiety, and (4) an optional buffer salt, and (d) combining either (A) the second solution containing the dianiline and the first solution containing the pyridone, or (B) the second solution containing the aniline and the first solution containing the dipyridone to form a third solution and effect a coupling reaction to form a diazpyridone compound either (A) of the formula

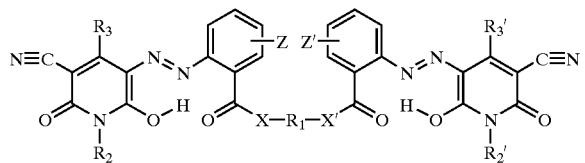

or (B) of the formula

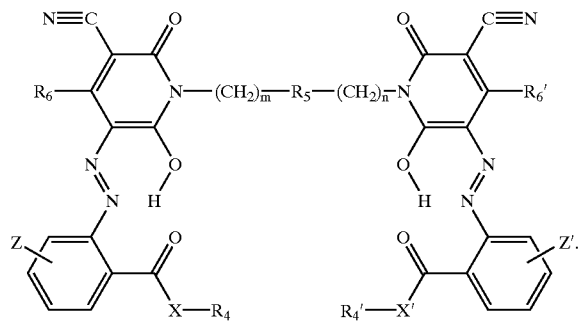

2. A process for preparing a diazopyridone compound which comprises (a) preparing a first solution comprising (1) a dianiline of the formula

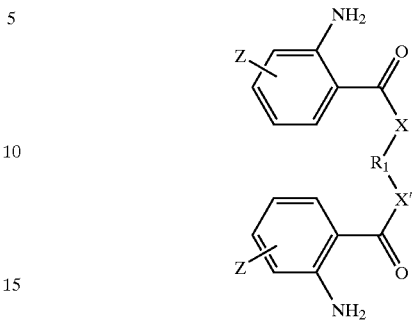

wherein $R_1$ is (i) an alkylene group, (ii) an arylene group, (iii) an arylalkylene group, (iv) an alkylarylene group, (v) an alkyleneoxy group, (vi) an aryleneoxy group, (vii) an arylalkyleneoxy group, (viii) an alkylaryleneoxy group, (ix) a polyalkyleneoxy group, (x) a polyaryleneoxy group, (xi) a polyarylalkyleneoxy group, (xii) a polyalkylaryleneoxy group, (xiii) a heterocyclic group, (xiv) a silylene group, (xv) a siloxane group, (xvi) a polysilylene group, or (xvii) a polysiloxane group, X and X' each, independently of the other, is (i) a direct bond, (ii) an oxygen atom, (iii) a sulfur atom, (iv) a group of the formula —$NR_{40}$— wherein $R_{40}$ is a hydrogen atom, an alkyl group, an aryl group, an arylalkyl group, or an alkylaryl group, or (v) a group of the formula —$CR_{50}R_{60}$— wherein $R_{50}$ and $R_{60}$ each, independently of the other, is a hydrogen atom, an alkyl group, an aryl group, an arylalkyl group, or an alkylaryl group, and Z and Z' each, independently of the other, is (i) a hydrogen atom, (ii) a halogen atom, (iii) a nitro group, (iv) an alkyl group, (v) an aryl group, (vi) an arylalkyl group, (vii) an alkylaryl group, (viii) a group of the formula

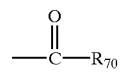

wherein $R_{70}$ is an alkyl group, an aryl group, an arylalkyl group, an alkylaryl group, an alkoxy group, an aryloxy group, an arylalkyloxyl group, an alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group, (ix) a sulfonyl group of the formula —$SO_2R_{80}$ wherein $R_{80}$ is a hydrogen atom, an alkyl group, an aryl group, an arylalkyl group, an alkylaryl group, an alkoxy group, an aryloxy group, an arylalkyloxy group, an alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group, or (x) a phosphoryl group of the formula —$PO_3R_{90}$ wherein $R_{90}$ is a hydrogen atom, an alkyl group, an aryl group, an arylalkyl group, an alkylaryl group, an alkoxy group, an aryloxy group, an arylalkyloxy group, an alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group, and (2) a first solvent mixture comprising (I) a solvent, (II) acetic acid, and (III) an optional second acid, said acetic acid being present in the solvent mixture in an amount of at least about 95 percent by weight of the solvent mixture, said first solution being at a temperature of about +15° C. or lower; (b) adding to the first solution nitrosylsulfuric acid, thereby forming a diazonium salt of the formula

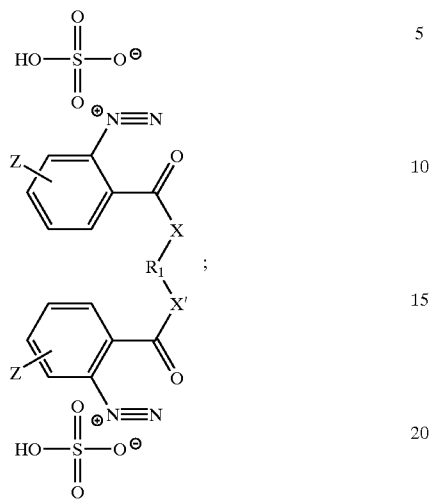

(c) preparing second solution comprising (1) a second solvent mixture comprising water and an organic solvent soluble in or miscible in water, (2) a pyridone of the formula

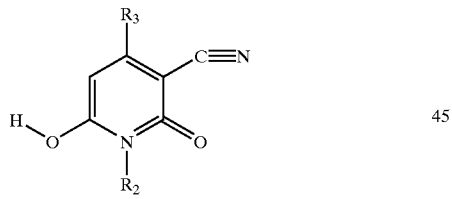

wherein $R_2$ is (i) an alkyl group, (ii) an aryl group, (iii) an arylalkyl group, (iv) an alkylaryl group, (v) an alkoxy group, (vi) an aryloxy group, (vii) an arylalkyloxy group, (viii) an alkylaryloxy group, (ix) a polyalkyleneoxy group, (x) a polyaryleneoxy group, (xi) a polyarylalkyleneoxy group, (xii) a polyalkylaryl eneoxy group, (xiii) a heterocyclic group, (xiv) a silyl group, (xv) a siloxane group, (xvi) a polysilylene group, (xvii) a polysiloxane group, or (xviii) a group of the formula

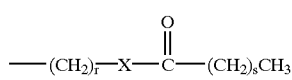

wherein r and s are each, independently of the other, integers representing a number of repeat —$CH_2$— groups, and $R_3$ is (i) an alkyl group, (ii) an aryl group, (iii) an arylalkyl group, or (iv) an alkylaryl group, (3) a base present in an amount of at least about 3 molar equivalents of base per mole of pyridone, and (4) an optional buffer salt, and (d) combining the second solution and the first solution to form a third solution and effect a coupling reaction to form a diazopyridone compound of the formula

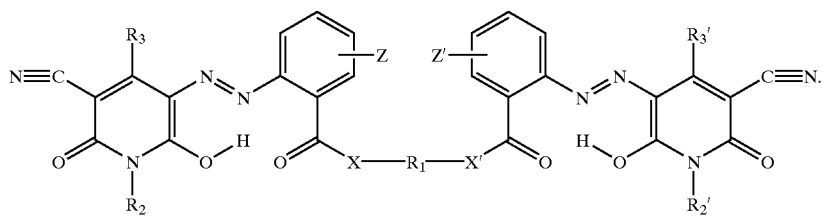

3. A process for preparing a diazopyridone compound which comprises (a) preparing a first solution comprising (1) an aniline of the formula

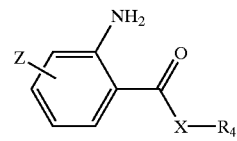

wherein $R_4$ is (i) an alkyl group, (ii) an aryl group, (iii) an arylalkyl group, (iv) an alkylaryl group, (v) an alkoxy group, (vi) an aryloxy group, (vii) an arylalkyloxy group, (viii) an alkylaryloxy group, (ix) a polyalkyleneoxy group, (x) a polyaryleneoxy group, (xi) a polyarylalkyleneoxy group, (xii) a polyalkylaryleneoxy group, (xiii) a heterocyclic group, (xiv) a silyl group, (xv) a siloxane group, (xvi) a polysilylene group, or (xvii) a polysiloxane group, X is (i) a direct bond, (ii) an oxygen atom, (iii) a sulfur atom, (iv) a group of the formula —$NR_{40}$— wherein $R_{40}$ is a hydrogen atom, an alkyl group, an aryl group, an arylalkyl group, or an alkylaryl group, or (v) a group of the formula —$CR_{50}R_{60}$— wherein $R_{50}$ and $R_{60}$ each, independently of the other, is a hydrogen atom, an alkyl group, an aryl group, an arylalkyl group, or an alkylaryl group, and Z is (i) a hydrogen atom, (ii) a halogen atom, (iii) a nitro group, (iv) an alkyl group, (v) an aryl group, (vi) an arylalkyl group, (vii) an alkylaryl group, (viii) a group of the formula

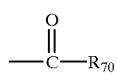

wherein $R_{70}$ is an alkyl group, an aryl group, an arylalkyl group, an alkylaryl group, an alkoxy group, an aryloxy group, an arylalkyloxy group, an alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group, (ix) a sulfonyl group of the formula —$SO_2R_{80}$ wherein $R_{80}$ is a hydrogen atom, an alkyl group, an aryl group, an arylalkyl group, an alkylaryl group, an, alkoxy group, an aryloxy group, an arylalkyloxy group, an alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group, or (x) a phosphoryl group of the formula —$PO_3R_{90}$ wherein $R_{90}$ is a hydrogen atom, an alkyl group, ad aryl group, an arylalkyl group, an alkylaryl group, an alkoxy group, an aryloxy group, an arylalkyloxy group, an alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group, and (2) a first solvent mixture comprising (I) a solvent, (II) acetic acid, and (III) an optional second acid, said acetic acid being present in the solvent mixture in an amount of at least about 95 percent by weight of the solvent mixture, said first solution being at a temperature of about +15° C. or lower; (b) adding to the first solution nitrosylsulfuric acid, thereby forming a diazonium salt of the formula

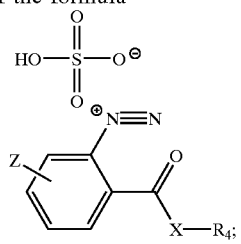

(c) preparing a second solution comprising (1) a second solvent mixture comprising water and an organic solvent soluble in or miscible in water, (2) a dipyridone of the formula

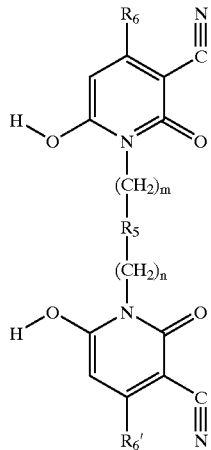

wherein $R_5$ is (i) an alkylene group, (ii) an arylene group, (iii) an arylalkylene group, (iv) an alkylarylene group, (v) an alkyleneoxy group, (vi) an aryleneoxy group, (vii) an arylalkyleneoxy group, (viii) an alkylaryleneoxy group, (ix) a polyalkyleneoxy group, (x) a polyaryleneoxy group, (xi) a polyarylalkyleneoxy group, (xii) a polyalkylaryleneoxy group, (xiii) a heterocyclic group, (xiv) a silylene group, (xv) a siloxane group, (xvi) a polysilylene group, or (xvii) a polysiloxane group, $R_6$ and $R_6'$ each, independently of the other, is (i) an alkyl group, (ii) an aryl group, (iii) an arylalkyl group, or (iv) an alkylaryl group, n is an integer representing the number of repeat —$CH_2$— units, and m is an integer representing the number of repeat —$CH_2$— units, (3) a base present in an amount of at least about 3 molar equivalents of base per mole of pyridone moiety, and (4) an optional buffer salt, and (d) combining the second solution and the first solution to form a third solution and effect a coupling reaction to form a diazopyridone compound of the formula

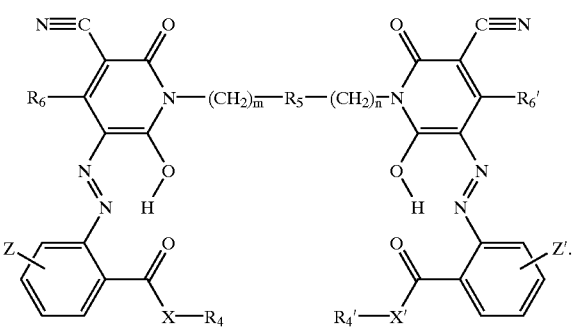

4. A process according to claim 1 wherein the first solvent mixture contains a second acid.

5. A process according to claim 4 wherein the second acid is selected from the group consisting of sulfuric acid, dodecylbenzene sulfonic acid, propionic acid, hydrochloric acid, phosphoric acid, and mixtures thereof.

6. A process according to claim 1 wherein the solvent in the first solvent mixture is selected from the group consisting of water, acetone, dimethylformamide, dimethyacetamide, tetrahydrofuran, dimethoxyethane, and mixtures thereof.

7. A process according to claim 1 wherein the solvent in the first solvent mixture is water.

8. A process according to claim 1 wherein the aniline or dianiline and the first solvent mixture are present in relative amounts of at least about 100 grams of aniline or dianiline per liter of first solvent mixture, and wherein the aniline or dianiline and the first solvent mixture are present in relative amounts of no more than about 400 grams of aniline or dianiline per liter of first solvent mixture.

9. A process according to claim 1 wherein the first solution is at a temperature of about +5° C. or lower.

10. A process according to claim 1 wherein the nitrosylsulfuric acid is added in an amount of at least about 1 mole of nitrosylsulfuric acid per mole of aniline moiety.

11. A process according to claim 1 wherein subsequent to formation of the diazonium salt, excess nitrosylsulfuric acid is quenched by the addition of a quenching agent.

12. A process according to claim 1 wherein the organic solvent in the second solvent mixture is selected from the group consisting of methanol, ethanol, isopropanol, tetrahydrofuran, acetone, dimethoxyethane, N,N-dimethylformamide, N,N-dimethylacetamide, and mixtures thereof.

13. A process according to claim 1 wherein the organic solvent in the second solvent mixture is present in an amount of at least about 0.25 gram of organic solvent per gram of water.

14. A process according to claim 1 wherein the organic solvent in the second solvent mixture is present in an amount of at least about 0.4 gram of organic solvent per gram of water.

15. A process according to claim 1 wherein the pyridone or dipyridone is present in the second solution in an amount of at least about 10 grams of pyridone or dipyridone per liter of second solvent mixture, and wherein the pyridone or dipyridone is present in the second solution in an amount of no more than about 200 grams of pyridone or dipyridone per liter of second solvent mixture.

16. A process according to claim 1 wherein the second solution is maintained at a pH of at least about 10.

17. A process according to claim 1 wherein the second solution contains the base in an amount of at least about 5 moles of base per mole of pyridone moieties.

18. A process according to claim 1 wherein the second solution contains a buffer salt.

19. A process according to claim 18 wherein the buffer salt is selected from the group consisting of sodium acetate, potassium acetate, sodium hydrogenphosphate, citric acid, and mixtures thereof.

20. A process according to claim 18 wherein the buffer salt is present in the second solution in an amount of at least about 1 mole of buffer per mole of pyridone moieties.

21. A process according to claim 18 wherein the buffer salt is present in the second solution in an amount of at least about 3 moles of buffer per mole of pyridone moieties.

22. A process according to claim 18 wherein the buffer salt is present in the second solution in an amount of at least about 5 moles of buffer per mole of pyridone moieties.

23. A process according to claim 2 wherein $R_1$ is a linear alkylene group.

24. A process according to claim 2 wherein $R_1$ is a branched alkylene group.

25. A process according to claim 2 wherein $R_1$ is a saturated alkylene group.

26. A process according to claim 2 wherein $R_1$ is an unsaturated alkylene group.

27. A process according to claim 2 wherein $R_1$ is an alkylene group including aliphatic cyclic moieties therein.

28. A process according to claim 2 wherein $R_1$ is an unsubstituted alkylene group.

29. A process according to claim 2 wherein $R_1$ is a substituted alkylene group.

30. A process according to claim 2 wherein $R_1$ is an alkylene group wherein hetero atoms selected from oxygen, nitrogen, sulfur, silicon, or phosphorus are present in the alkylene group.

31. A process according to claim 2 wherein $R_1$ is an alkylene group wherein no hetero a toms are present in the alkylene group.

32. A process according to claim 2 wherein $R_1$ is an alkylene group with at least about 8 carbon atoms.

33. A process according to claim 2 wherein $R_1$ is an alkylene group with at least about 12 carbon atoms.

34. A process according to claim 2 wherein $R_1$ is an alkylene group with about 36 carbon atoms.

35. A process according to claim 2 wherein $R_1$ is an arylene group with at least about 10 carbon atoms, an arylalkylene group with at least about 10 carbon atoms, an alkylarylene group with at least about 10 carbon atoms, an alkyleneoxy group with at least about 8 carbon atoms, an aryleneoxy group with at least about 10 carbon atoms, an arylalkyleneoxy group with at least about 10 carbon atoms, an alkylaryleneoxy group with at least about 10 carbon atoms, a polyalkyleneoxy group wherein the alkyl portion of the repeat alkyleneoxy groups has from about 1 to about 12 carbon atoms and wherein the number of repeat alkyleneoxy groups is from about 2 to about 50 repeat alkyleneoxy groups, a polyaryleneoxy group wherein the aryl portion of the repeat aryleneoxy groups has from about 6 to about 14 carbon atoms and wherein the number of repeat aryleneoxy groups is from about 2 to about 20 repeat aryleneoxy groups, a polyarylalkyleneoxy group wherein the arylalkyl portion of the repeat arylalkyleneoxy groups has from about 7 to about 50 carbon atoms and wherein the number of repeat arylalkyleneoxy groups is from about 2 to about 20 repeat arylalkyleneoxy groups, a polyalkylaryleneoxy group wherein the alkylaryl portion of the repeat alkylaryleneoxy groups has from about 7 to about 50 carbon atoms and wherein the number of repeat alkylaryleneoxy groups is from about 2 to about 20 repeat alkylaryleneoxy groups, a heterocyclic group with from about 2 to about 12 carbon atoms and with from about 4 to about 18 ring atoms and wherein the hetero atoms in the heterocyclic groups are nitrogen, oxygen, sulfur, silicon, or phosphorus, a silylene group, a siloxane group, a polysilylene group with from 2 to about 100 repeat silylene units, or a polysiloxane group with from 2 to about 200 repeat siloxane units.

36. A process according to claim 2 wherein $R^1$ is
—$(CH_2)_6$—,
—$(CH_2)_8$—,
—$(CH_2)_{10}$—,
—$(CH_2)_{12}$—,

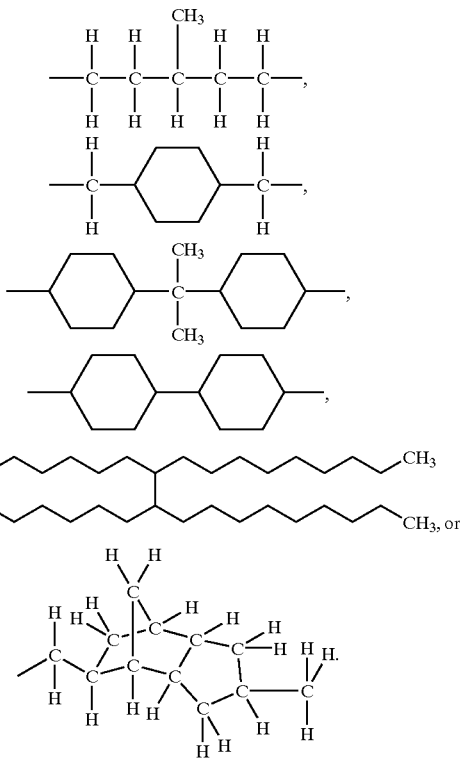

37. A process according to claim 2 wherein $R_1$ is a branched alkylene group having 36 carbon atoms which may include unsaturations and cyclic groups.

38. A process according to claim 2 wherein $R_2$ and $R_2$' each, independently of the other, are linear alkyl groups.

39. A process according to claim 2 wherein $R_2$ and $R_2$' each, independently of the other, are branched alkyl groups.

40. A process according to claim 2 wherein $R_2$ and $R_2$' each, independently of the other, are saturated alkyl groups.

41. A process according to claim 2 wherein $R_2$ and $R_2'$ each, independently of the other, are unsaturated alkyl groups.

42. A process according to claim 2 wherein $R_2$ and $R_2'$ each, independently of the other, are alkyl groups including aliphatic cyclic moieties therein.

43. A process according to claim 2 wherein $R_2$ and $R_2'$ each, independently of the other, are unsubstituted alkyl groups.

44. A process according to claim 2 wherein $R_2$ and $R_2'$ each, independently of the other, are substituted alkyl groups.

45. A process according to claim 2 wherein $R_2$ and $R_2'$ each, independently of the other, are alkyl groups wherein hetero atoms selected from oxygen, nitrogen, sulfur, silicon, or phosphorus are present in the alkyl groups.

46. A process according to claim 2 wherein $R_2$ and $R_2'$ each, independently of the other, are alkyl groups wherein no hetero atoms are present in the alkyl groups.

47. A process according to claim 2 wherein $R_2$ and $R_2'$ each, independently of the other, are alkyl groups with at least about 8 carbon atoms.

48. A process according to claim 2 wherein $R_2$ and $R_2'$ each, independently of the other, are alkyl groups with at least about 12 carbon atoms.

49. A process according to claim 2 wherein $R_2$ and $R_2'$ each, independently of the other, are aryl groups with at least about 10 carbon atoms, arylalkyl groups with at least about 10 carbon atoms, alkylaryl groups with at least about 10 carbon atoms, alkoxy groups with at least about 8 carbon atoms, aryloxy groups with at least about 10 carbon atoms, arylalkyloxy groups with at least about 10 carbon atoms, alkylaryloxy groups with at least about 10 carbon atoms, polyalkyleneoxy groups wherein the alkyl portion of the repeat alkyleneoxy groups has from about 1 to about 12 carbon atoms and wherein the number of repeat alkyleneoxy groups is from about 2 to about 50 repeat alkyleneoxy groups, polyaryleneoxy groups wherein the aryl portion of the repeat aryleneoxy groups has from about 6 to about 14 carbon atoms and wherein the number of repeat aryleneoxy groups is from about 2 to about 20 repeat aryleneoxy groups, polyarylalkyleneoxy groups wherein the arylalkyl portion of the repeat arylalkyleneoxy groups has from about 7 to about 50 carbon atoms and wherein the number of repeat arylalkyleneoxy groups typically is from about 2 to about 20 repeat arylalkyleneoxy groups, polyalkylaryleneoxy groups wherein the alkylaryl portion of the repeat alkylaryleneoxy groups has from about 7 to about 50 carbon atoms and wherein the number of repeat alkylaryleneoxy groups is from about 2 to about 20 repeat alkylaryleneoxy groups, a heterocyclic group with from about 2 to about 12 carbon atoms and with from about 4 to about 18 ring atoms wherein the hetero atoms in the heterocyclic groups are nitrogen, oxygen, sulfur, silicon, or phosphorus, a silyl group, a siloxane group, a polysilylene group with from 2 to about 100 repeat silylene units, or a polysiloxane group with from 2 to about 200 repeat siloxane units.

50. A process according to claim 2 wherein $R_2$ and $R_2'$ each, independently of the other, are —$CH_2CH_3$,
—$(CH_2)_3CH_3$,
—$(CH_2)_7CH_3$,
—$(CH_2)_9CH_3$,
—$(CH_2)_{11}CH_3$,
—$(CH_2)_{13}CH_3$,
—$(CH_2)_{15}CH_3$,
—$(CH_2)_{17}CH_3$

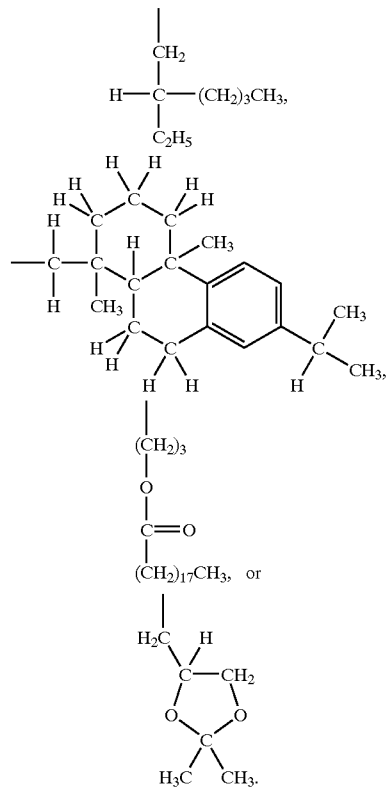

51. A process according to claim 2 wherein the diazo pyridone compounds formed are of the formulae

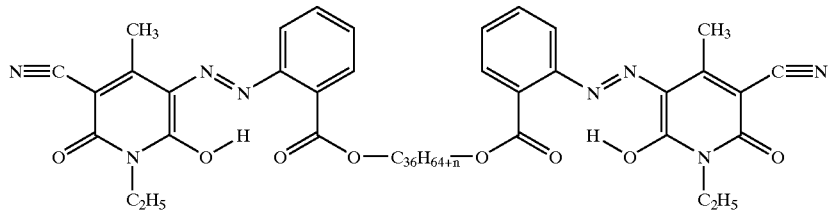

wherein $C_{36}H_{64+n}$ is a branched alkylene group which may include unsaturations and cyclic groups, wherein n is an integer of 0, 1, 2, 3, 4, 5, 6, 7, 8, 9, or 10,

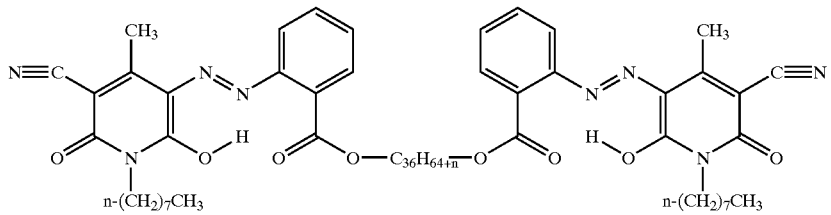

wherein $C_{36}H_{64+n}$ is a branched alkylene group which may include unsaturations and cyclic groups, wherein n is an integer of 0, 1, 2, 3, 4, 5, 6, 7, 8, 9, or 10,

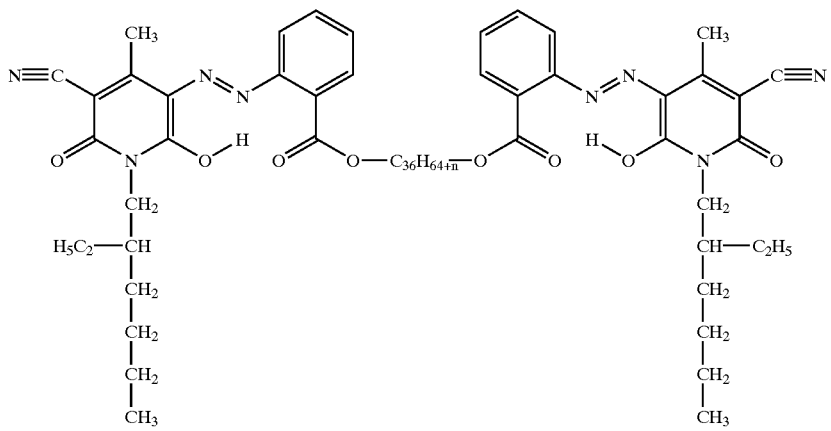

wherein $C_{36}H_{64+n}$ is a branched alkylene group which may include unsaturations and cyclic groups, wherein n is an integer of 0, 1, 2. 3, 4, 5, 6, 7, 8. 9, or 10,

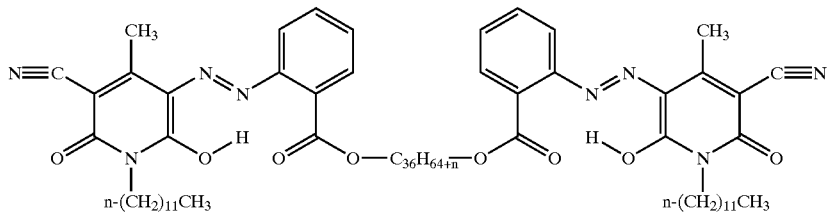

wherein $C_{36}H_{64+n}$ is a branched alkylene group which may include unsaturations and cyclic groups, wherein n is an integer of 0, 1, 2, 3, 4, 5, 6, 7, 8, 9, or 10,

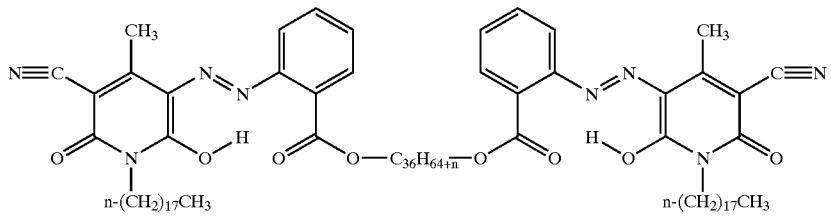

wherein $C_{36}H_{64+n}$ is a branched alkylene group which may include unsaturations and cyclic groups, wherein n is an integer of 0, 1, 2, 3, 4, 5, 6, 7, 8, 9, or 10,

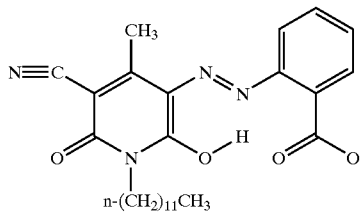 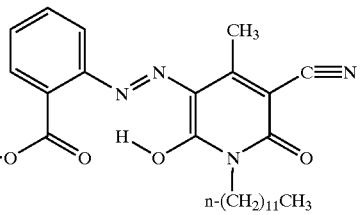

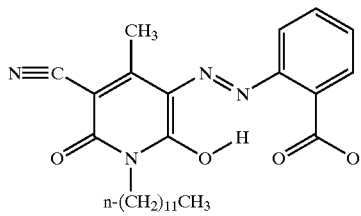 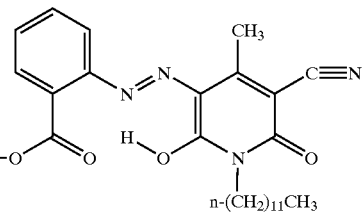

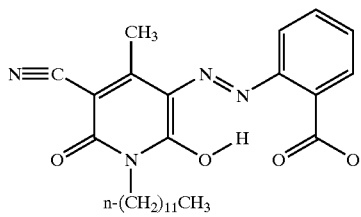 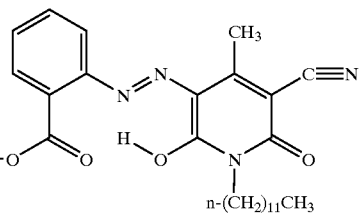

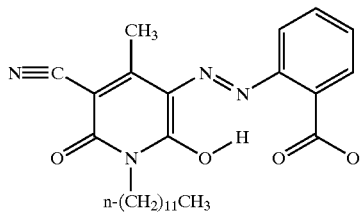 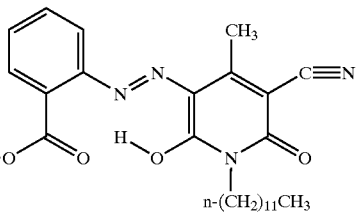

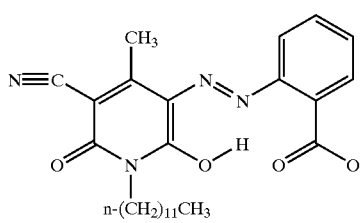 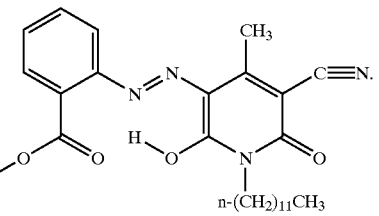

52. A process according to claim 3 wherein $R_5$ is a linear alkylene group.

53. A process according to claim 3 wherein $R_5$ is a branched alkylene group.

54. A process according to claim 3 wherein $R_5$ is a saturated alkylene group.

55. A process according to claim 3 wherein $R_5$ is an unsaturated alkylene group.

56. A process according to claim 3 wherein $R_5$ is an alkylene group including aliphatic cyclic moieties therein.

57. A process according to claim 3 wherein $R_5$ is an unsubstituted alkylene group.

58. A process according to claim 3 wherein $R_5$ is a substituted alkylene group.

59. A process according to claim 3 wherein $R_5$ is an alkylene group wherein hetero atoms selected from oxygen, nitrogen, sulfur, silicon, or phosphorus are present in the alkylene group.

60. A process according to claim 3 wherein $R_5$ is an alkylene group wherein no hetero atoms are present in the alkylene group.

61. A process according to claim 3 wherein $R_5$ is an alkylene group with at least about 8 carbon atoms.

62. A process according to claim 3 wherein $R_5$ is an alkylene group with at least about 12 carbon atoms.

63. A process according to claim 3 wherein $R_5$ is an alkylene group with about 36 carbon atoms.

64. A process according to claim 3 wherein $R_5$ is an arylene group with at least about 10 carbon atoms, an arylalkylene group with at least about 10 carbon atoms, an alkylarylene group with at least about 10 carbon atoms, an alkyleneoxy group with at least about 8 carbon atoms, an aryleneoxy group with at least about 10 carbon atoms, an arylalkyleneoxy group with at least about 10 carbon atoms, an alkylaryleneoxy group with at least about 10 carbon atoms, a polyalkyleneoxy group wherein the alkyl portion of the repeat alkyleneoxy groups has from about 1 to about 12 carbon atoms and wherein the number of repeat alkyleneoxy groups is from about 2 to about 50 repeat alkyleneoxy groups, a polyaryleneoxy group wherein the aryl portion of the repeat aryleneoxy groups has from about 6 to about 14 carbon atoms and wherein the number of repeat aryleneoxy groups is from about 2 to about 20 repeat aryleneoxy groups, a polyarylalkyleneoxy group wherein the arylalkyl portion of the repeat arylalkyleneoxy groups has from about 7 to about 50 carbon atoms and wherein the number of repeat arylalkyleneoxy groups is from about 2 to about 20 repeat arylalkyleneoxy groups, a polyalkylaryleneoxy group wherein the alkylaryl portion of the repeat alkylaryleneoxy groups has from about 7 to about 50 carbon atoms and wherein the number of repeat alkylaryleneoxy groups is from about 2 to about 20 repeat alkylaryleneoxy groups, a heterocyclic group with from about 2 to about 12 carbon atoms and with from about 4 to about 18 ring atoms and wherein the hetero atoms in the heterocyclic groups are nitrogen, oxygen, sulfur, silicon, or phosphorus, a silylene group, a siloxane group, a polysilylene group with from 2 to about 100 repeat silylene units, or a polysiloxane group with from 2 to about 200 repeat siloxane units.

65. A process according to claim 3 wherein m and n are each zero and wherein $R_5$ is

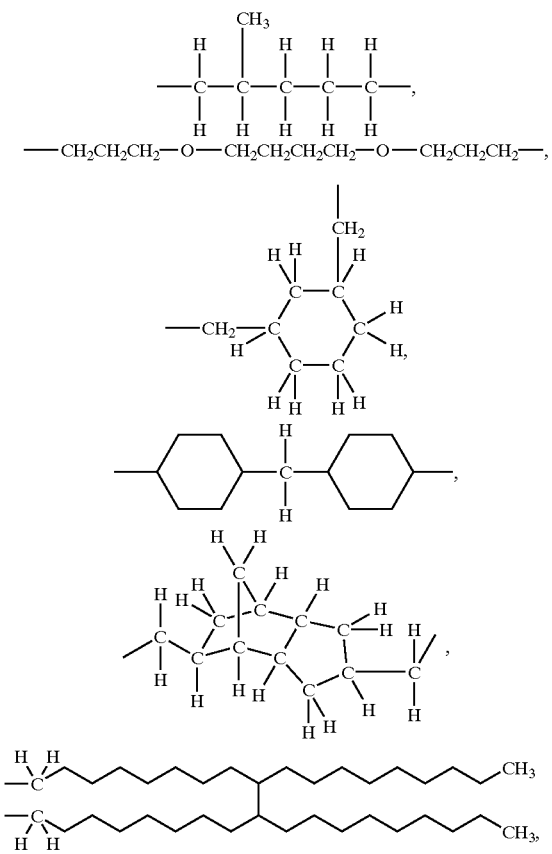

66. A process according to claim 3 wherein m and n are each zero and wherein $R_5$ is a branched alkylene, group having 36 carbon atoms which may include unsaturations and cyclic groups.

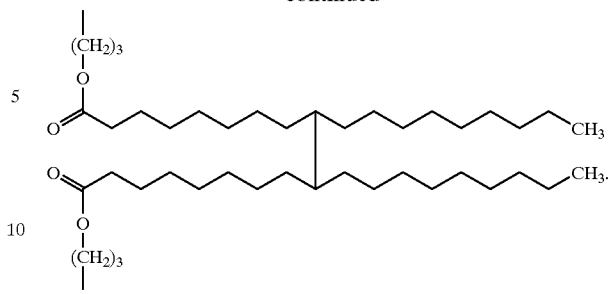

67. A process according to claim 3 wherein $R_4$ and $R_4'$ each, independently of the other, are linear alkyl groups.

68. A process according to claim 3 wherein $R_4$ and $R_4'$ each, independently of the other, are branched alkyl groups.

69. A process according to claim 3 wherein $R_4$ and $R_4'$ each, independently of the other, are saturated alkyl groups.

70. A process according to claim 3 wherein $R_4$ and $R_4'$ each, independently of the other, are unsaturated alkyl groups.

71. A process according to claim 3 wherein $R_4$ and $R_4'$ each, independently of the other, are alkyl groups including aliphatic cyclic moieties therein.

72. A process according to claim 3 wherein $R_4$ and $R_4'$ each, independently of the other, are unsubstituted alkyl groups.

73. A process according to claim 3 wherein $R_4$ and $R_4'$ each, independently of the other, are substituted alkyl groups.

74. A process according to claim 3 wherein $R_4$ and $R_4'$ each, independently of the other, are alkyl groups wherein hetero atoms selected from oxygen, nitrogen, sulfur, silicon, or phosphorus are present in the alkyl groups.

75. A process according to claim 3 wherein $R_4$ and $R_4'$ each, independently of the other, are alkyl groups wherein no hetero atoms are present in the alkyl groups.

76. A process according to claim 3 wherein $R_4$ and $R_4'$ each, independently of the other, are alkyl groups with at least about 8 carbon atoms.

77. A process according to claim 3 wherein $R_4$ and $R_4'$ each, independently of the other, are alkyl groups with at least about 12 carbon atoms.

78. A process according to claim 3 wherein $R_4$ and $R_4'$ each, independently of the other, are aryl groups with at least about 10 carbon atoms, arylalkyl groups with at least about 10 carbon atoms, alkylaryl groups with at least about 10 carbon atoms, alkoxy groups with at least about 8 carbon atoms, aryloxy groups with at least about 10 carbon atoms, arylalkyloxy groups with at least about 10 carbon atoms, alkylaryloxy groups with at least about 10 carbon atoms, polyalkyleneoxy groups wherein the alkyl portion of the repeat alkyleneoxy groups has from about 1 to about 12 carbon atoms and wherein the number of repeat alkyleneoxy groups is from about 2 to about 50 repeat alkyleneoxy groups, polyaryleneoxy groups wherein the aryl portion of the repeat aryleneoxy groups has from about 6 to about 14 carbon atoms and wherein the number of repeat aryleneoxy groups is from about 2 to about 20 repeat aryleneoxy groups, polyarylalkyleneoxy groups wherein the arylalkyl portion of the repeat arylalkyleneoxy groups has from about 7 to about 50 carbon atoms and wherein the number of repeat arylalkyleneoxy groups typically is from about 2 to about 20 repeat arylalkyleneoxy groups, polyalkylaryleneoxy groups wherein the alkylaryl portion of the repeat alkylaryleneoxy groups has from about 7 to about 50 carbon atoms and wherein the number of repeat alkylaryleneoxy groups is from about 2 to about 20 repeat alkylaryleneoxy groups, a heterocyclic group with from about 2 to about 12 carbon atoms and with from about 4 to about 18 ring atoms wherein the hetero atoms in the heterocyclic groups are nitrogen, oxygen, sulfur, silicon, or phosphorus, a silyl group, a siloxane group, a polysilylene group with from 2 to about 100 repeat silylene units, or a polysiloxane group with from 2 to about 200 repeat siloxane units.

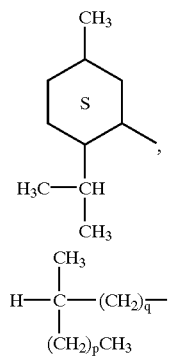

wherein q is an integer of from about 10 to about 15, p is an integer of from 0 to about 3, and the sum of p+q=15,

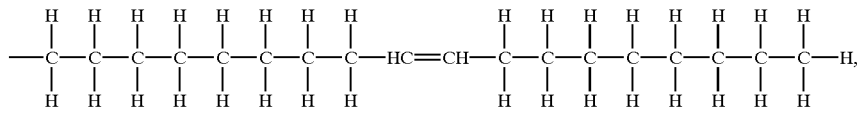

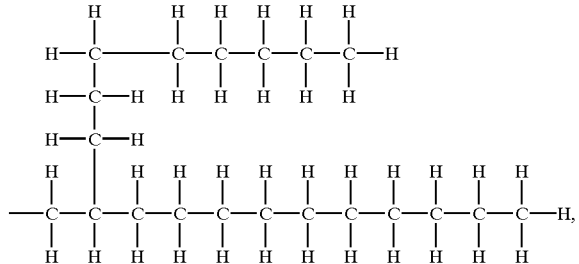

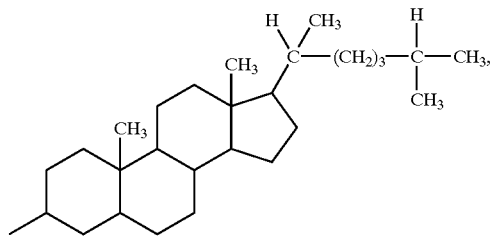

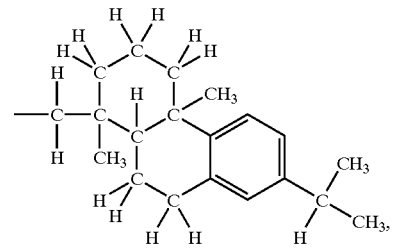

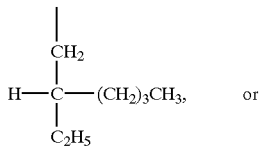

or

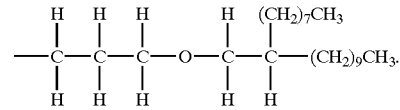

79. A process according to claim 3 wherein $R_4$ and $R_4'$ each, independently of the other, are

—$CH_3$,
—$C_2H_5$,
—$(CH_2)_7CH_3$,
—$(CH_2)_{17}CH_3$,

80. A process according to claim 3 wherein the diazo pyridone compounds formed are of the formulae

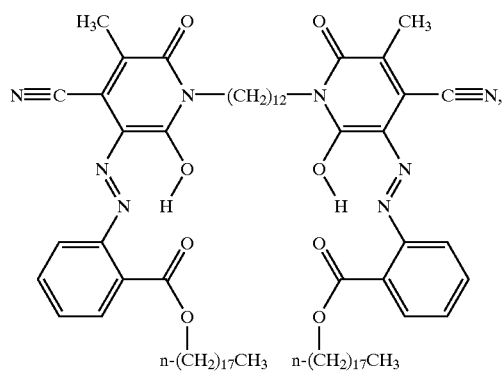
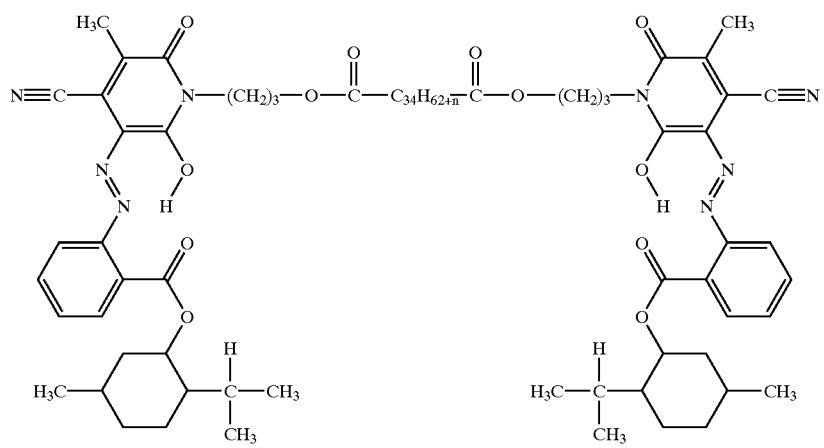
wherein $C_{34}H_{62+n}$ is a branched alkylene group which may include unsaturations and cyclic groups, wherein n is an integer of 0, 1, 2, 3, 4, 5, 6, 7, 8, 9, or 10,
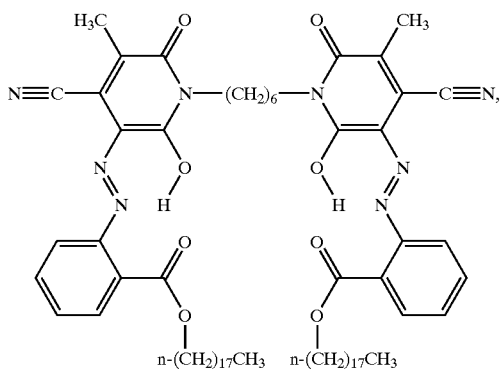
-continued
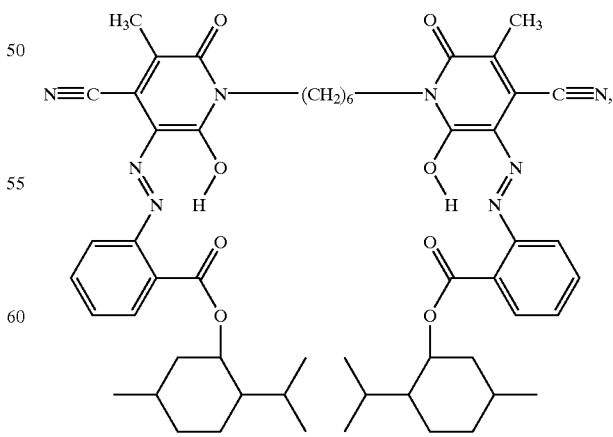

145
-continued
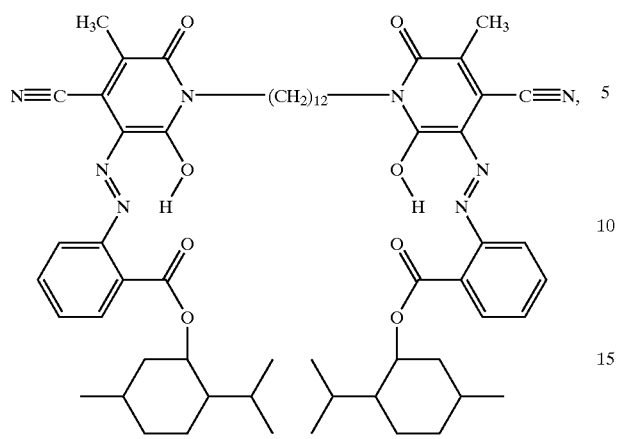
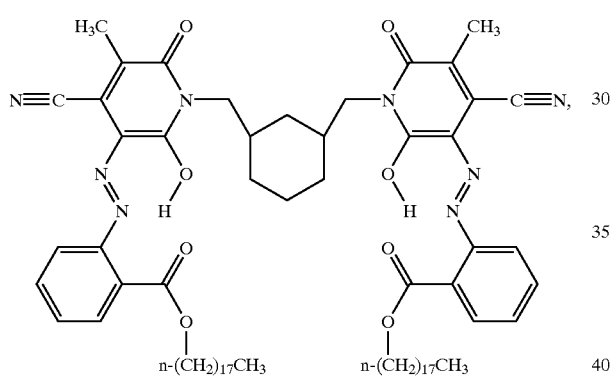
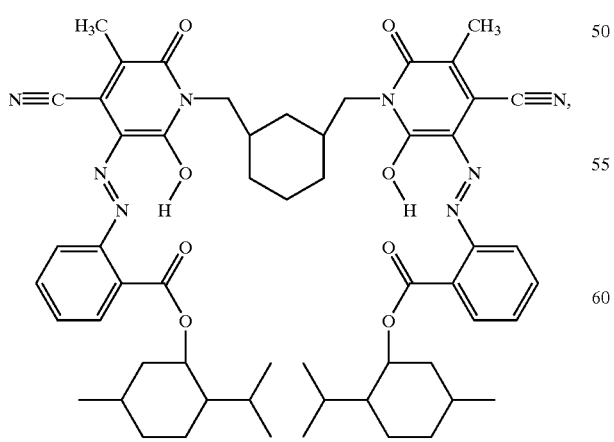
146
-continued
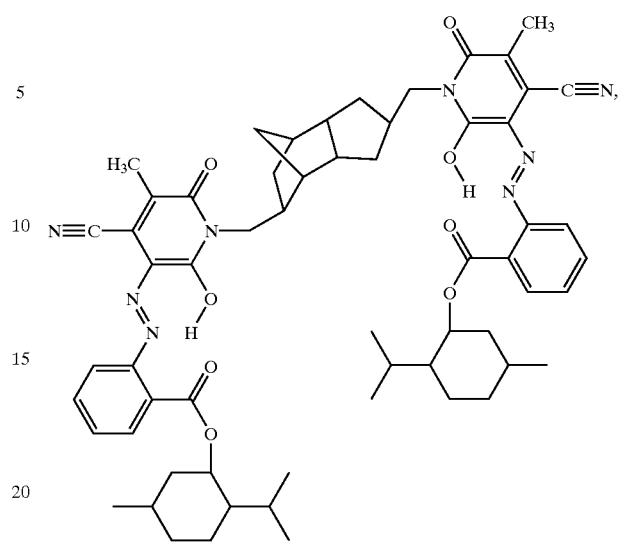
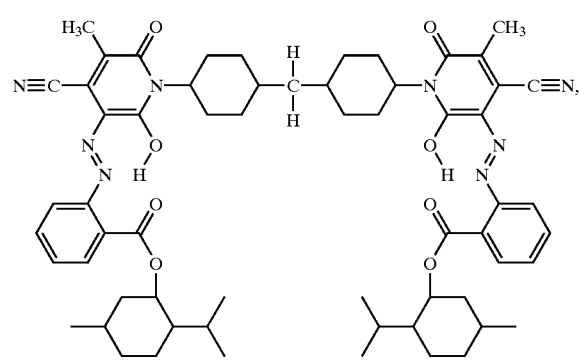
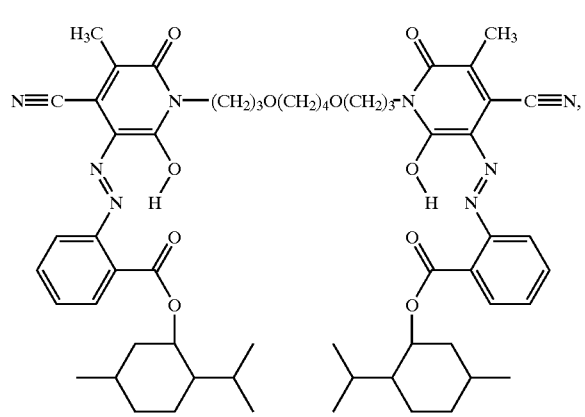

147
-continued
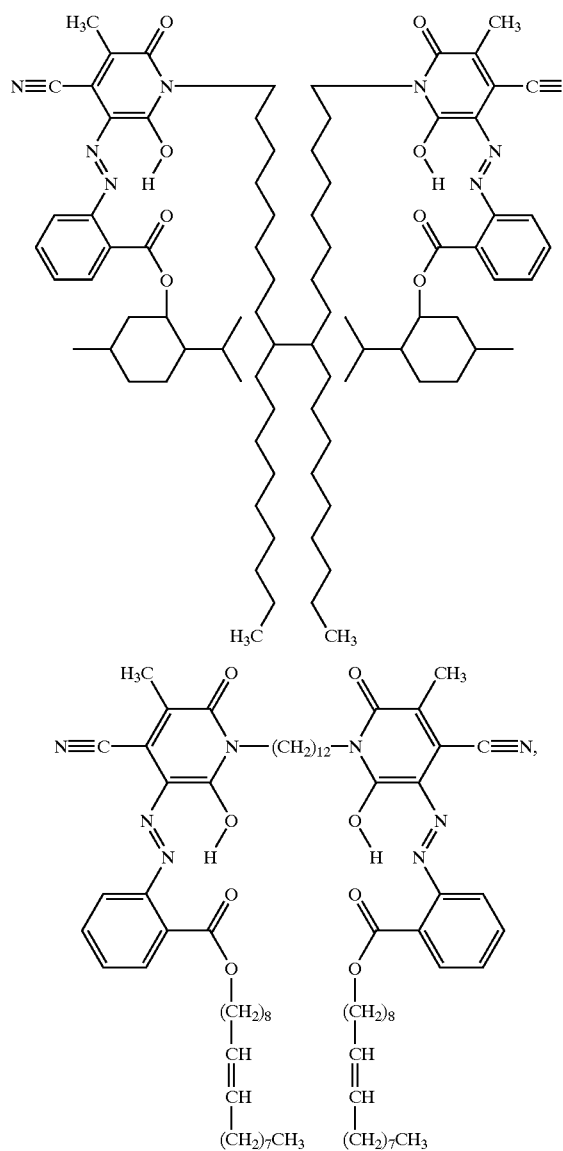
148
-continued
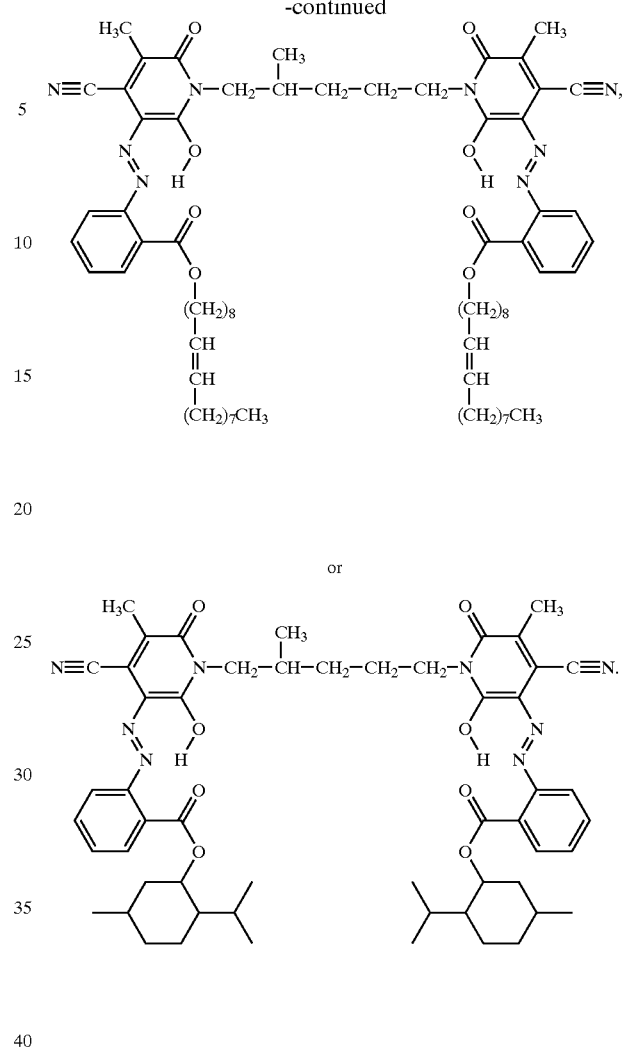
or
* * * * *